United States Patent
Tolbert et al.

(10) Patent No.: US 10,734,649 B2
(45) Date of Patent: Aug. 4, 2020

(54) METAL CHALCOGENIDES FOR PSEUDOCAPACITIVE APPLICATIONS

(71) Applicant: THE REGENTS OF THE UNIVERSITY OF CALIFORNIA, Oakland, CA (US)

(72) Inventors: Sarah H. Tolbert, Los Angeles, CA (US); Bruce S. Dunn, Los Angeles, CA (US); John Cook, Van Nuys, CA (US); Hyungseok Kim, Los Angeles, CA (US); Terri Chai Lin, Fremont, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 414 days.

(21) Appl. No.: 15/359,996

(22) Filed: Nov. 23, 2016

(65) Prior Publication Data
US 2017/0162875 A1 Jun. 8, 2017

Related U.S. Application Data

(60) Provisional application No. 62/259,144, filed on Nov. 24, 2015.

(51) Int. Cl.
*H01M 4/58* (2010.01)
*H01M 4/62* (2006.01)
(Continued)

(52) U.S. Cl.
CPC .......... *H01M 4/5815* (2013.01); *H01G 11/06* (2013.01); *H01G 11/38* (2013.01);
(Continued)

(58) Field of Classification Search
None
See application file for complete search history.

(56) References Cited

U.S. PATENT DOCUMENTS

| 4,224,390 A | 9/1980 | Haering | |
| 4,233,377 A * | 11/1980 | Haering | H01M 4/581 429/231.1 |
| 5,766,791 A * | 6/1998 | Takahashi | H01M 2/1241 429/53 |

OTHER PUBLICATIONS

Mdlenleni et al., Sonochemical Synthesis of Nanostructured Molybdenum Sulfide, J. Am. Chem. Soc., vol. 120, No. 24, 1998, DOI: 10.1021/ja9800333 (Year: 1998).*

(Continued)

*Primary Examiner* — Ula C Ruddock
*Assistant Examiner* — Anna Korovina
(74) *Attorney, Agent, or Firm* — O'Banion & Ritchey LLP; John P. O'Banion

(57) ABSTRACT

A synthetic metal dichalcogenide having a highly defected nanocrystalline layered structure, wherein layer spacing is larger than in perfect crystals of the same material, wherein the defected structure provides access to interlayer crystals of the same material, and wherein the defected structure facilitates a pseudocapacitive charge storage mechanism. The metal dichalcogenide is receptive to intercalation of ions such as Li ions, Na ions, Mg ions, and Ca ions, and does not undergo a phase transition upon intercalation of Li ions, Na ions, Mg ions, or Ca ions. The metal dichalcogenide can be used, for example, as a component of an electrode that also includes a carbon derivative, and a binder, which are intermixed to form the electrode. The resultant composite electrode is highly porous and highly electronically conductive, and is suitable for use in devices such as symmetric capacitors, asymmetric capacitors, rocking chair batteries, and other devices.

15 Claims, 40 Drawing Sheets

Figure 1A:
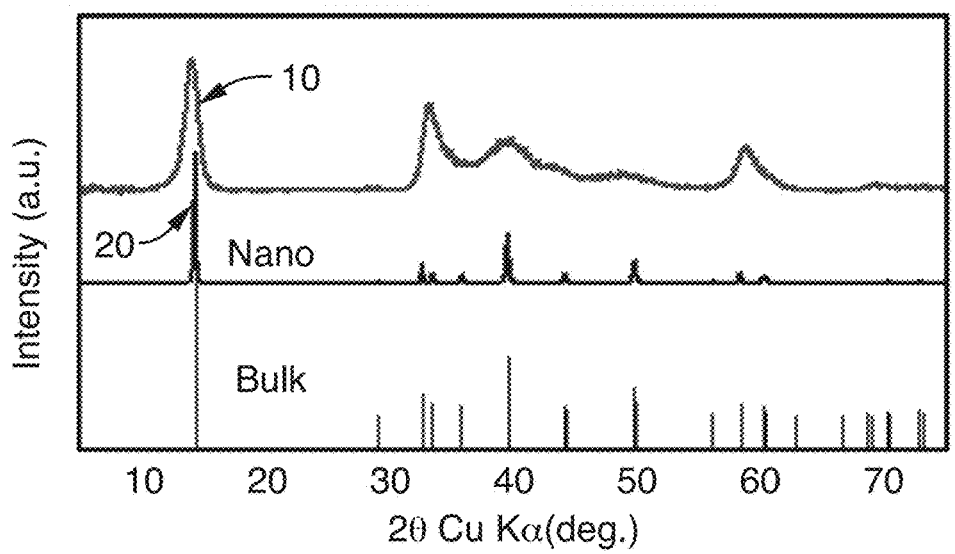

(51) Int. Cl.
| | |
|---|---|
| H01M 4/136 | (2010.01) |
| H01G 11/06 | (2013.01) |
| H01G 11/50 | (2013.01) |
| H01G 11/38 | (2013.01) |
| H01G 11/58 | (2013.01) |
| H01G 11/40 | (2013.01) |
| H01M 10/054 | (2010.01) |
| H01M 10/052 | (2010.01) |

(52) U.S. Cl.
CPC ............. *H01G 11/40* (2013.01); *H01G 11/50* (2013.01); *H01G 11/58* (2013.01); *H01M 4/136* (2013.01); *H01M 4/622* (2013.01); *H01M 4/625* (2013.01); *H01M 10/052* (2013.01); *H01M 10/054* (2013.01)

(56) References Cited

OTHER PUBLICATIONS

Park et al., "Discharge mechanism of MoS2 for sodium ion battery: Electrochemical measurements and characterization", Electrochimica Acta 92 (2013) 427-432, http://dx.doi.org/10.1016/j.electacta.2013.01.057 (Year: 2013).*

Li et al., "Enhancing sodium-ion battery performance with interlayer-expanded MoS2—PEO nanocomposites", Nano Energy (2015) 15, 453-461, http://dx.doi.org/10.1016/j.nanoen.2015.05.012 (Year: 2015).*

Huang et al., MoS2 Nanoplates Consisting of Disordered Graphene-like Layers for High Rate Lithium Battery Anode Materials, Nano Lett. 2011, 11, 4826-4830, dx.doi.org/10.1021/nl202675f (Year: 2011).*

Petkov et al., Structure of nanocrystalline materials using atomic pair distribution function analysis: study of LiMoS2, Physical Review B, vol. 65, 092105, Feb. 14, 2002 (Year: 2002).*

Yamamoto et al., Lithium Secondary Battery Using Monoclinic NbS3 Prepared under High Pressure, Journal of The Electrochemical Society, vol. 133, No. 8, 1986, 1558, https://doi.org/10.1149/1.2108968 (Year: 1986).*

Chhowala et al., The chemistry of two-dimensional layered transition metal dichalcogenide nanosheets, Nature Chem 5, 263-275 (2013). https://doi.org/10.1038/nchem.1589 (Year: 2013).*

Miki, Yasuhiro et al., "Amorphous MoS2 as the cathode of lithium secondary batteries", Journal of Power Sources 54 (1995) 508-510.

Julien, C. et al., "Electrochemical studies of disordered MoS2 as cathode material in lithium batteries", Materials Science and Engineering, B15 (1992) 73-77.

Zhang, Chaofeng et al., "Facile synthesis of carbon-coated MoS2 nanorods with enhanced lithium storage properties", Electrochemistry Communications 20 (2012) 7-10, online Mar. 31, 2012.

Rapoport, L. et al., "Applications of WS2 (MoS2) inorganic nanotubes and fullerine-like nanoparticles for solid lubrication and for structural nanocomposites", J. Mater. Chem., 2005, 15, 1782-1788, online Feb. 22, 2005.

Liu, Hao et al., "Highly Ordered Mesoporous MoS2 with Expanded Spacing of the (002) Crystal Plane for Ultrafast Lithium Ion Storage", Adv. Energy Mater. 2012, 2, 970-975, online May 21, 2012.

Mahmood, Qasim et al., "Transition from Diffusion-Controlled Intercalation into Extrinsically Psuedocapacitive Charge Storage of MoS2 by Nanoscale Heterostructuring", Adv. Energy Mater. 2016, 6, 1501115, pp. 1-10, online Oct. 19, 2015.

Lou, Xiong Wen et al., "Hydrothermal Synthesis of a-MoO3 Nanorods via Acidification of Ammonium Heptamolybdate Tetrahydrate", Chem. Mater. 2002, 14, 4781-4789, online Sep. 21, 2002.

Ramadoss, Ananthakumar et al., "Enhanced activity of a hydrothermally synthesized mesoporous MoS2 nanostructure for high performance supercapacitor applications", New J. Chem. 2014, 38, 2379, online Jan. 23, 2014.

Etzkorn, Johannes et al., "Metal-Organic Chemical Vapor Deposition Synthesis of Hollow Inorganic-Fullerene-Type MoS2 and MoSe2 Nanoparticles", Adv. Mater. 17, 2372-2375, online Aug. 16, 2005.

Tenne, R., "Inorganic nanotubes and fullerene-like nanoparticles", nature nanotechnology, vol. 1, Nov. 2006, pp. 103-111.

Hu, Z. et al., "MoS2 with intercalation reaction as long-life anode material for Lithium ion batteries", Inorg. Chem. Front., 2016, 3, 532-535, DOI:10.2039/C5QI00237K, online Jan. 11, 2016.

Hwang, Haesuk et al., "MoS2 Nanoplates Consisting of Disordered Graphene-like Layers for High Rate Lithium Battery Anode Materials", Nano Lett. 2011, 11, 4826-4830, published Sep. 29, 2011.

Imanishi, Nobuyuki et al., "Synthesis of MoS2 Thin Film by Chemical Vapor Deposition Method and Discharge Characteristics as a Cathode of the Lithium Secondary Battery", J. Electrochem. Soc., vol. 139, No. 8, Aug. 1992, pp. 2082-2088.

Benavente, E. et al., "Intercalation chemistry of molybdenum disulfide", Coordination Chemistry Reviews 224 (2002) 87-109.

Py, M. A. et al., "Structural destabliization induced by lithium intercalation in MoS2 and related compounds", Can. J. Phys. 61, 76 (1983).

Imanishi, Nobuyuki et al., "Study on lithium intercalation into MoS2", Solid State Ionics 58 (1992) 333-338.

Whittingham, M. Stanley, "Chemistry of Intercalation Compounds: Metal Guests in Chalcogenide Hosts", Prog. Solid St. Chem. vol. 12, 1978, pp. 41-99.

Woo, Seung Hee et al., "Fullerene-like Re-Doped MoS2 Nanoparticles as an Intercalation Host with Fast Kinetics for Sodium Ion Batteries", Isr. J. Chem. 2015, 55, 559-603.

Yu, Hontao et al., Synthesis of Discrete and Dispersible MoS2 Nanocrystals, Inorg. Chem. 2008, 47, 1428-1434, online Feb. 8, 2008.

Margulis, L. et al., "Nested fullerene-like structures", Scientific Correspondence, Nature, vol. 365, Sep. 9, 1993, pp. 113-114.

Zhu, Changbao et al., "Single-Layered Ultrasmall Nanoplates of MoS2 Embedded in Carbon Nanofibers with Excellent Electrochemical Performance for Lithium and Sodium Storage", Energy Storage, Angew. Chem. Int. Ed. 2014, 53, 2152-2156, online Jan. 20, 2014.

Liang, Yanliang et al., "Rechargeable Mg Batteries with Graphene-like MoS2 Cathode and Ultrasmall Mg Nanoparticle Anode", Adv. Mater. 2011, 23, 640-643, online Dec. 6, 2010.

Zhong, Cheng et al., "A review of electrolyte materials and compositions for electrochemical supercapacitors", Chem. Soc. Rev., 2015, 44, 7484-7539, online Jun. 8, 2015.

Cook, John B. et al., "Nanoporous MoS2 as an Electrode Material Exhibiting High Levels of Pseudocapacitive Charge Storage with Both Li and Na-ions", poster presented at ECS Conference on Electrochemical Energy Conversion & Storage with SOFC-XIV, Jul. 26-31, 2015, Glasgow, Scotland.

Cook, John B. et al., "Nanoporous MoS2 as an electrode material exhibiting high levels of pseudocapacitive charge storage with both Li and Na-ions", abstract presented at ECS Conference on Electrochemical Energy Conversion & Storage with SOFC-XIV, Jul. 26-31, 2015, Glasgow, Scotland.

* cited by examiner

Q (nm⁻¹)

Q (nm⁻¹)

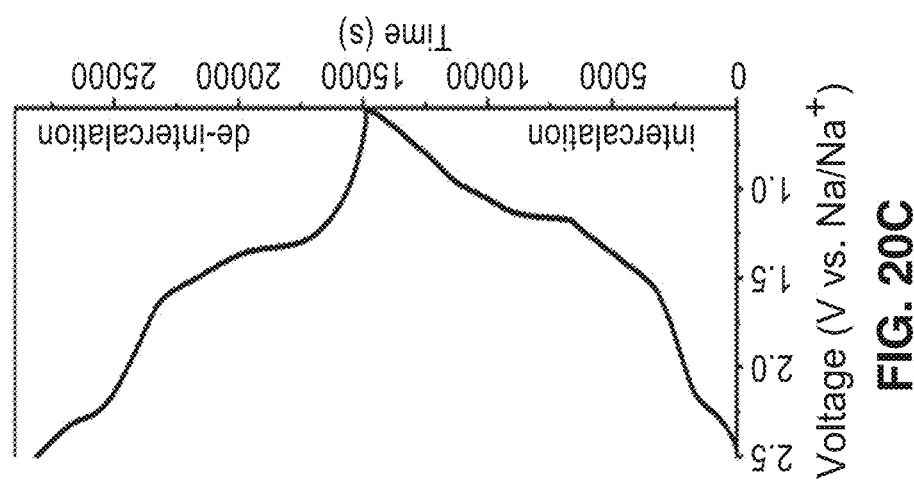
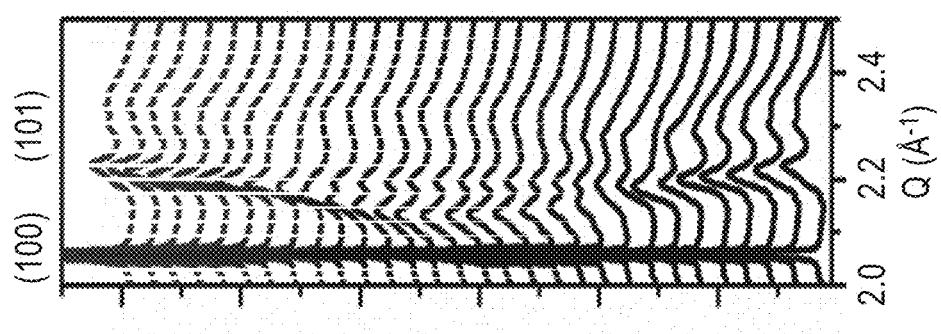
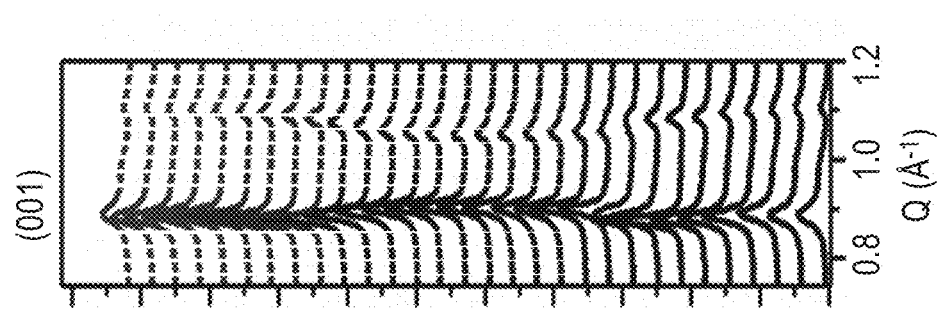

METAL CHALCOGENIDES FOR PSEUDOCAPACITIVE APPLICATIONS

CROSS-REFERENCE TO RELATED APPLICATIONS

This application claims priority to, and the benefit of, U.S. provisional patent application Ser. No. 62/259,144 filed on Nov. 24, 2015, incorporated herein by reference in its entirety.

STATEMENT REGARDING FEDERALLY SPONSORED RESEARCH OR DEVELOPMENT

This invention was made with Government support under DE-SC0001342 and under DE-SC0014213, awarded by the United States Department of Energy, and under DGE-0903720, awarded by the National Science Foundation. The Government has certain rights in the invention.

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to pseudocapacitors, and more particularly to synthetic metal chalcogenides for use in pseudocapacitive applications.

2. Background Discussion

Faster charging batteries are highly desired for portable electronics, electric vehicles, and regenerative energy storage. Traditional Li-ion battery electrodes offer high energy density storage by utilizing reversible redox reactions, but slow ionic diffusion leads to long charging times (about 1 hour) resulting in low power densities and slow rates.

Electrochemical capacitors such as electrochemical double layer capacitors (ELDCs) offer some advantages over batteries, including fast charging times (<1 minute) and long lifetimes (>500,000 cycles). However, ELDCs have low energy densities compared to batteries since they do not involve redox reactions. Pseudocapacitors are a type of electrochemical capacitor that combine the attractive high energy density storage of batteries with the fast rates of ELDCs.

Much of the work on pseudocapacitors has focused on transition oxide based materials. Pseudocapacitive charge storage has been demonstrated in two transition metal sulfides namely $TiS_2$ nanoplatelets, and mesoporous $MoS_2$ thin films. $MoS_2$ is an attractive pseudocapacitive electrode material for its large van der Walls gaps of 6.2 Å in micrometer sized samples, and as large as 6.9 Å in nanostructured samples. The thermodynamically stable phase of $MoS_2$ is the 2H phase in which the molybdenum atoms are coordinated in a trigonal prismatic sulfur environment.

Lithium insertion into the semi-conducting 2H phase of $MoS_2$ induces a phase transition to the metallic 1T phase of $MoS_2$ that is more electronically conductive. Though this 1T-phase has been exploited in hydrogen evolution applications for its superior electronic conductivity to decrease the overpotential required for hydrogen evolution, this desirable property of $MoS_2$ has not been fully utilized in Li-ion battery applications.

$MoS_2$ has been well studied as a high capacity negative electrode material, achieving up to 1290 mAh $g^{-1}$ when cycled with Li-ions to 0 V vs. Li/Li$^+$. However, when $MoS_2$ is cycled to these very low potentials to achieve these very high capacities, the subsequent electrochemical cycling operates as a lithium-sulfur redox couple that is prone to short lifetimes (<300 cycles). While high capacities are achieved at these low potentials, the parent crystalline atomic structure is completely destroyed and does not reform after the Li is removed. Additionally, $MoS_2$ converts to a highly electronically conducting metallic phase if the voltage is kept higher than 0.8V vs. Li/Li$^+$, so conversion type-reactions cannot utilize this beneficial property of $MoS_2$ (which we exploit in our technology described herein). Furthermore, these diffusive phase changes are kinetically hindered, thereby precluding their use as a fast charging pseudocapacitor, which relies on rapid kinetics.

Given an ideal architecture and morphology consisting of an interconnected mesoporous network, $MoS_2$ thin films exhibit fundamental pseudocapacitive properties. $MoS_2$ can be synthesized with varying degrees of crystallinity which has been shown to strongly influence the electrochemical properties in $Nb_2O_5$. $MoS_2$ synthesized by low temperature colloidal synthesis and hydrothermal techniques typically lead to very disordered crystal structures. Another method to synthesize $MoS_2$ nanostructures is thermal conversion of molybdenum oxide precursors in $H_2S$ gas. This oxide-to-sulfide conversion is typically performed above 600° C. which can lead to well crystalized $MoS_2$ with good preservation of the preformed nanoscale architecture.

Commercial electrodes for Li-ion batteries are required to have high active material volumetric loadings to maximize the energy density of the cell. In order for this requirement to be satisfied in pseudocapacitive based composite electrodes, close attention also needs to be spent on the electrode architecture. The three main components that comprise a composite electrode are the active material, the conductive additive, and the non-conductive polymeric binder. The optimization of these parameters strongly influences the energy density and power density of the final electrode. A further complication arises from the use of nanoparticle based charge storage materials. Nanoparticles tends to agglomerate making it difficult to disperse within the electrode matrix. This results in electronically resistive interparticle electrical contact, ultimately leading to poor power density due to inhomogeneous current gradients. Therefore, even if a material itself shows pseudocapacitive characteristics, their characteristic charge/discharge rates cannot be realized if they are embedded in an electrode architecture that is not optimized for pseudocapacitive charge storage.

BRIEF SUMMARY

This disclosure describes synthetic metal dichalcogenides having a highly defected nanocrystalline layered structure, wherein layer spacing is larger than in perfect crystals of the same material, wherein the defected structure provides access to interlayer crystals of the same material, and wherein the defected structure facilitates a pseudocapacitive charge storage mechanism.

In various embodiments, the metal dichalcogenide can be a transition metal disulphide, diselelnide, and ditelluride, or mixed transition metal combinations thereof. In various embodiments, the metal dichalcogenide can be $MoS_2$, $NbS_2$, $TaS_2$, $TiS_2$, or $VS_2$. In various embodiments, the defected structure is receptive to intercalation of ions selected from the group consisting of Li ions, Na ions, Mg ions, and Ca ions. In various embodiments, the metal dichalcogenide does not undergo a phase transition upon intercalation of Li ions, Na ions, Mg ions, or Ca ions.

The highly defected structure can be used, for example, as a component of an electrode that also includes a carbon derivative, and a binder, which are intermixed to form the electrode. The carbon derivative can be, for example, carbon fibers, or carbon black, or carbon black and carbon fibers. The binder can be, for example, polyacrylic acid. The resultant composite electrode is highly porous and highly electronically conductive, and is suitable for use in devices such as symmetric capacitors, asymmetric capacitors, rocking chair batteries, and other devices. Porous electrode architectures that are highly electronically conductive represent an effective design strategy to maintain the fast rates inherent to pseudocapacitive active materials.

In one embodiment, this disclosure describes the synthesis of about 10 nm to about 75 nm highly defected $MoS_2$ nanocrystals with expanded atomic spacing and its use in high rate energy applications. In one embodiment, the $MoS_2$ nanoparticles are synthesized through a two-step method that is both economical and scalable.

In another embodiment, this disclosure describes electrodes that comprise these aforementioned $MoS_2$ nanocrystals, carbon derivatives, and a binder. The composite electrode architecture can be tuned to favor high energy density, high power density, or a combination of both.

In still another embodiment, this disclosure describes an electrode comprising a porous mixture of $MoS_2$/carbon fibers/carbon black and polyacrylic acid. The mixture can be paired with lithium metal to make an electrochemical cell. In one embodiment, the electrode may reversibly store >90 $mAh \cdot g^{-1}$ in 30 seconds. In one embodiment, the $MoS_2$ nanocrystal based electrodes may be cycled reversibly 3000 times with less than 20% loss in original capacity. In one embodiment, the electrodes may be cycled electrochemically to a voltage (about 0.8V vs. Li/Li$^+$) which does not destroy the original structure. In various embodiments, the technology can be extended to $NbS_2$, $TaS_2$, $TiS_2$, $VS_2$, and mixed transition metal combinations thereof. In various additional embodiments, the technology can be employed in Li-ion batteries, Na-ion batteries, and Mg-ion batteries.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1A: X-ray diffraction of b-$MoS_2$ and ncs-$MoS_2$.

Figure 1B:
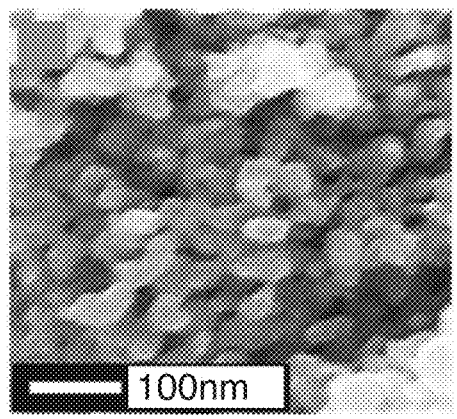

FIG. 1B: Scanning electron microscope image of ncs-$MoS_2$.

Figure 1C:
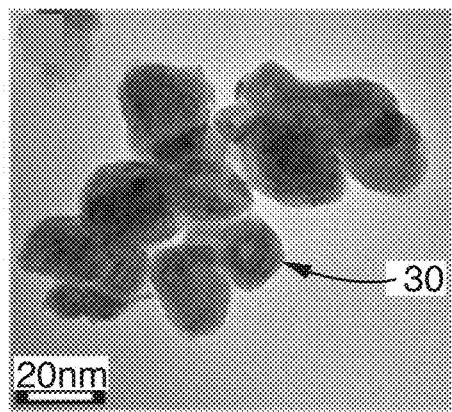
Figure 1D:
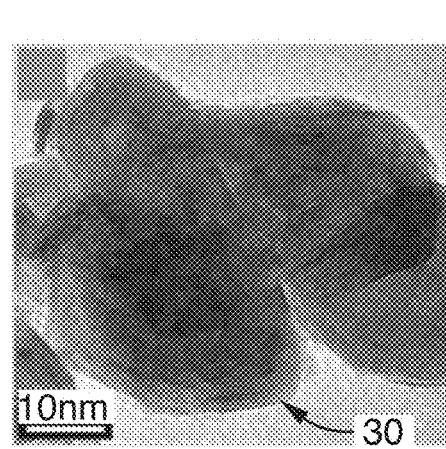
Figure 1E:
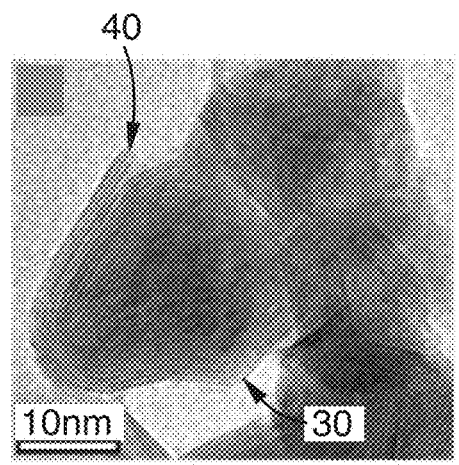

FIG. 1C through FIG. 1E: Transmission electron microscope images of ncs-$MoS_2$.

Figure 2A:
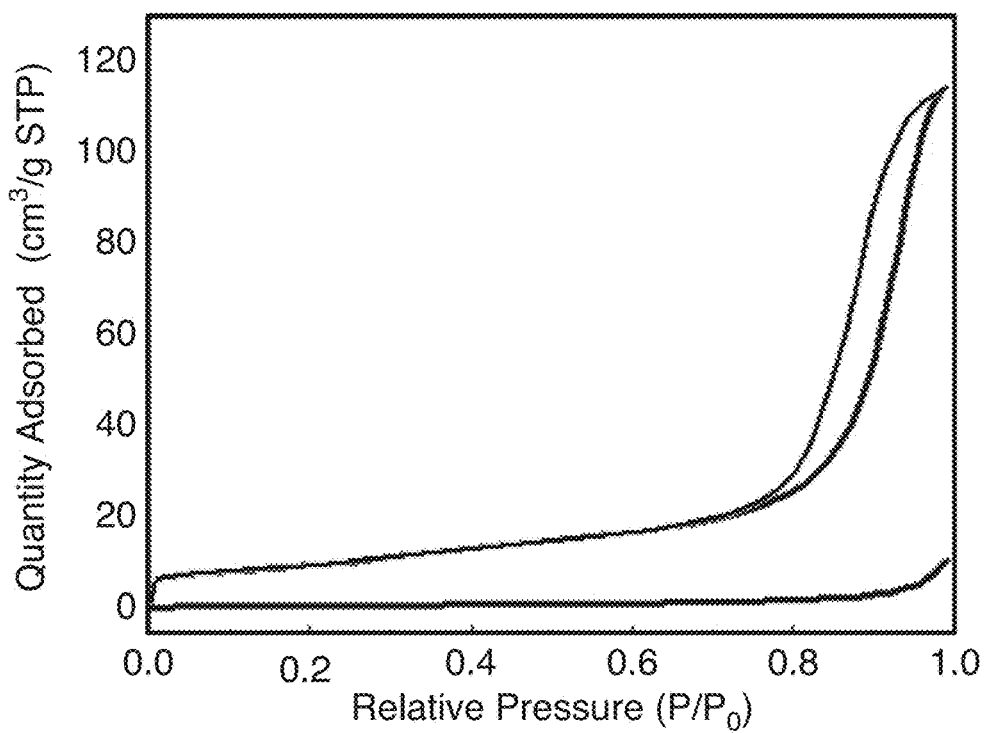

FIG. 2A: Nitrogen isotherm of both b-$MoS_2$ and ncs-$MoS_2$.

Figure 2B:
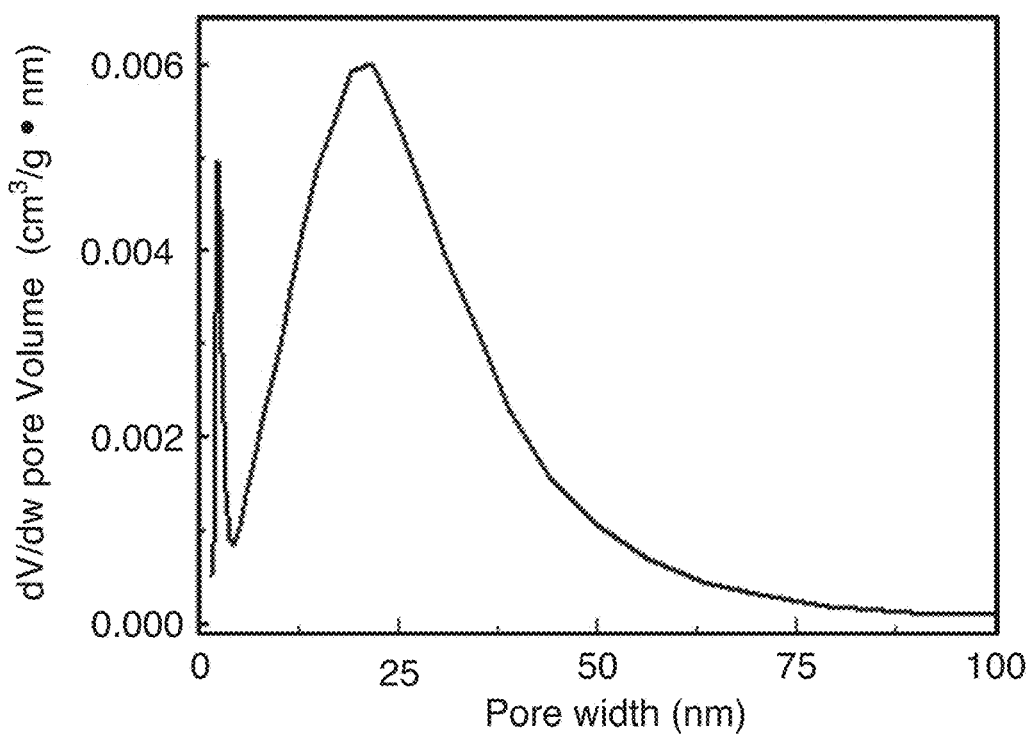

FIG. 2B: BJH pore size distribution.

Figure 3A:
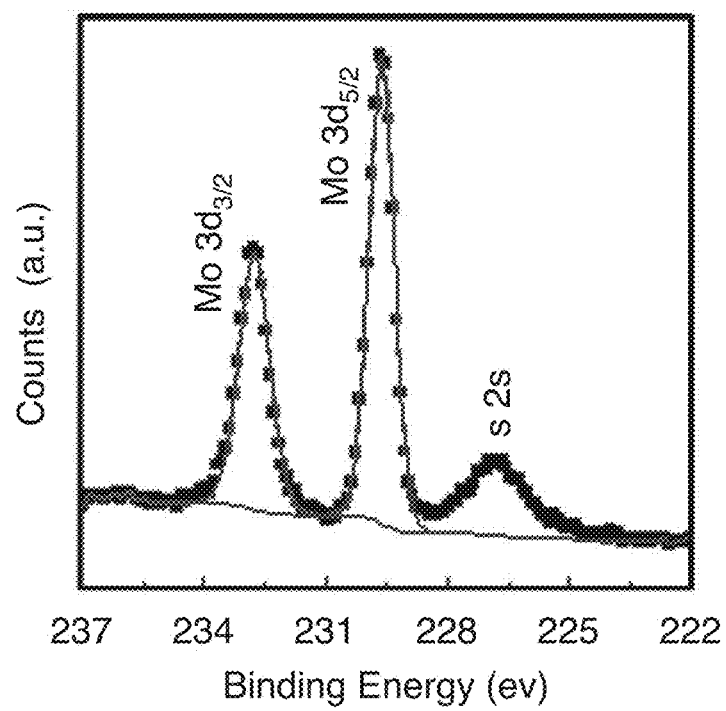
Figure 3B:
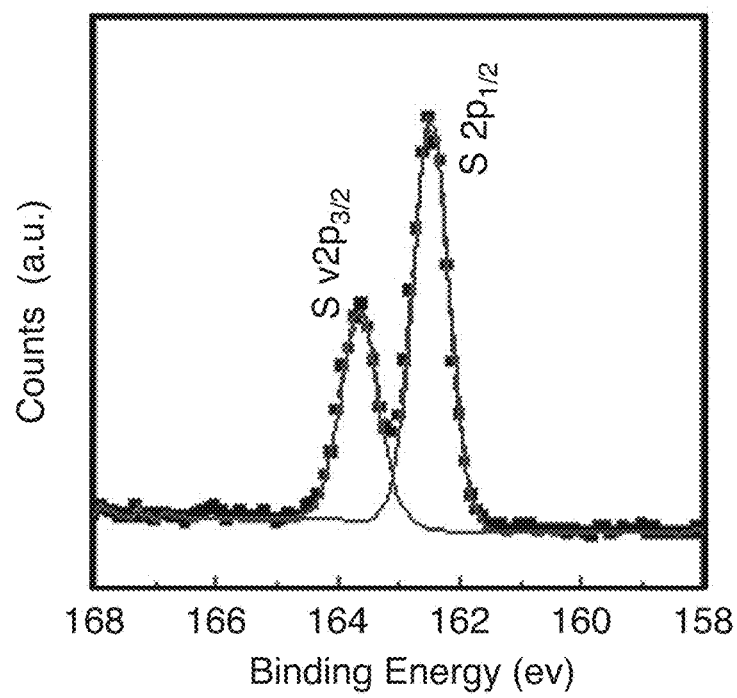

FIG. 3A and FIG. 3B: X-ray photoelectron spectroscopy of b-$MoS_2$.

Figure 3C:
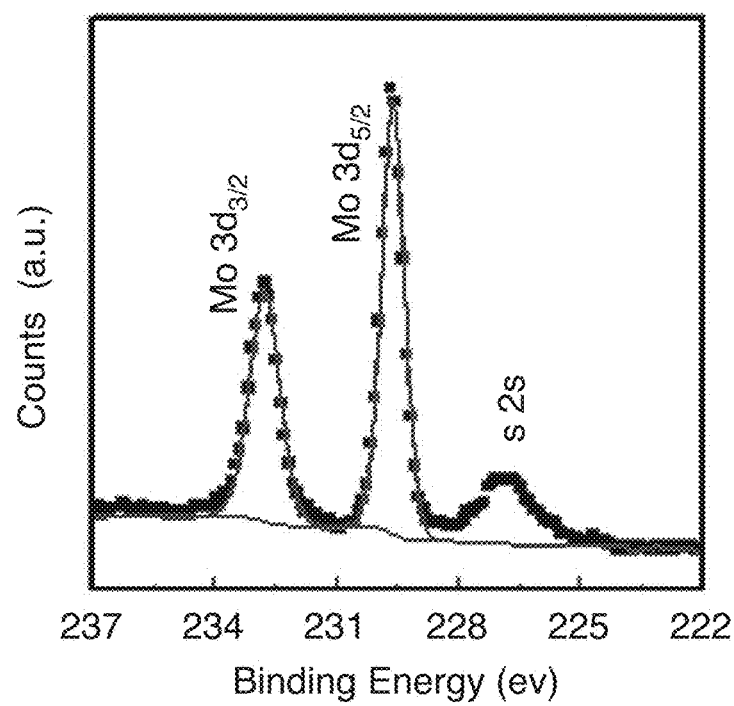
Figure 3D:
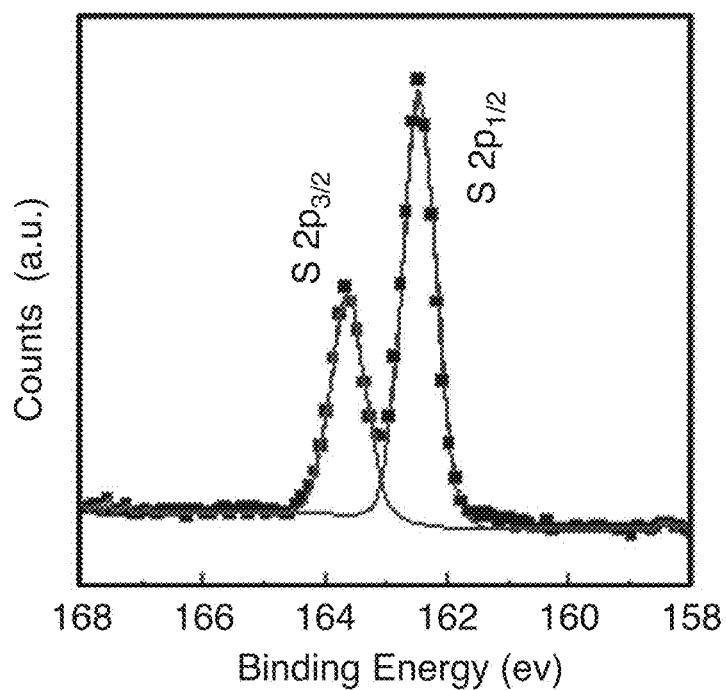

FIG. 3C and FIG. 3D: X-ray photoelectron spectroscopy of ncs-$MoS_2$.

Figure 4A:
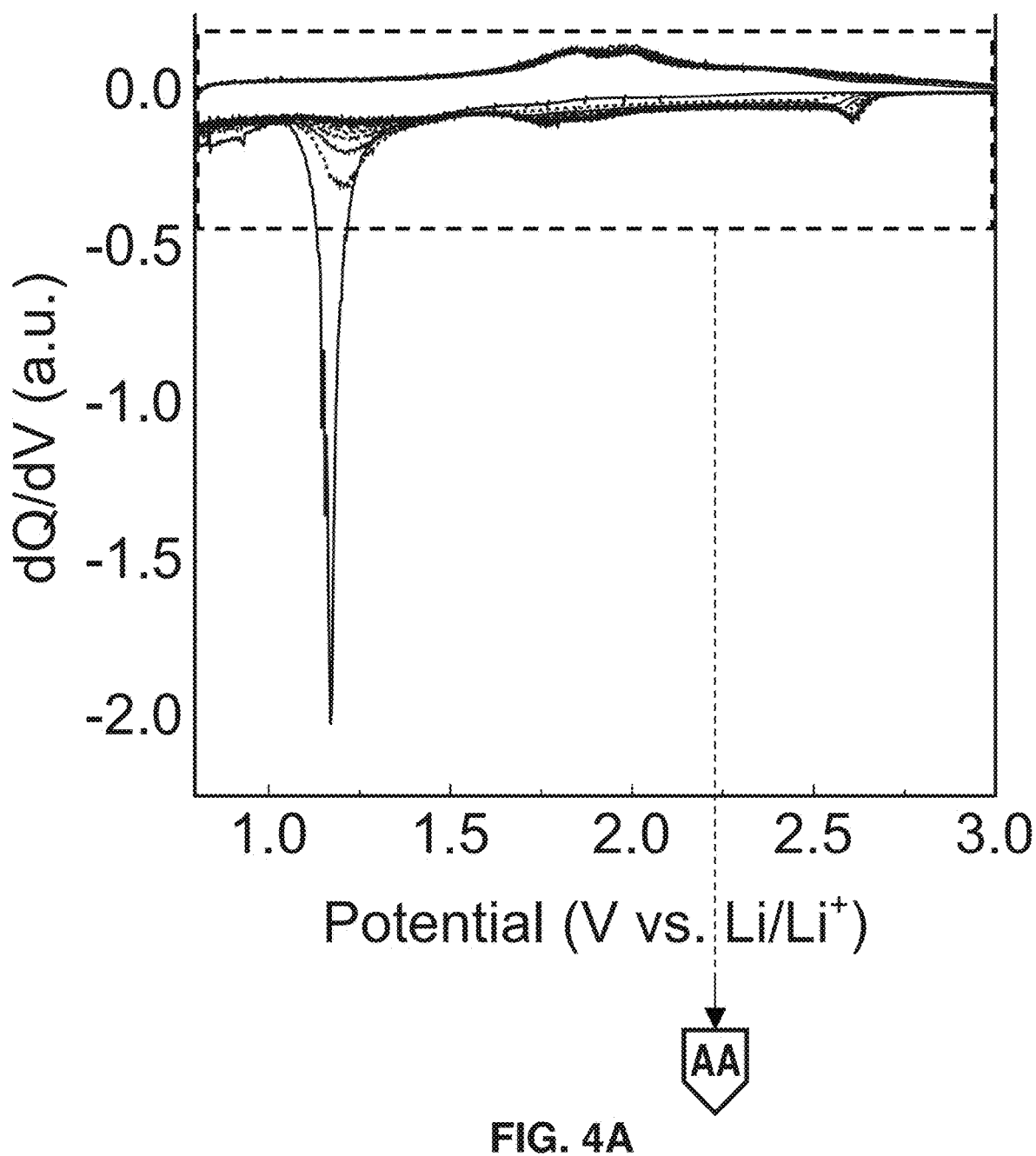
Figure 4B:
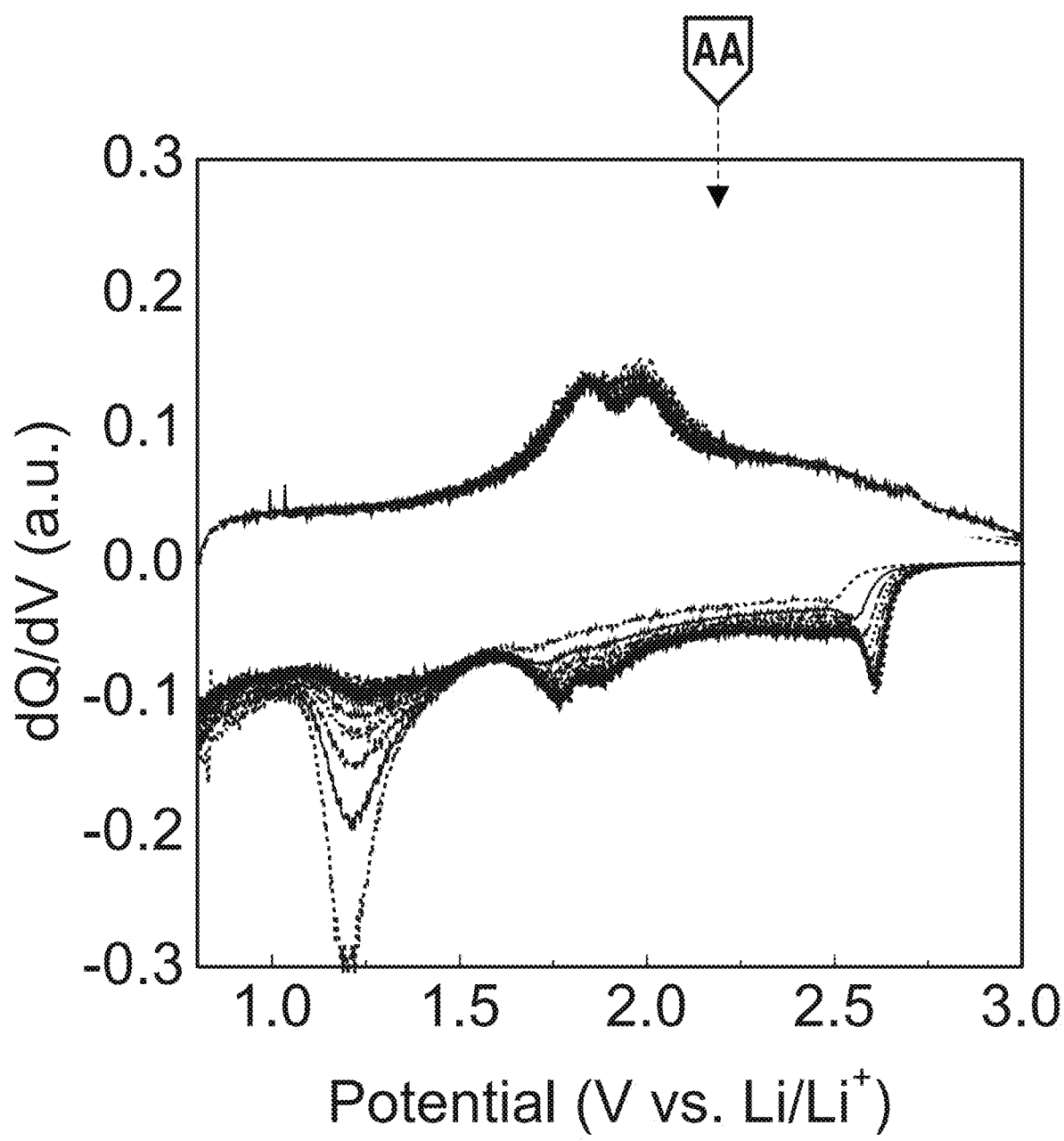
Figure 4C:
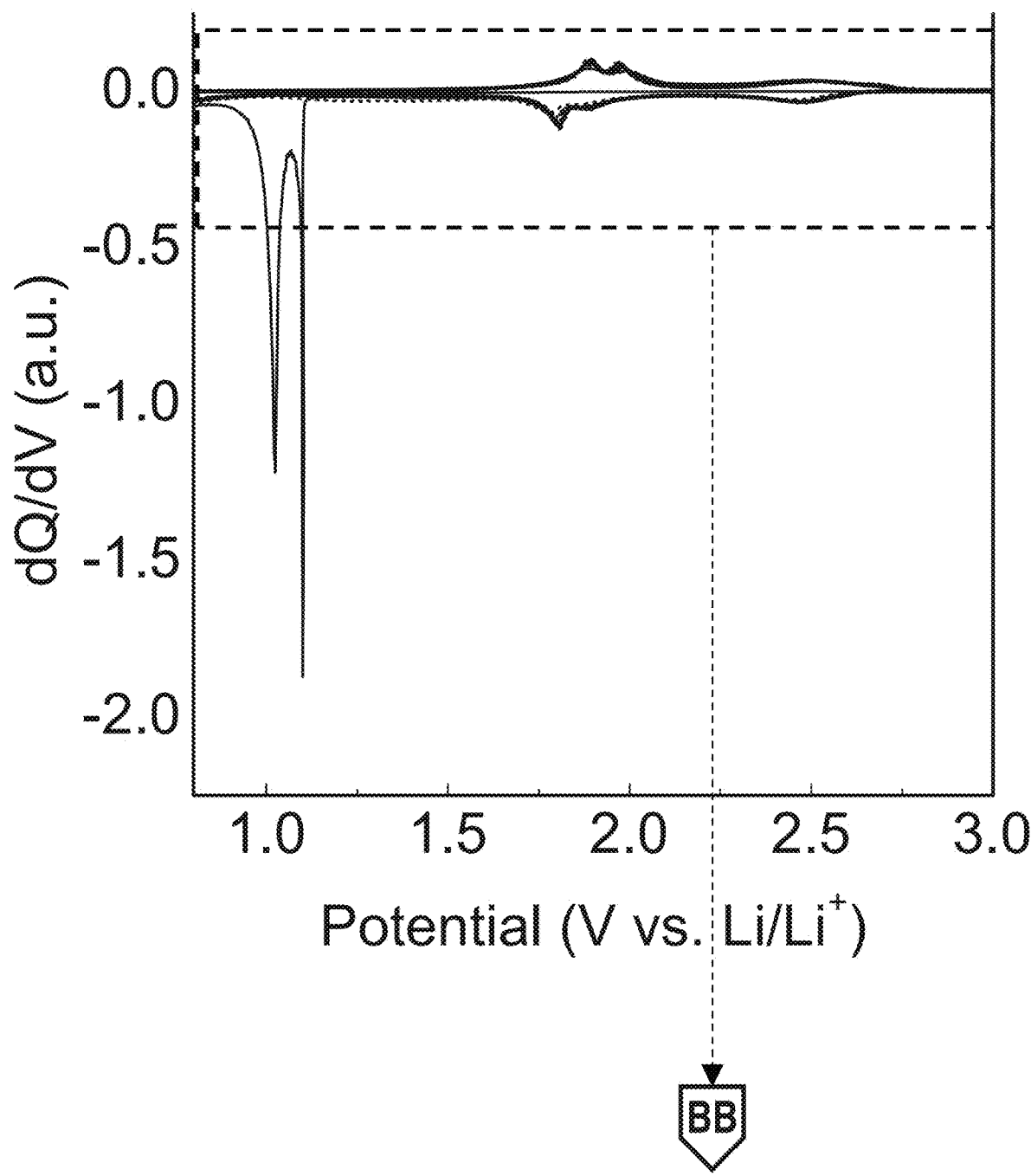

FIG. 4A and FIG. 4C: Derivative of the galvanostatic discharge plot $$\left(\frac{dQ}{dV}\right)$$

of the first 10 cycles of ncs-$MoS_2$ and b-$MoS_2$, respectively.

Figure 4D:
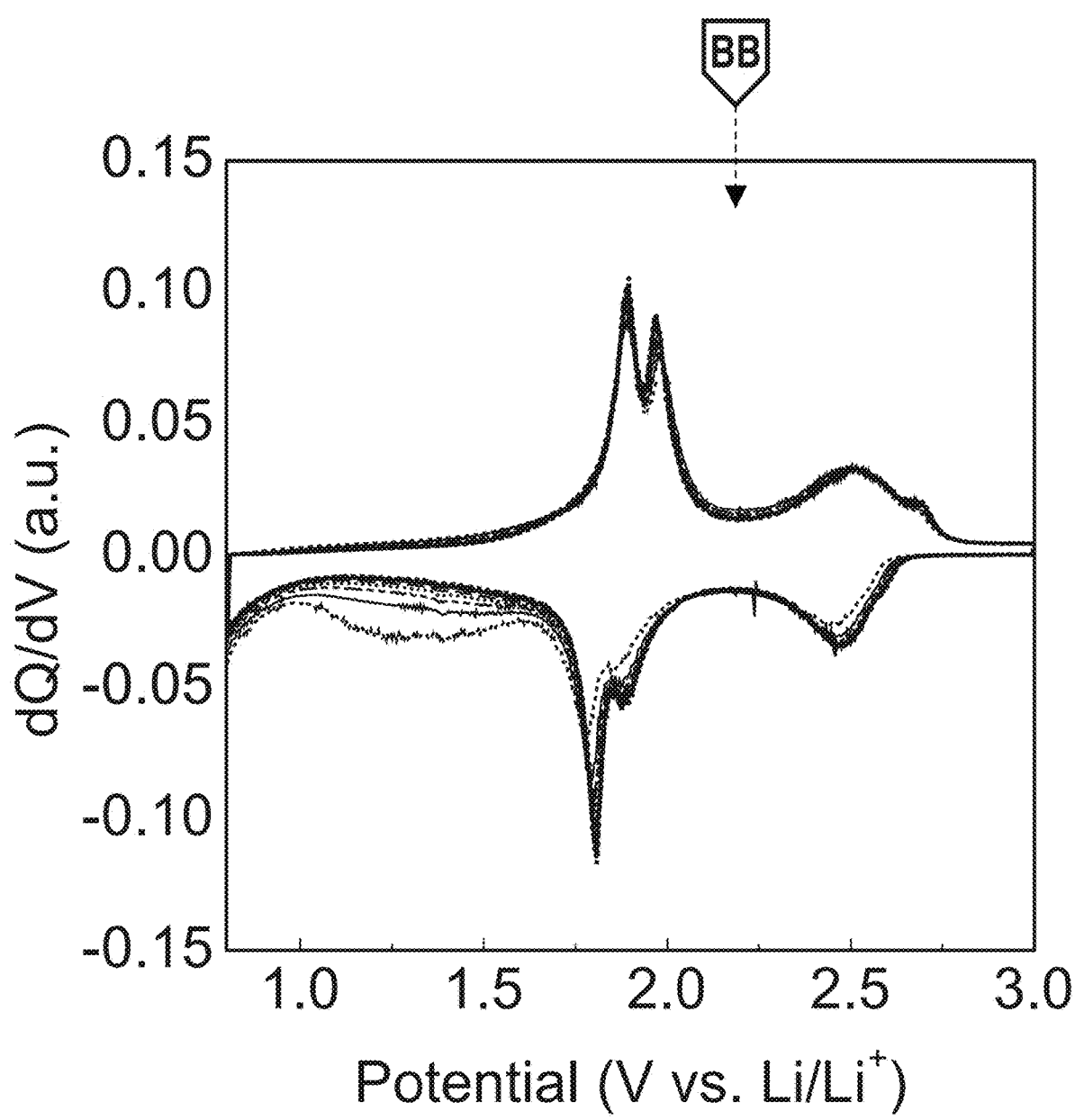

FIG. 4B and FIG. 4D: Derivative of the galvanostatic discharge plot $$\left(\frac{dQ}{dV}\right)$$

of cycles 2 to 10 of ncs-$MoS_2$ and b-$MoS_2$, respectively.

Figure 4E:
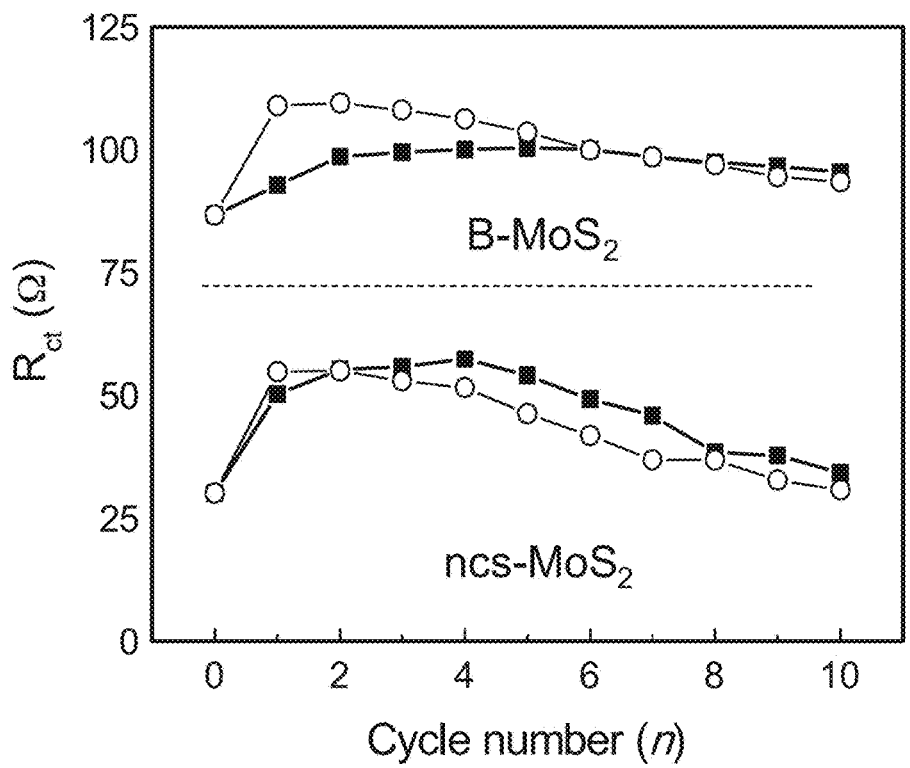

FIG. 4E: Charge transfer resistance of b-$MoS_2$ and ncs-$MoS_2$ based electrodes during the first 10 formation cycles calculated from the corresponding Nyquist plots.

Figure 4F:
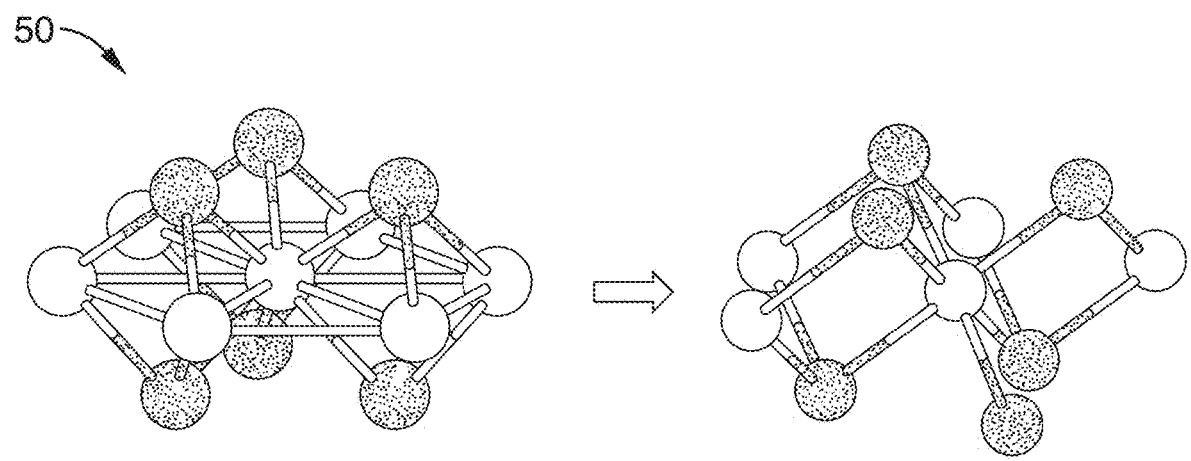

FIG. 4F: Atomic representation of the 2H-to-1T phase transformation.

Figure 5A:
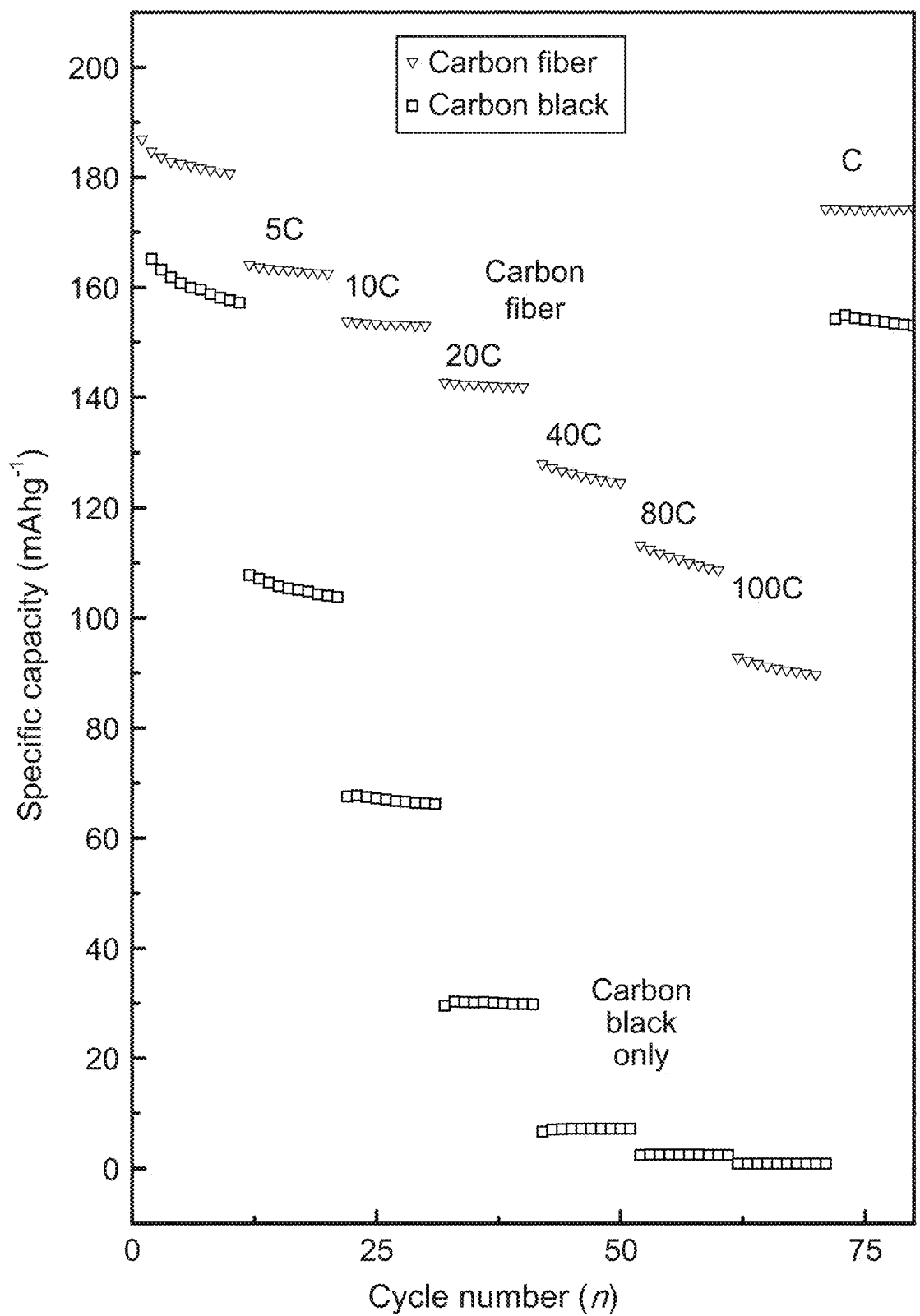

FIG. 5A: Kinetic analysis comparing the electrode architecture between carbon fiber based electrodes carbon black only electrodes.

Figure 5B:
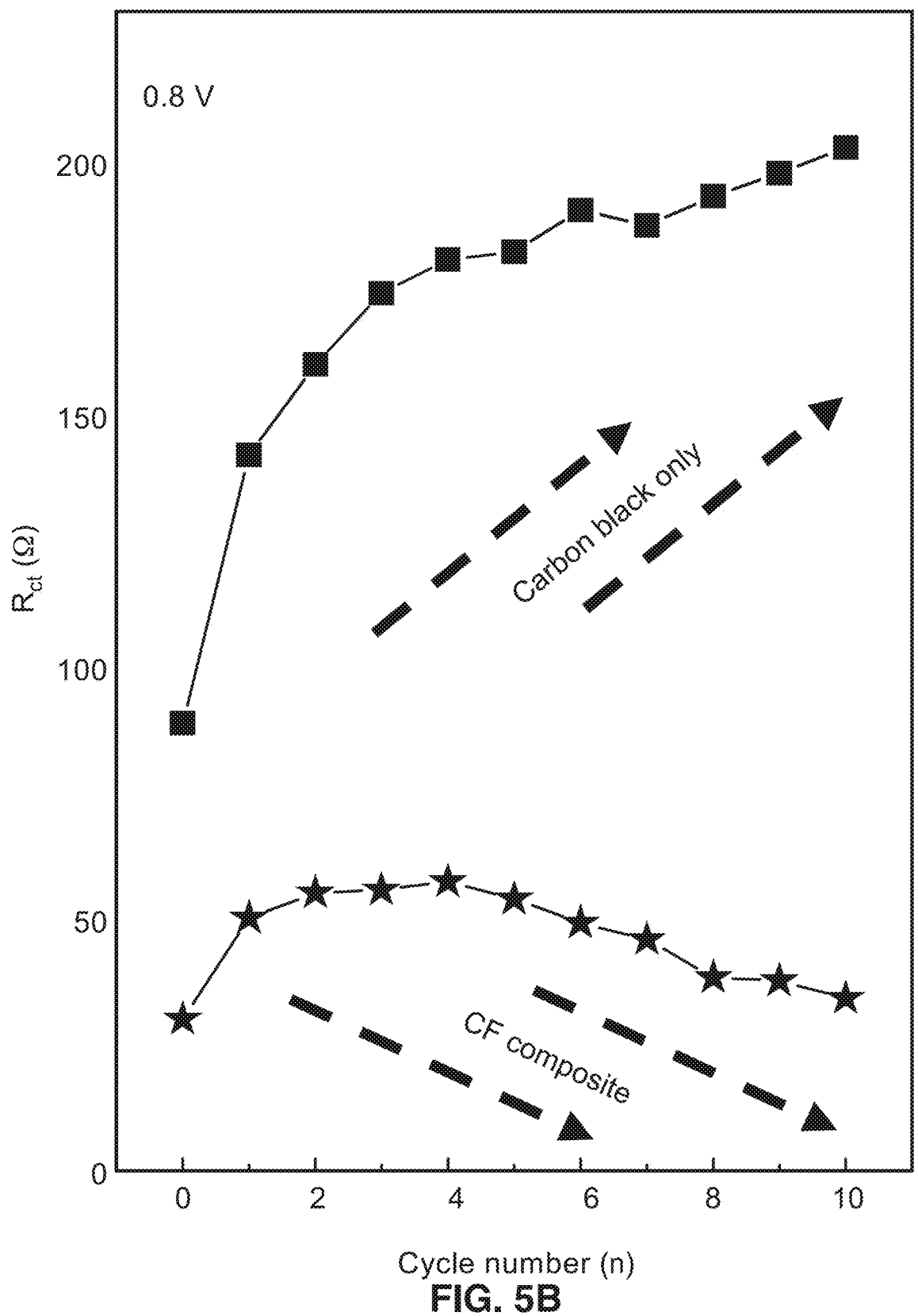

FIG. 5B: Charge transfer resistance of ncs-$MoS_2$/carbon fiber based electrodes and ncs-$MoS_2$/carbon black based electrodes during the first 10 formation cycles calculated from the Nyquist plots collected at 0.8 V vs. Li/Li$^+$.

Figure 5C:
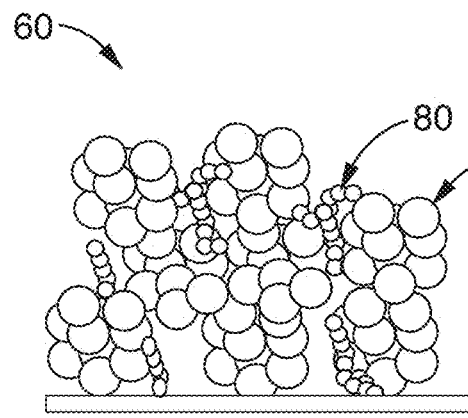
Figure 5D:
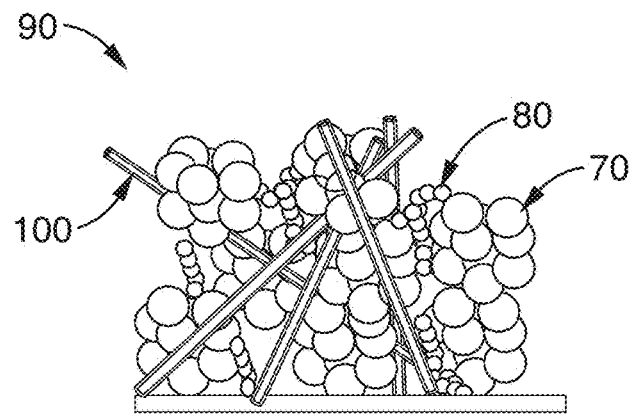

FIG. 5C and FIG. 5D: Schematic representations of the possible origins of the limited kinetics in ncs-$MoS_2$ and carbon black based electrodes, and ncs-$MoS_2$/carbon fiber based electrodes, respectively.

Figure 6A:
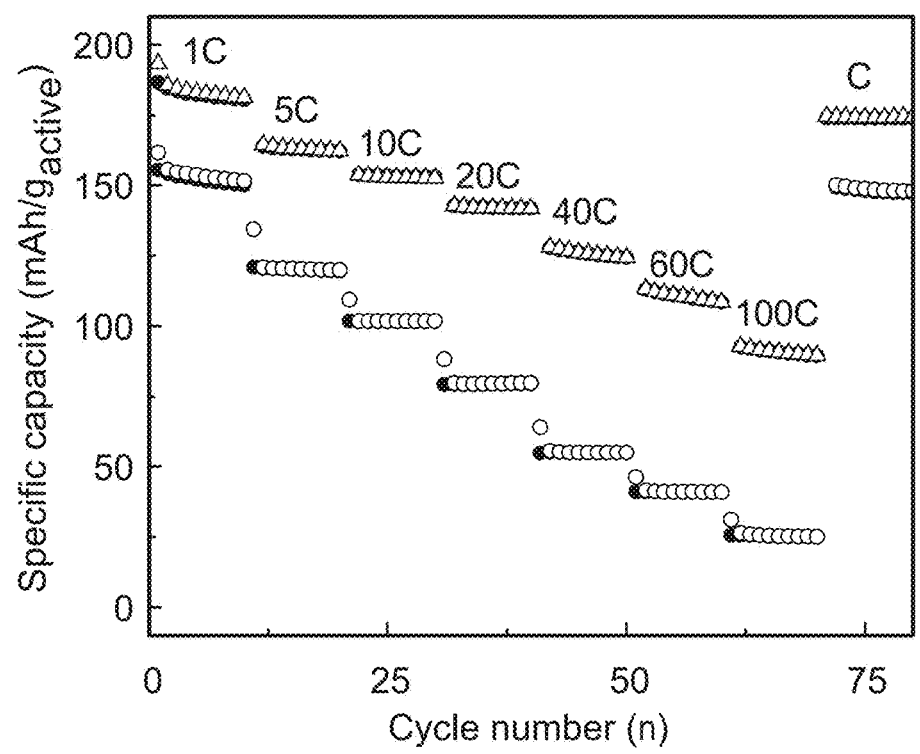

FIG. 6A: Kinetic analysis comparing b-$MoS_2$ to the ncs-$MoS_2$ in the optimized carbon fiber based electrodes FIG. 6B and FIG. 6C: Galvanostatic lithium insertion and deinsertion profiles at different current densities of b-$MoS_2$ and ncs-$MoS_2$, respectively.

Figure 7A:
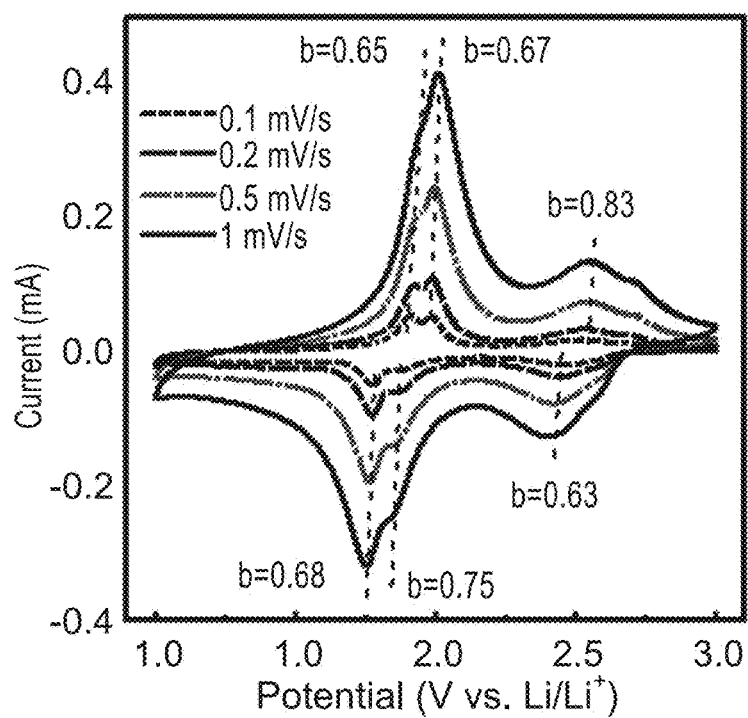
Figure 7B:
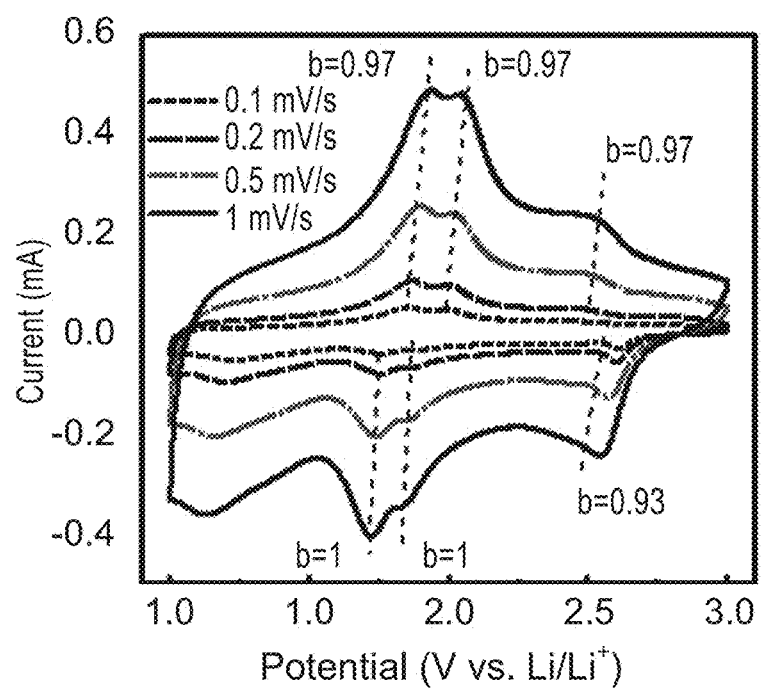

FIG. 7A and FIG. 7B: Analysis of the nature of the charge storage in the current maxima "b-value analysis" for b-$MoS_2$ and ncs-$MoS_2$, respectively.

Figure 7C:
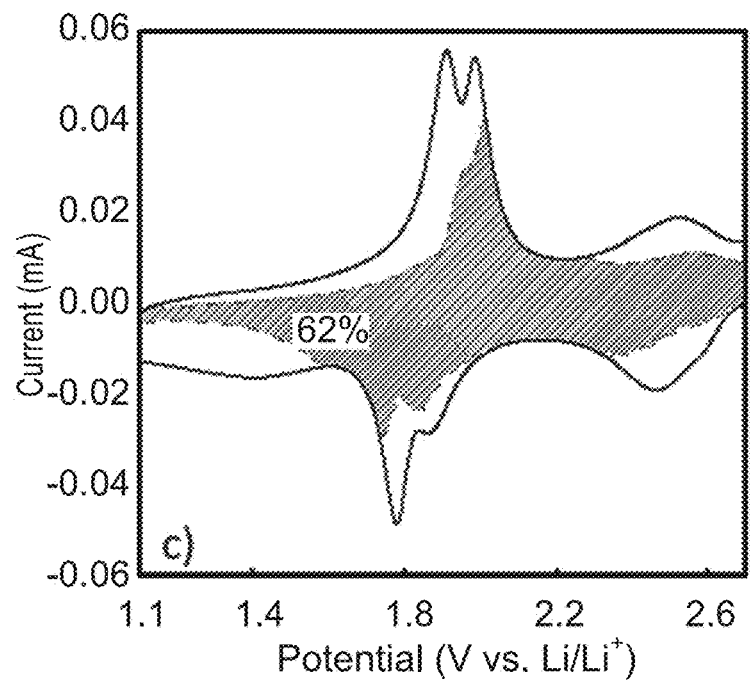
Figure 7D:
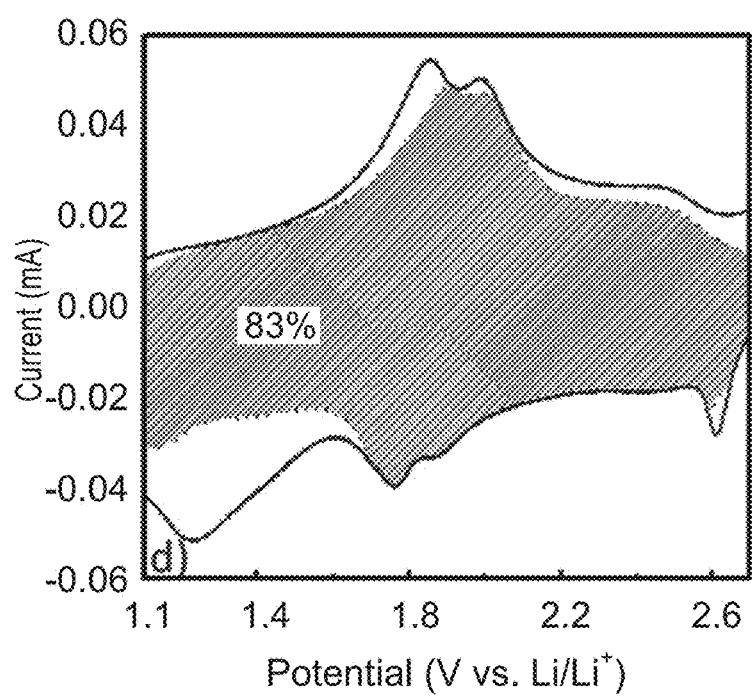

FIG. 7C and FIG. 7D: Quantification of the capacitive and diffusion charge storage in b-$MoS_2$ and ncs-$MoS_2$, respectively, as a function of voltage.

Figure 8:
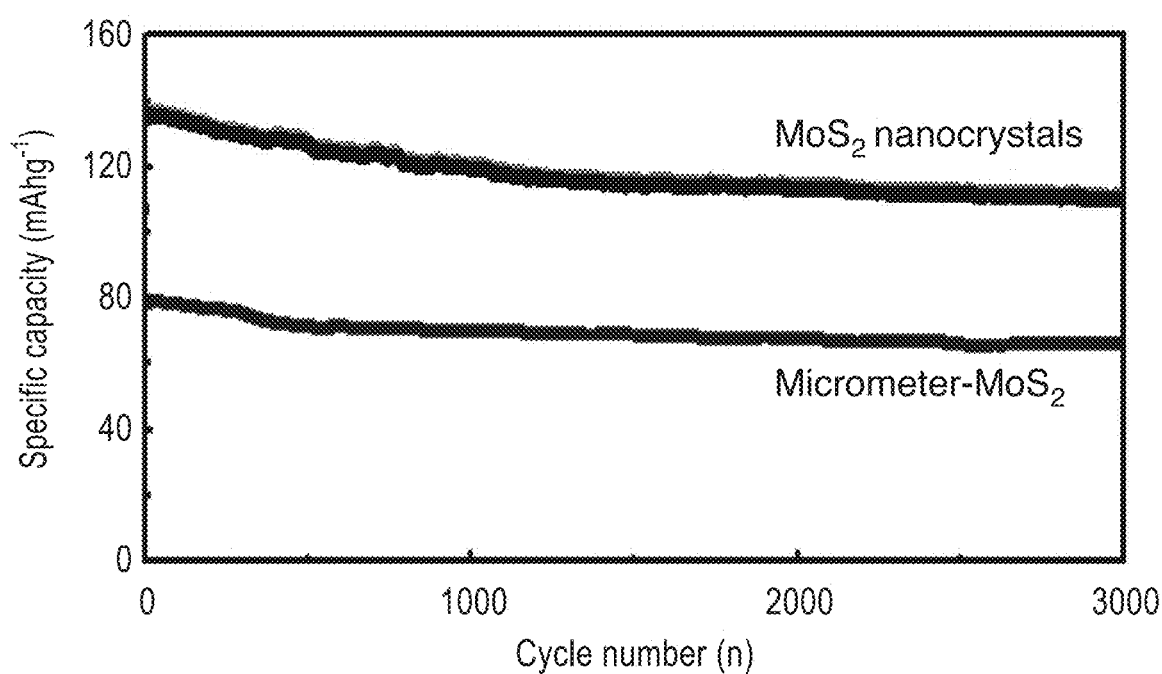

FIG. 8: Cycle lifetime of ncs-$MoS_2$ and b-$MoS_2$ at 20C after the kinetic analysis study (1C-100C).

Figure 9A:
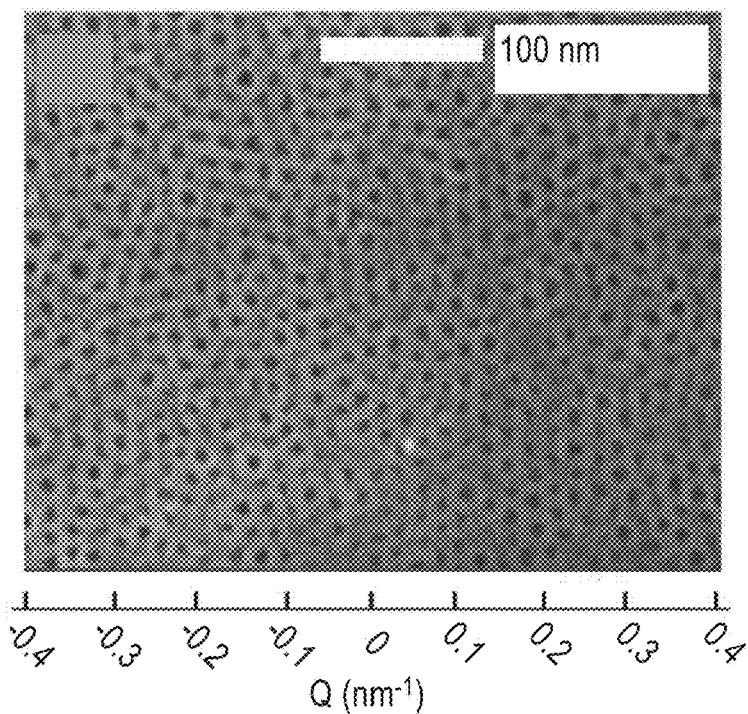
Figure 9B:
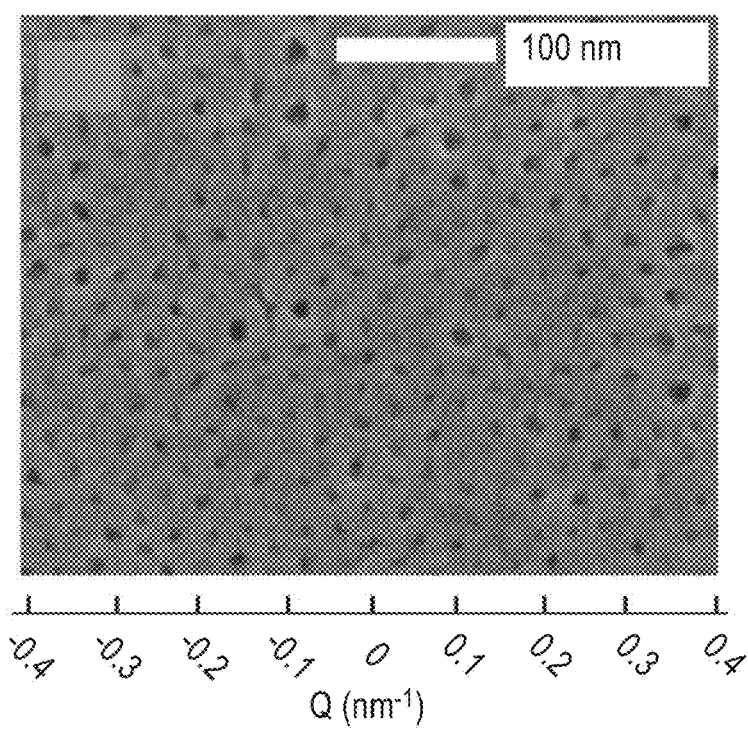

FIG. 9A and FIG. 9B: SEM images of the surface of a mesoporous $MoO_2$ film and a mesoporous $MoS_2$ thin film, respectively.

Figure 9C:
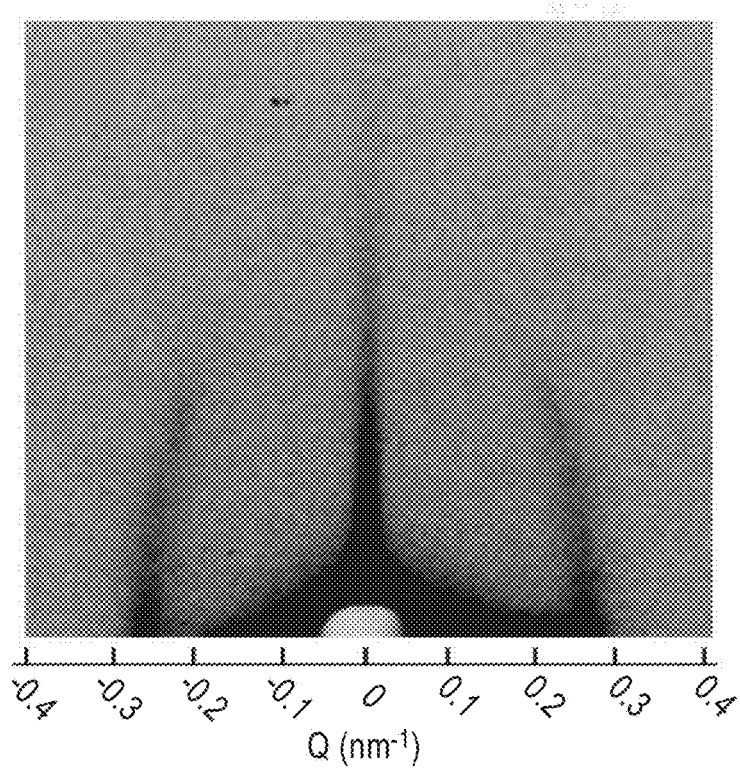
Figure 9D:
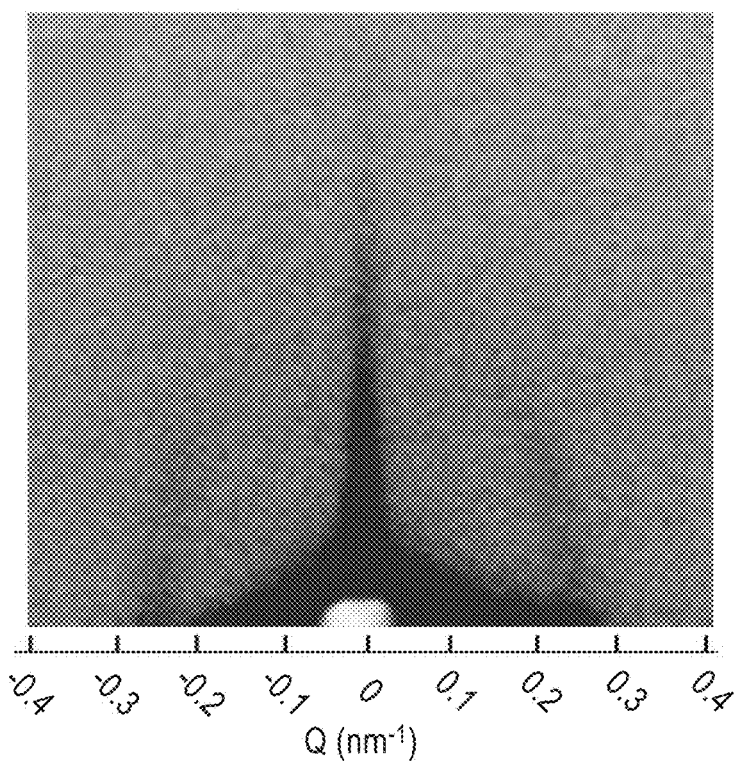

FIG. 9C and FIG. 9D: Synchrotron based 2-D grazing incidence small angle X-ray scattering (GISAX) patterns for $MoO_2$ and $MoS_2$ thin films, respectively.

Figure 10A:
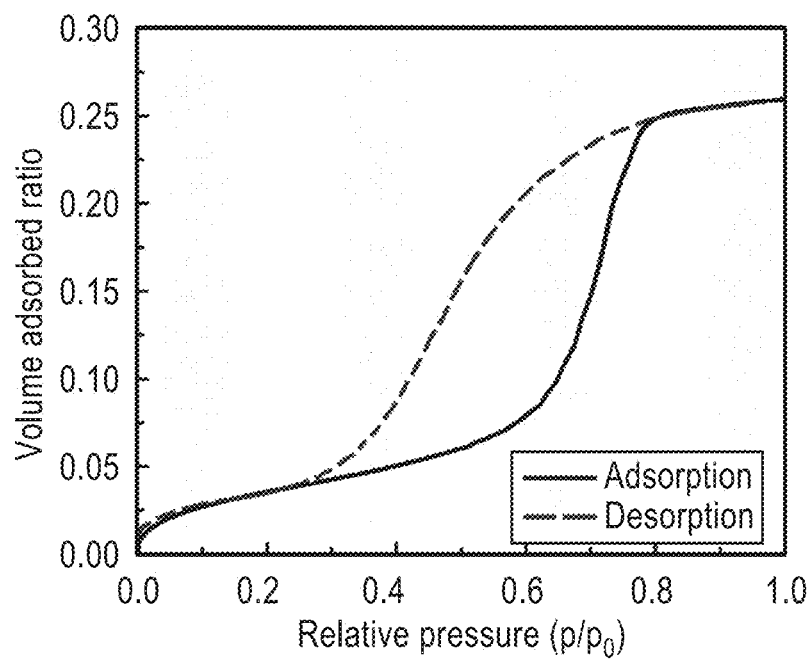
Figure 10B:
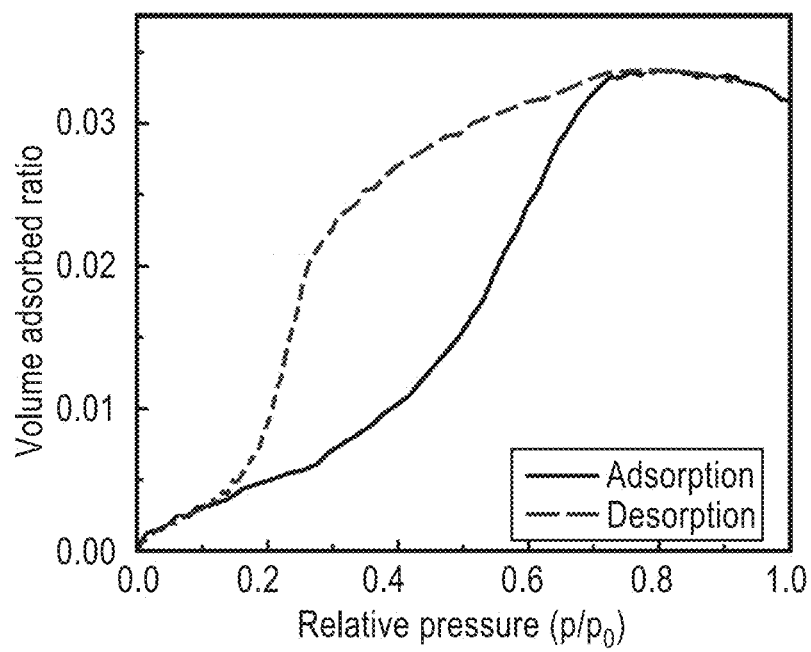
Figure 10C:
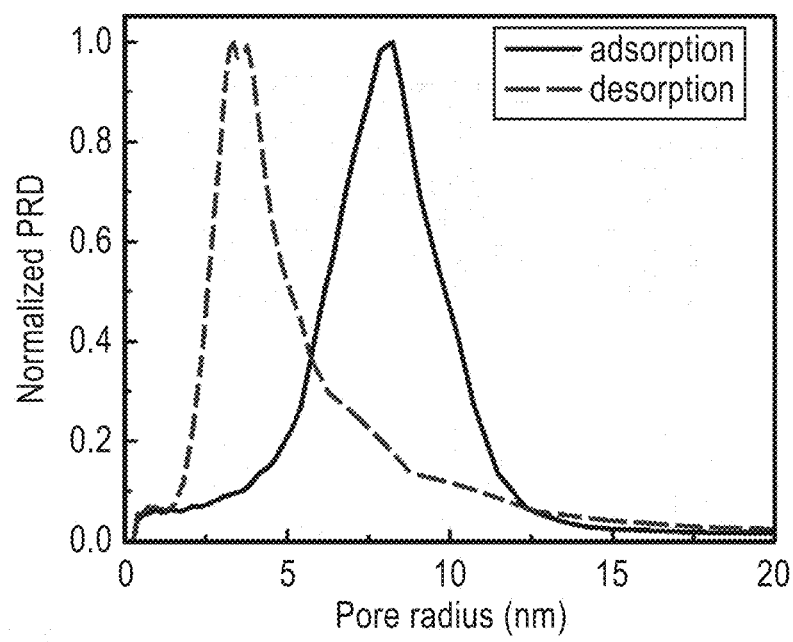
Figure 10D:
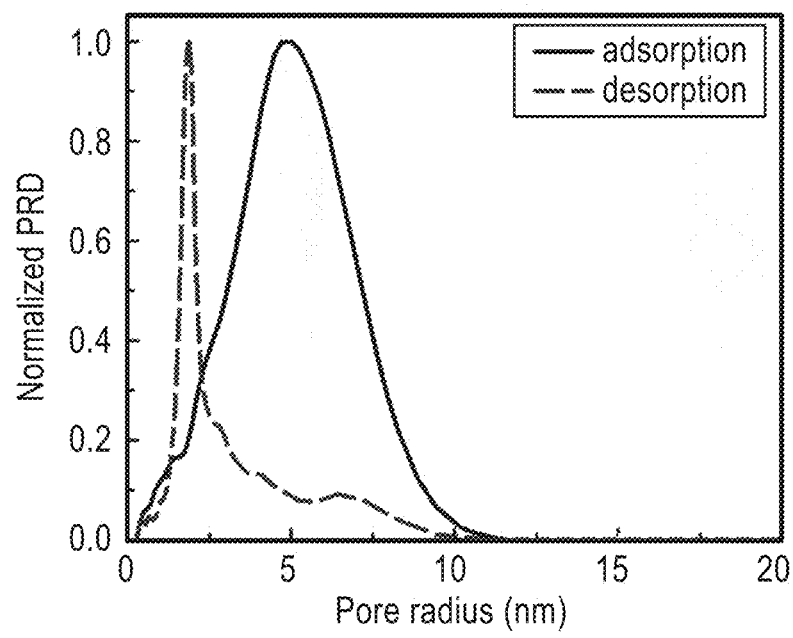

FIG. 10A through FIG. 10D: Toluene adsorption-desorption isotherms and pore size distributions calculated from the isotherms from data obtained on $MoO_2$ thin films (FIG. 10A and FIG. 10C), and mesoporous $MoS_2$ thin films (FIG. 10B and FIG. 10D).

Figure 11A:
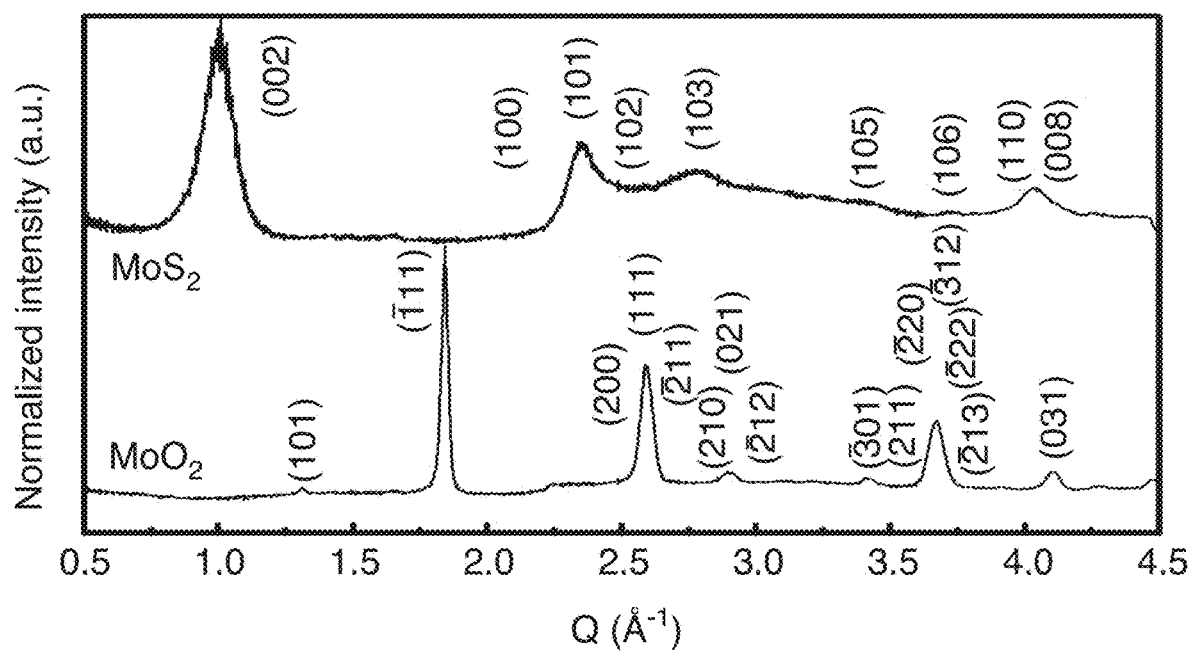

FIG. 11A: Integrated synchrotron based grazing incidence wide angle X-ray scattering (GIWAX) pattern obtained on $MoO_2$ and $MoS_2$.

Figure 11B:
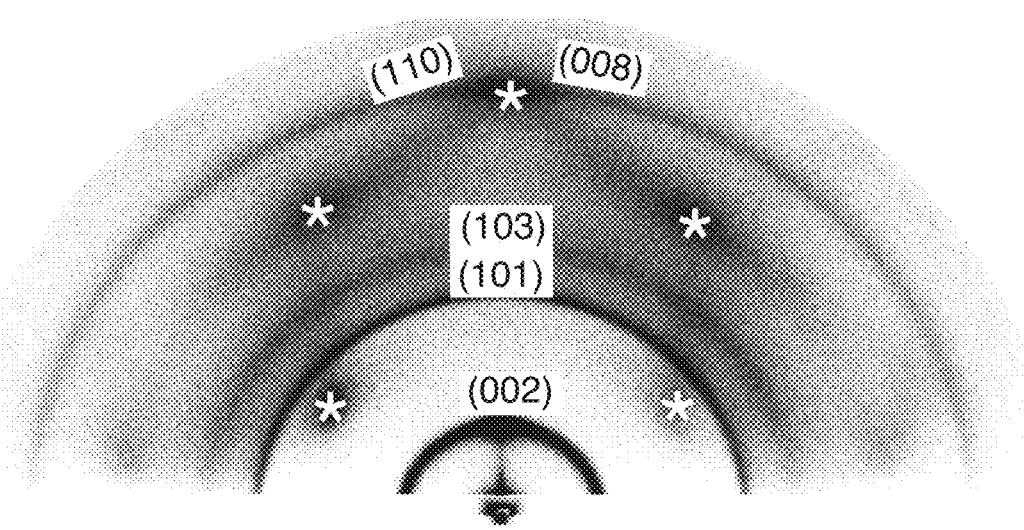

FIG. 11B: Example of the raw 2D data for the mp-$MoS_2$ sample.

Figure 11C:
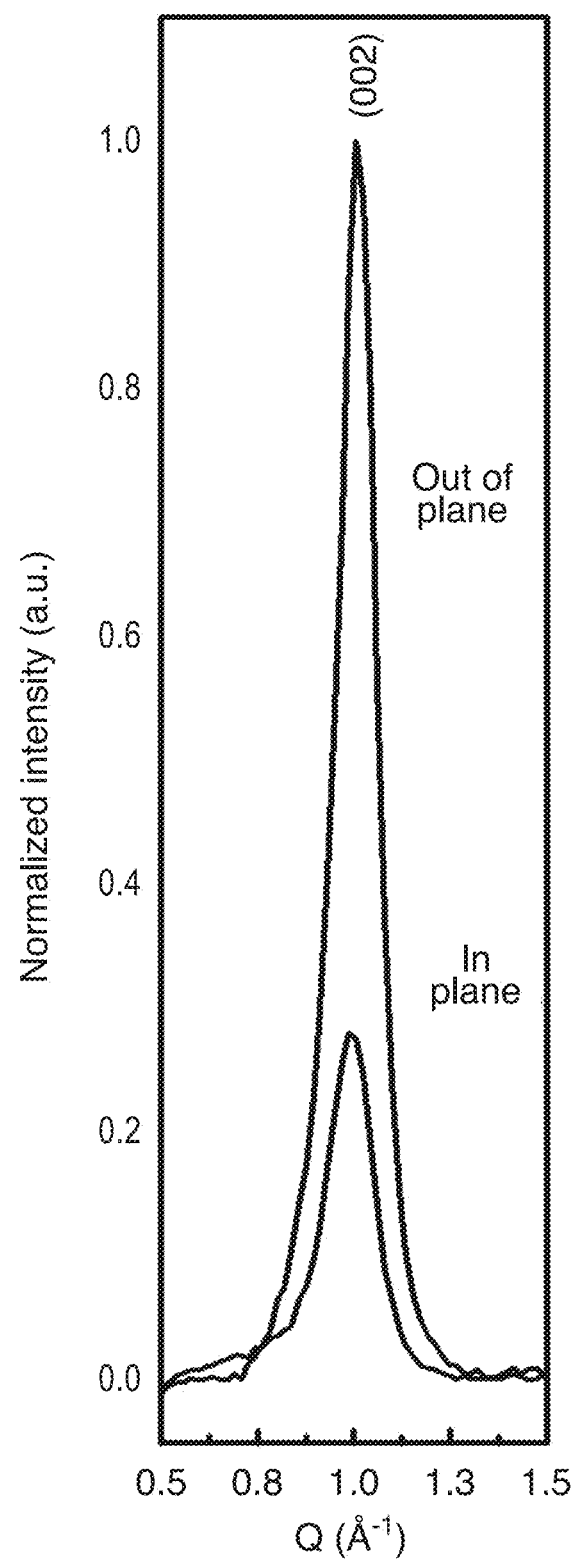

FIG. 11C: Integrated slices of the mp-$MoS_2$ (002) peaks obtained by integrating over a 10° wedge centered at either 90° or 180° to show the in-plane and out-of-plane diffraction contributions.

Figure 12A:
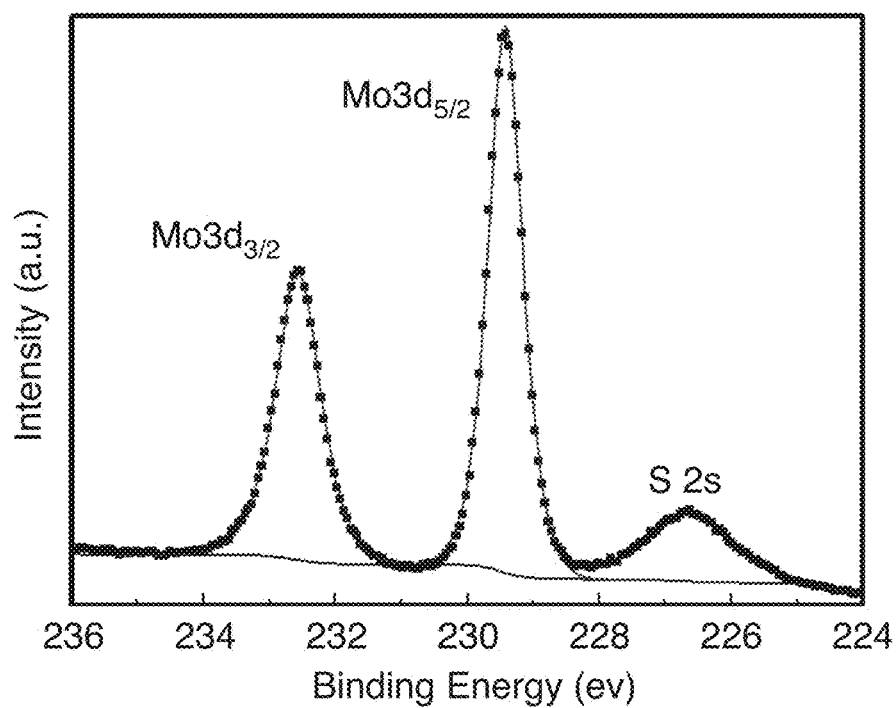
Figure 12B:
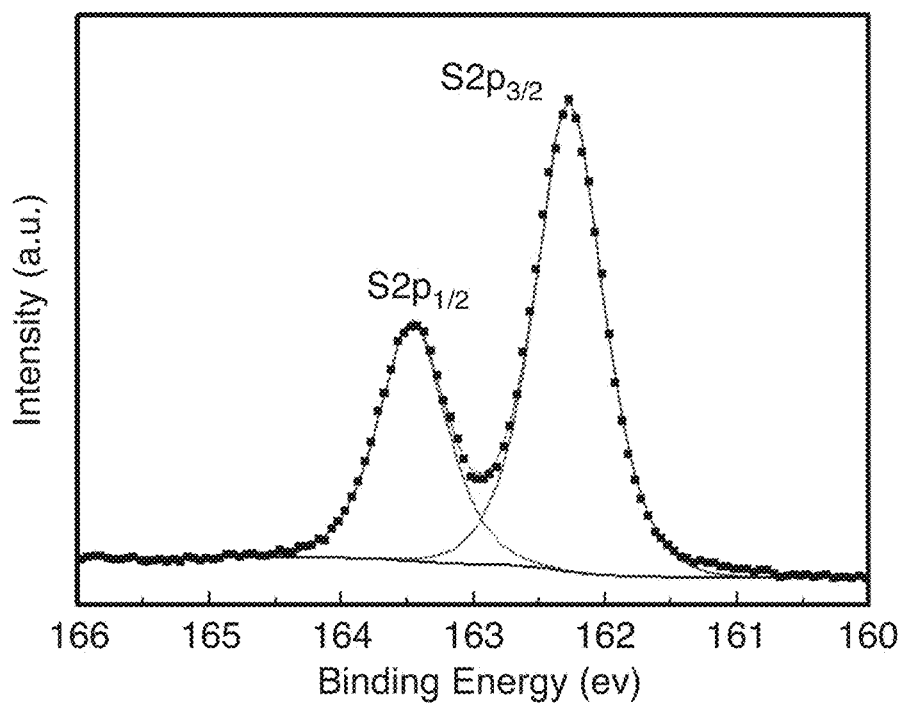

FIG. 12A and FIG. 12B: High resolution XPS data obtained on mp-$MoS_2$ in the molybdenum and sulfur regions, respectively.

Figure 12C:
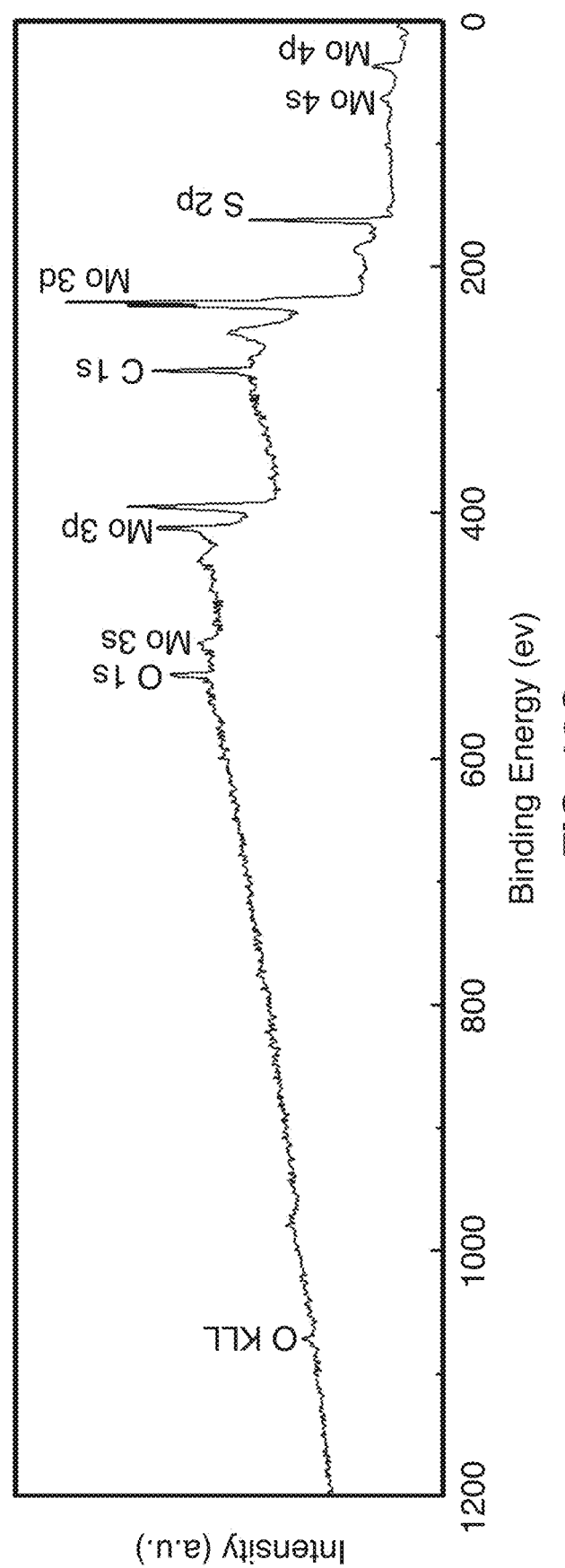

FIG. 12C: Survey scan of the mp-$MoS_2$.

Figure 13A:
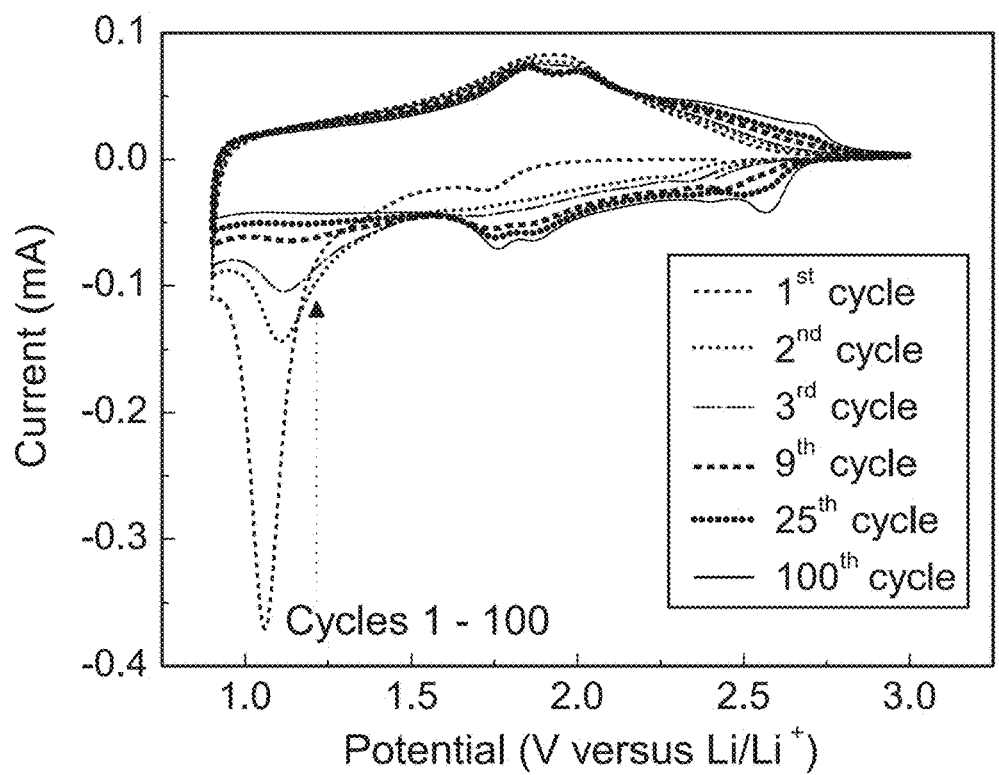

FIG. 13A: Cyclic voltammograms collected at 5 $mVs^{-1}$ over the first 100 cycles for a mp-$MoS_2$ film.

Figure 13B:
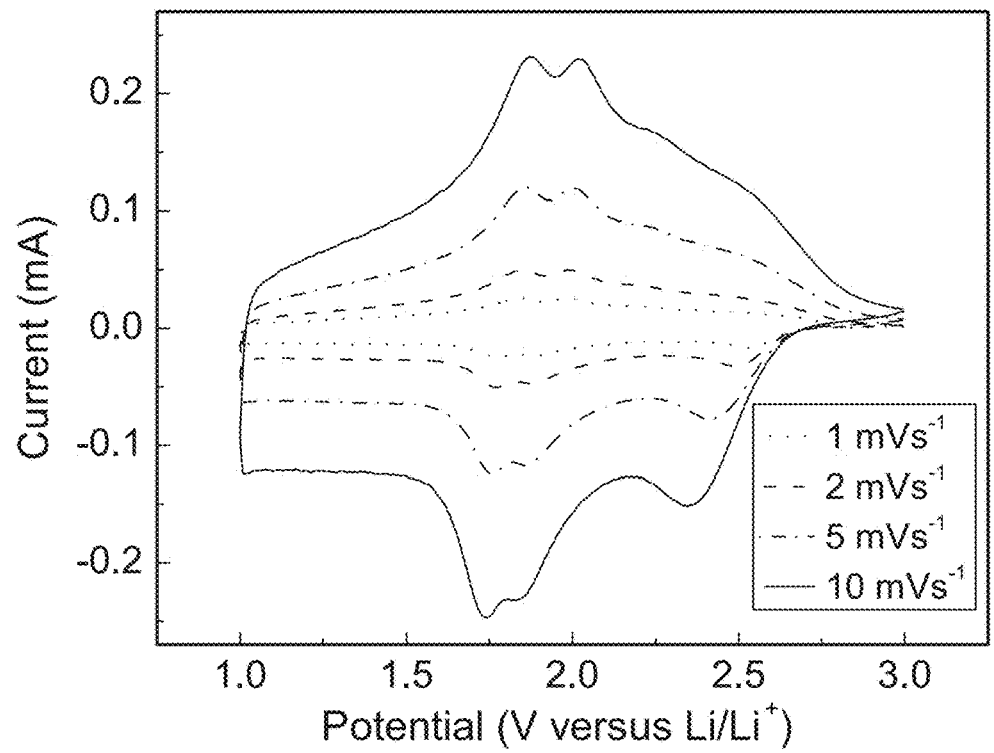

FIG. 13B: Cyclic voltammograms collected at scan rates ranging from 1 to 10 $mVs^{-1}$.

Figure 13C:
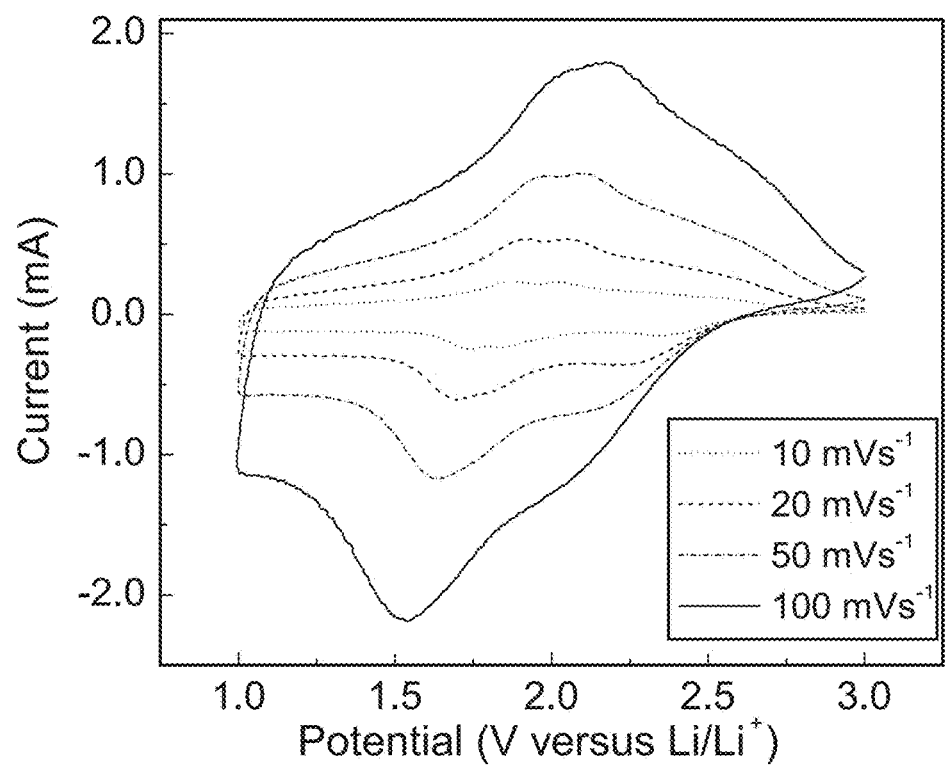

FIG. 13C: Cyclic voltammograms collected at scan rates ranging from 10 to 100 $mVs^{-1}$.

Figure 13D:
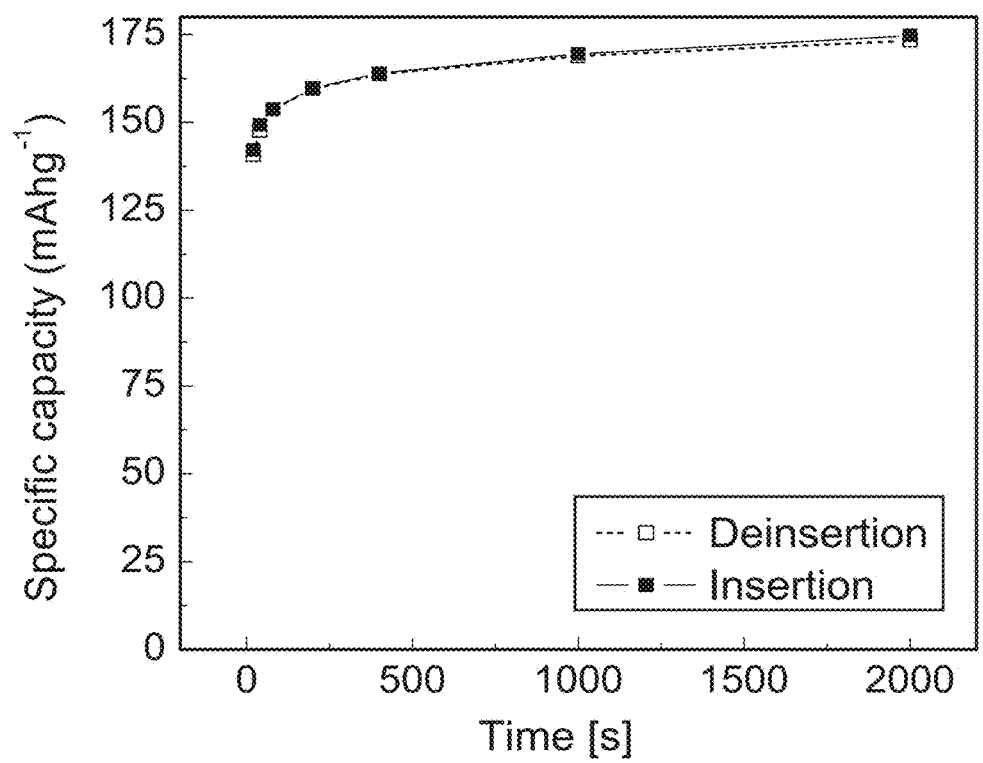

FIG. 13D: Specific capacity versus charge and discharge time.

Figure 13E:
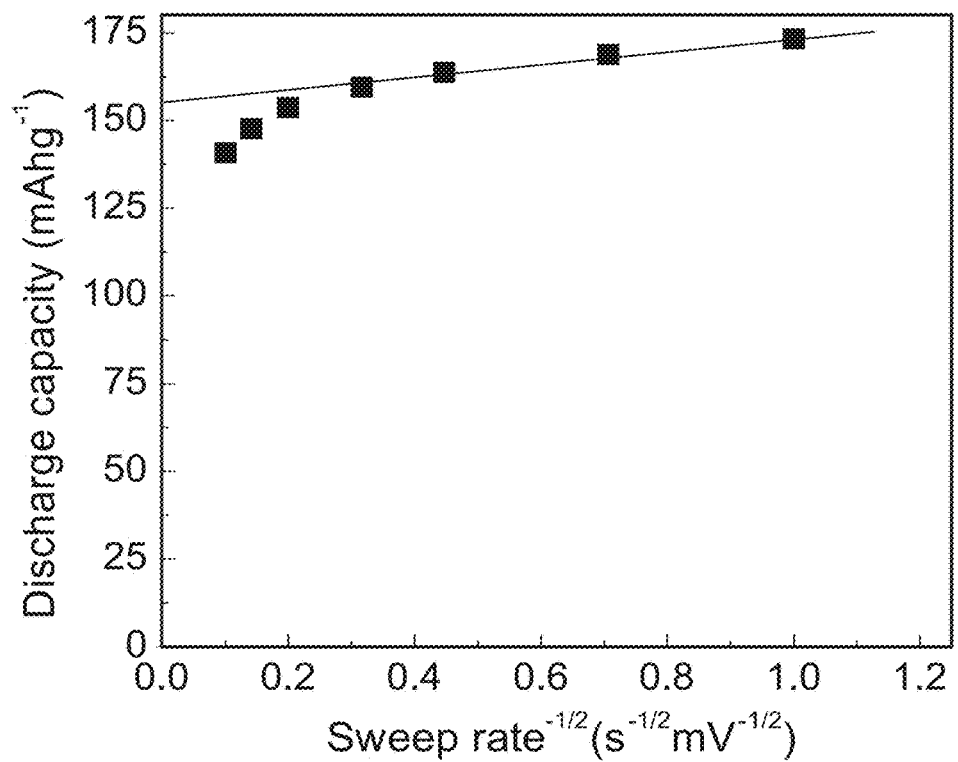

FIG. 13E: Discharge capacity versus $v^{1/2}$, which allows for the determination of diffusion-controlled capacity and capacitive-controlled capacity.

Figure 13F:
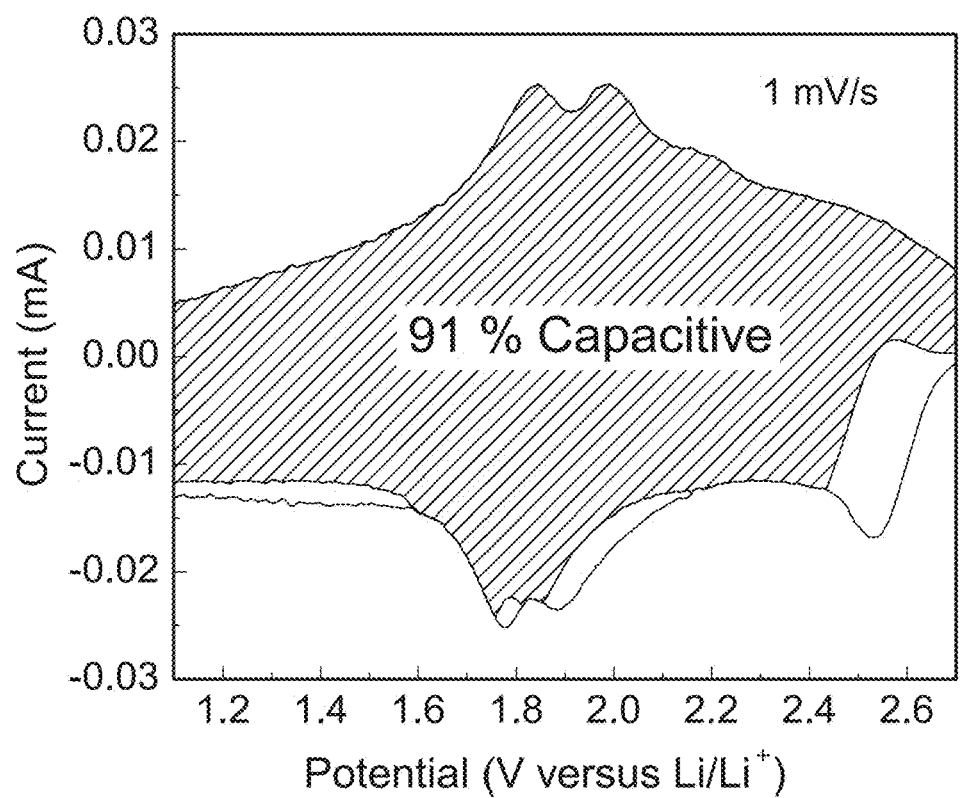

FIG. 13F: Capacitive and diffusion controlled charge storage contributions in mp-$MoS_2$ cycled in a Li-electrolyte at 1 $mVs^{-1}$.

Figure 14:
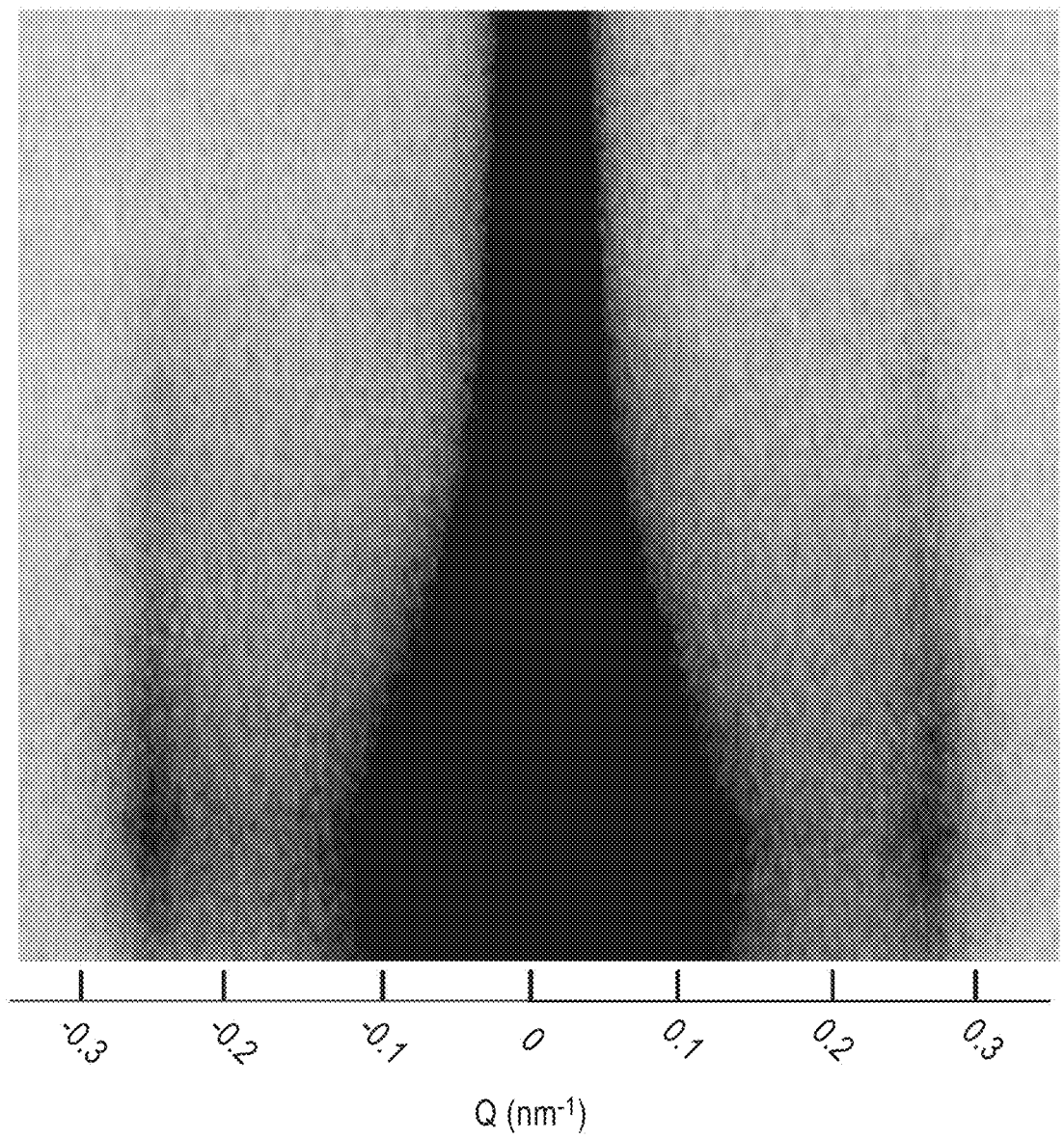

FIG. 14: GISAX image of a mp-$MoS_2$ film, after 9 galvanostatic cycles in a Li electrolyte.

Figure 15A:
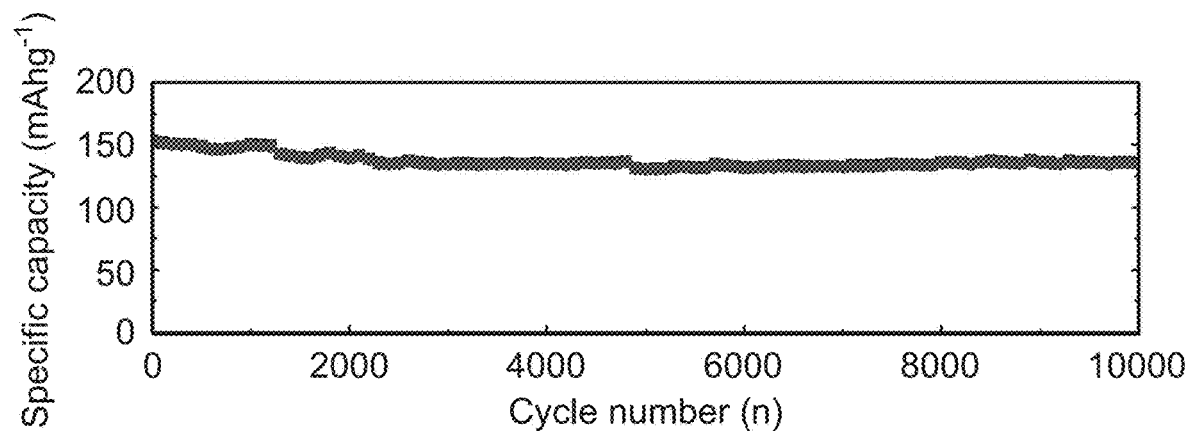

FIG. 15A: Specific capacity versus cycle number for a mp-$MoS_2$ film cycled galvanostatically at 23C in a Li-ion electrolyte.

Figure 15B:
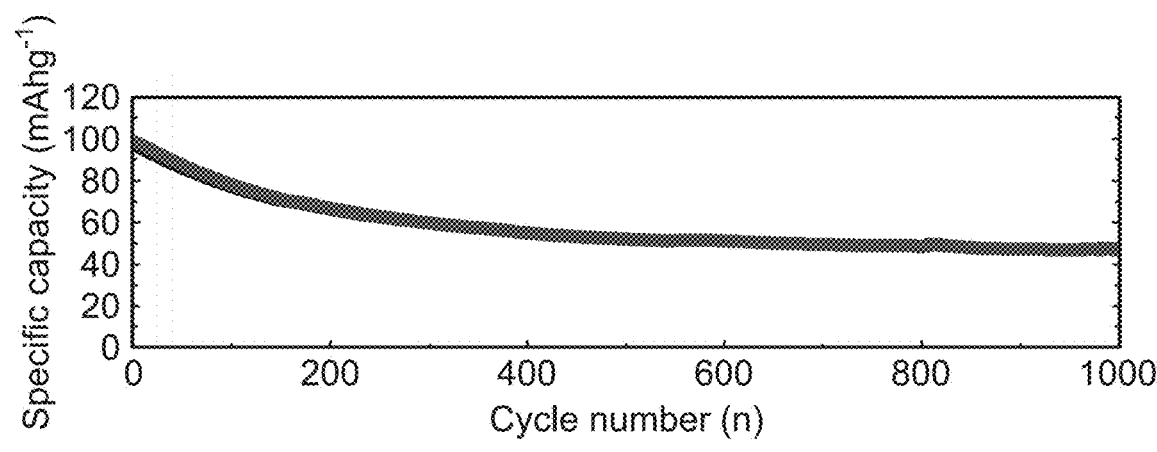

FIG. 15B: Specific capacity versus cycle number for a mp-$MoS_2$ film cycled potentiostatically at 10 $mVs^{-1}$ in a Na-ion electrolyte.

Figure 16A:
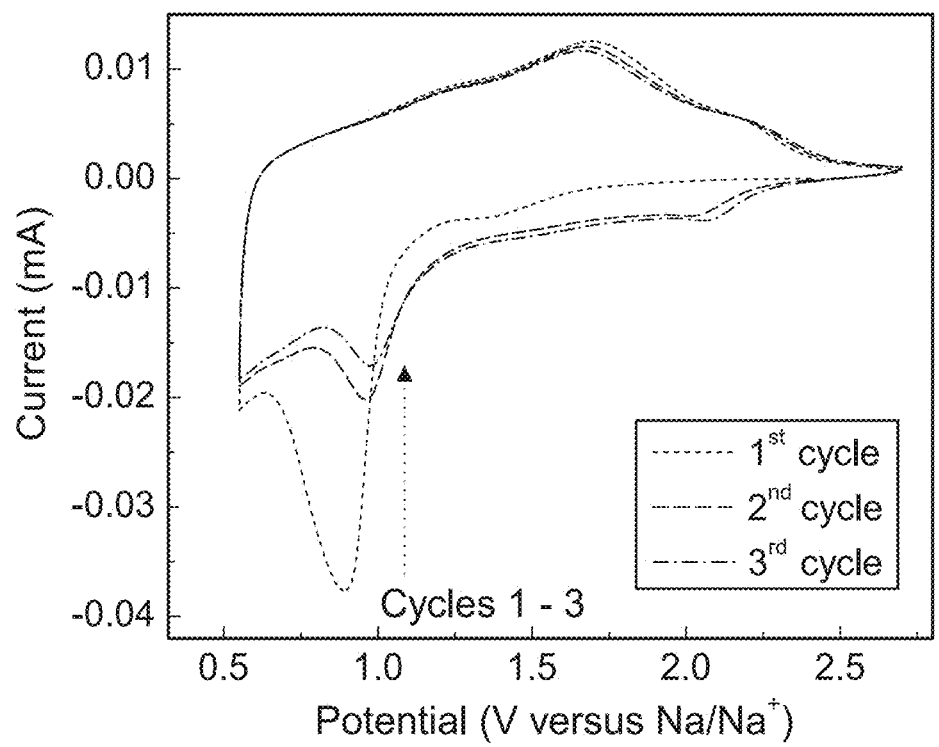

FIG. 16A: Cyclic voltammograms collected at 5 $mVs^{-1}$ for the first three cycles.

Figure 16B:
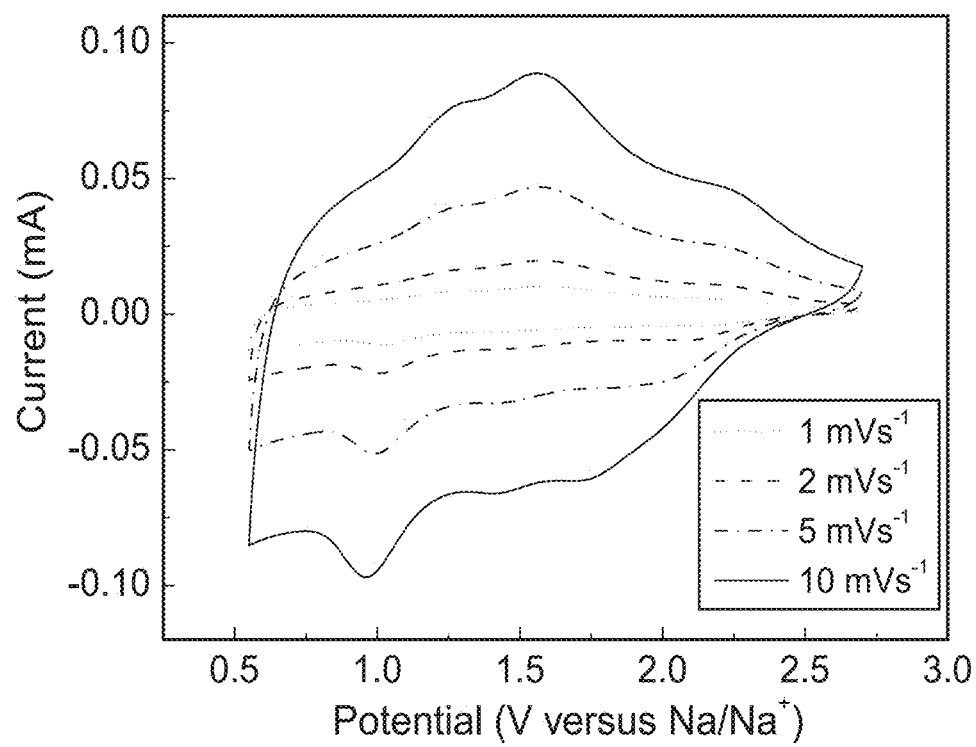

FIG. 16B: Cyclic voltammograms collected at scan rates ranging from 1 to 10 $mVs^{-1}$.

Figure 16C:
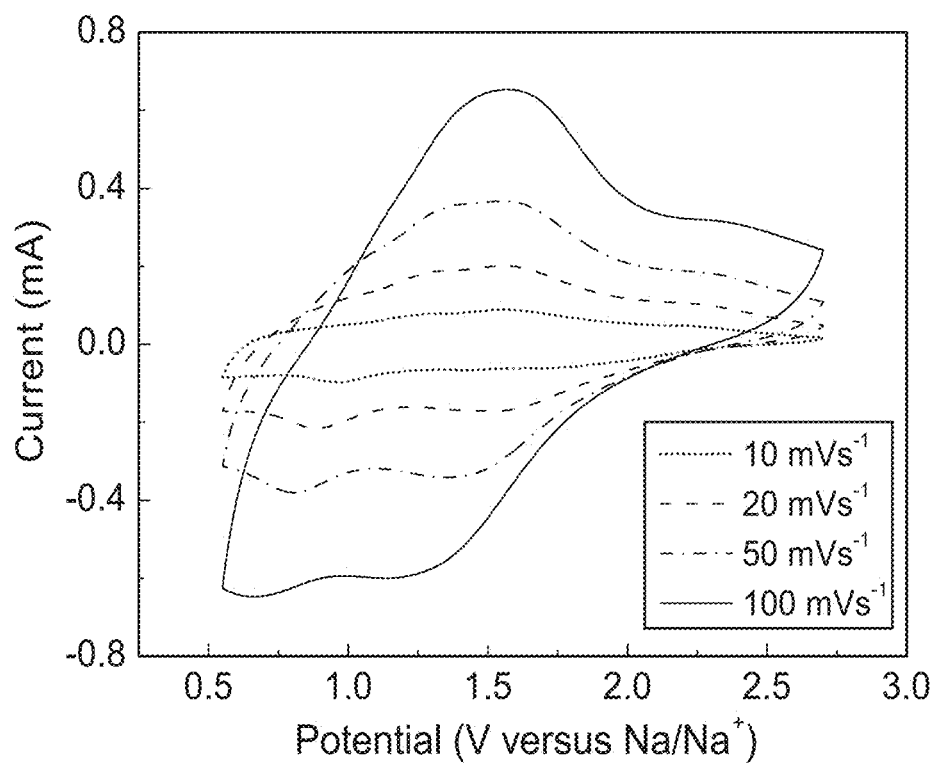

FIG. 16C: Cyclic voltammograms collected at scan rates ranging from 10 to 100 $mVs^{-1}$.

Figure 16D:
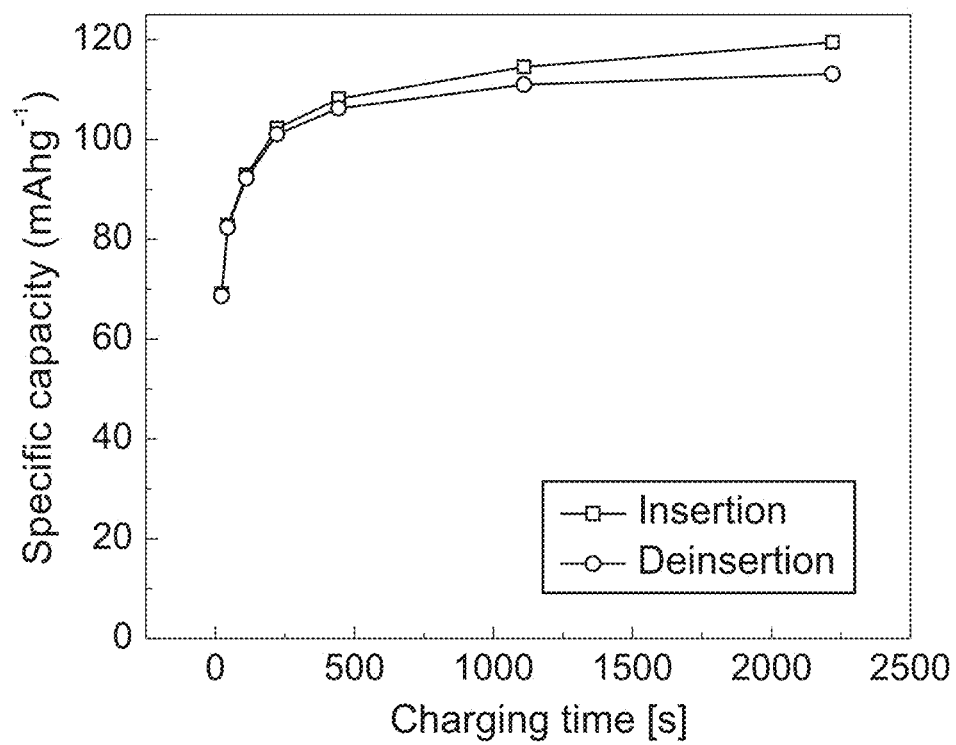

FIG. 16D: Specific capacity versus charge and discharge time.

Figure 16E:
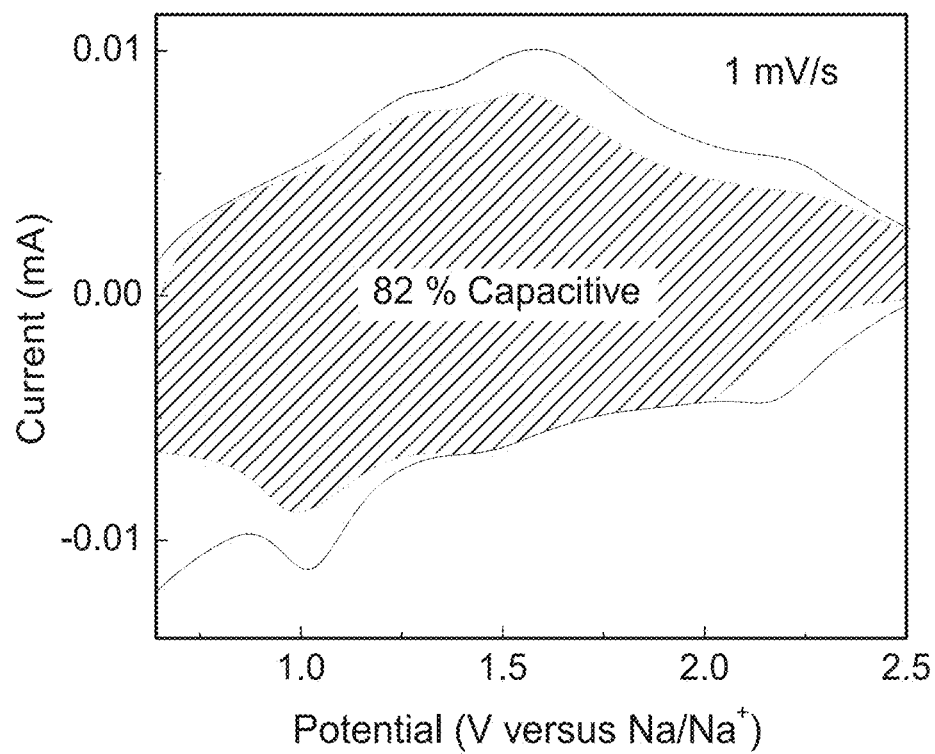
Figure 16F:
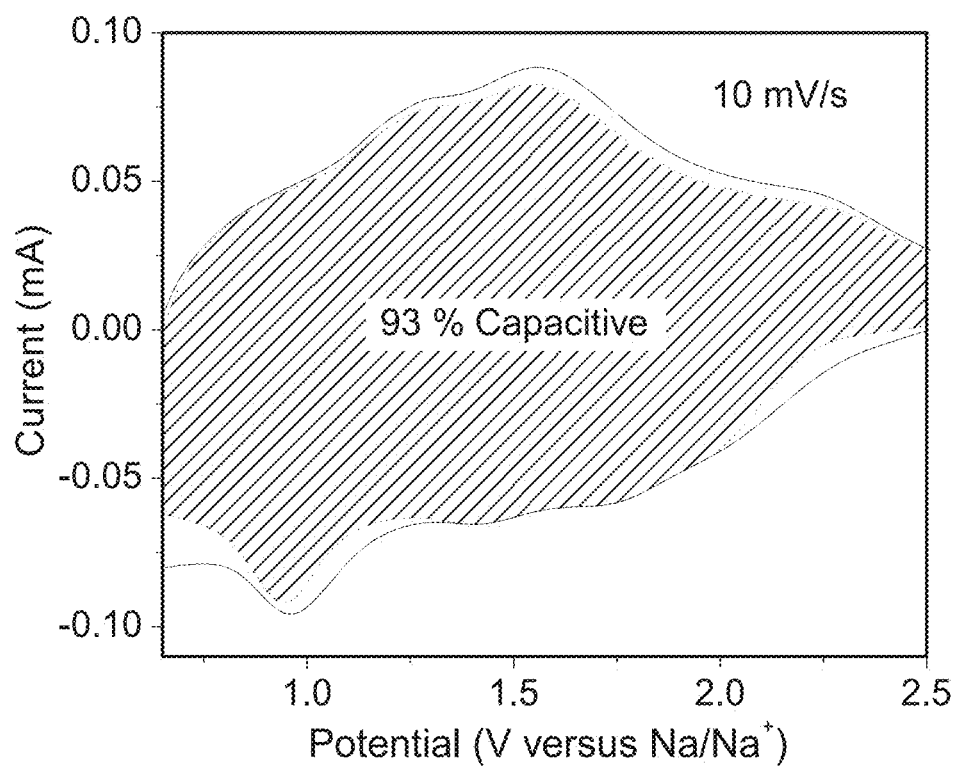

FIG. 16E and FIG. 16F: Capacitive and diffusion-controlled charge storage contributions in mp-$MoS_2$ cycled in Na-electrolyte at 1 and 10 $mVs^{-1}$, respectively.

Figure 17A:
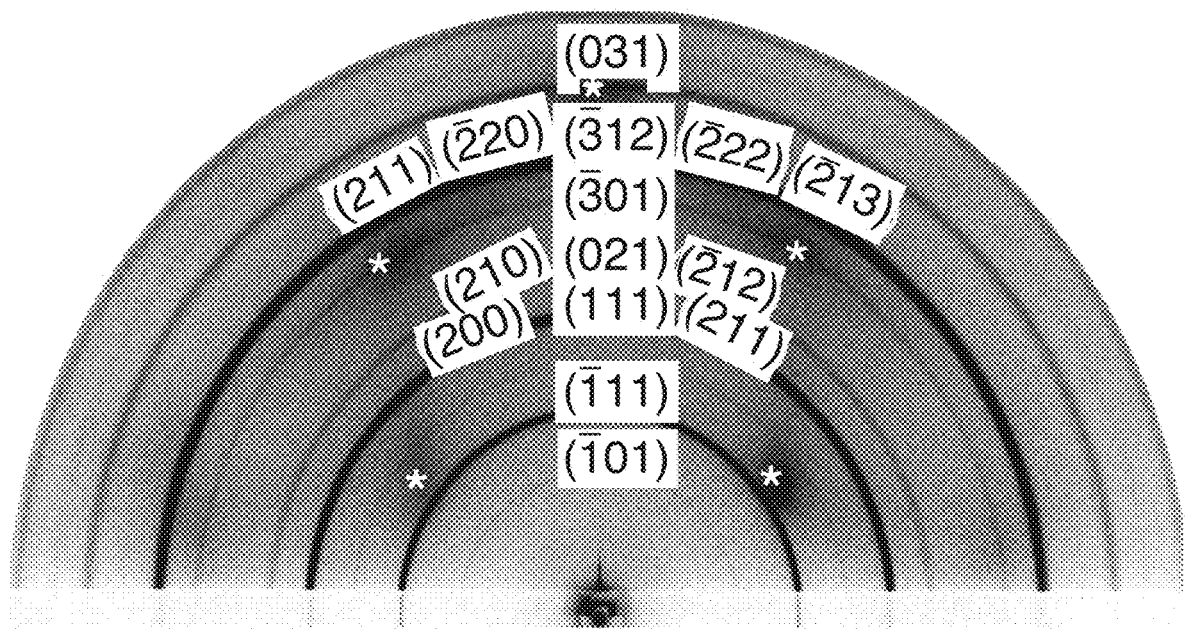
Figure 17B:
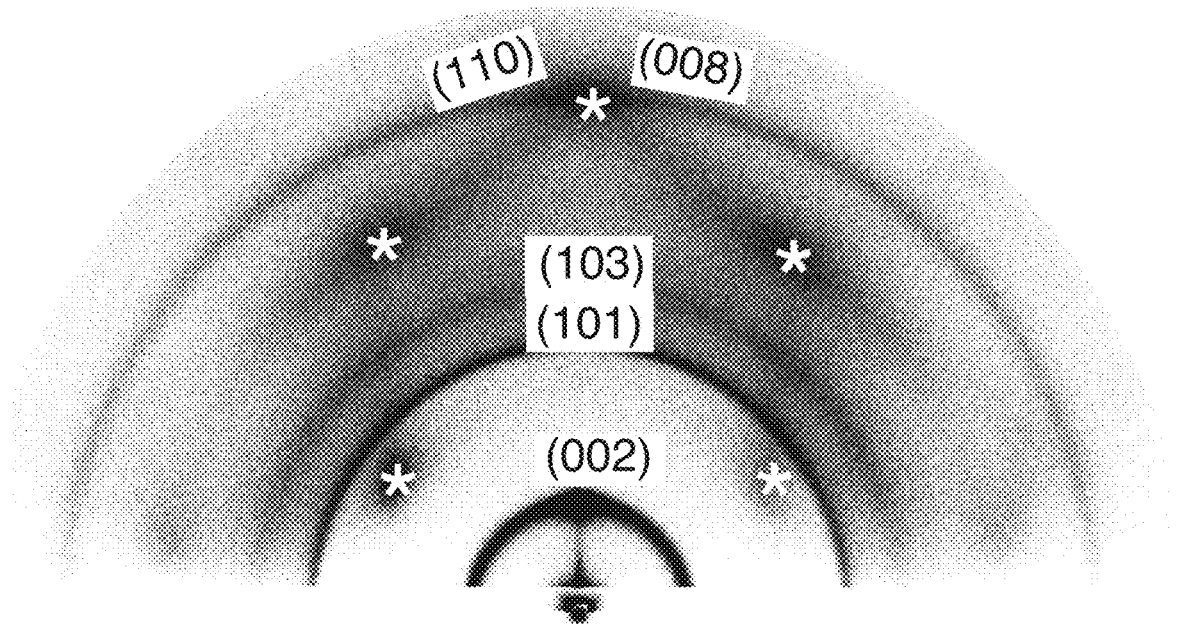

FIG. 17A and FIG. 17B: Two-dimensional grazing incidence wide angle x-ray diffraction patterns of $MoO_2$ and $MoS_2$, respectively.

Figure 18A:
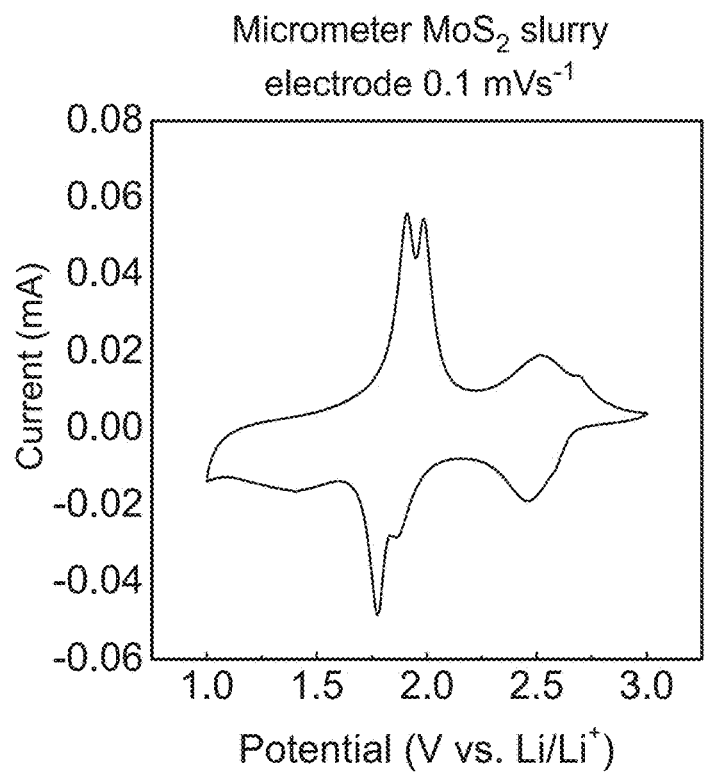
Figure 18B:
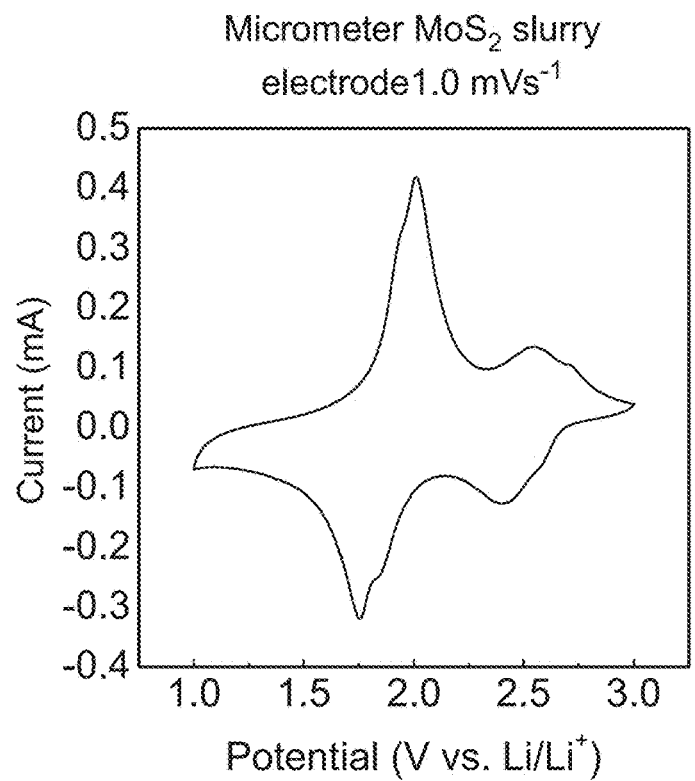
Figure 18C:
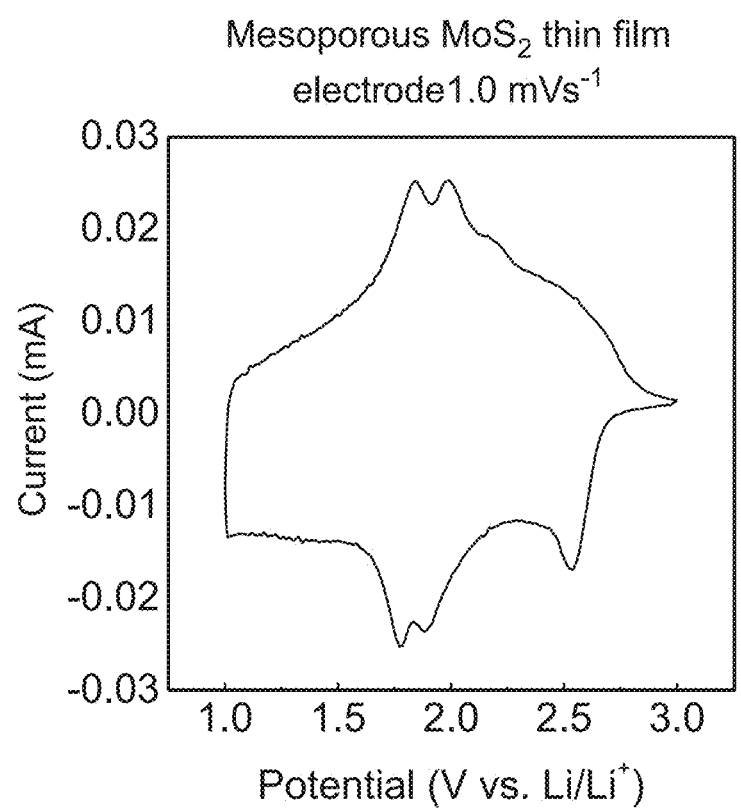

FIG. 18A through FIG. 18C: Cyclic voltammograms of micrometer $MoS_2$ slurry electrodes at 0.1 mVs-1 (FIG. 18A), and 1.0 mVs-1 (FIG. 18B) compared to the mesoporous thin films studied in this work at 1 mVs-1 (FIG. 18C).

Figure 19A:
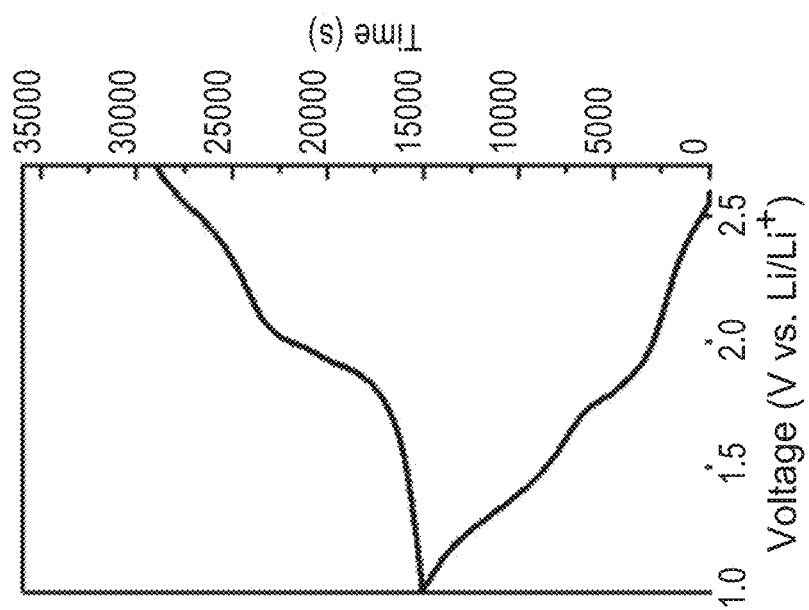
Figure 19B:
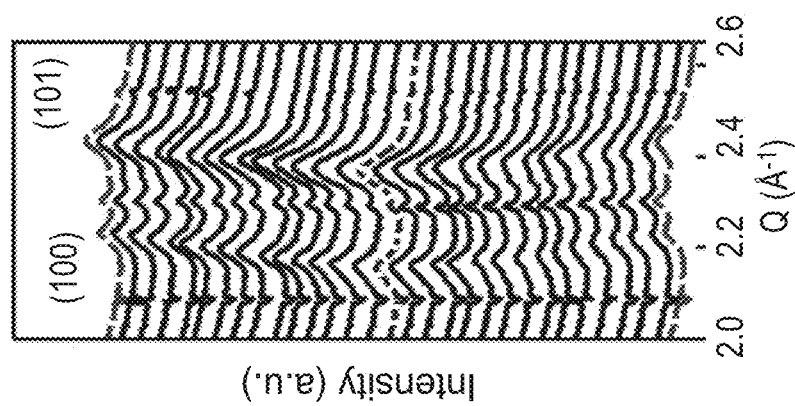
Figure 19C:
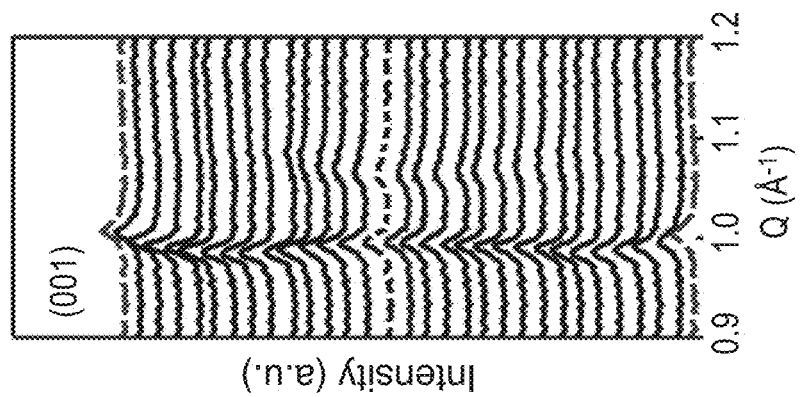

FIG. 19A through FIG. 19C: Operando phase change study of b-$MoS_2$ upon lithium intercalation and deintercalation.

Figure 19F:
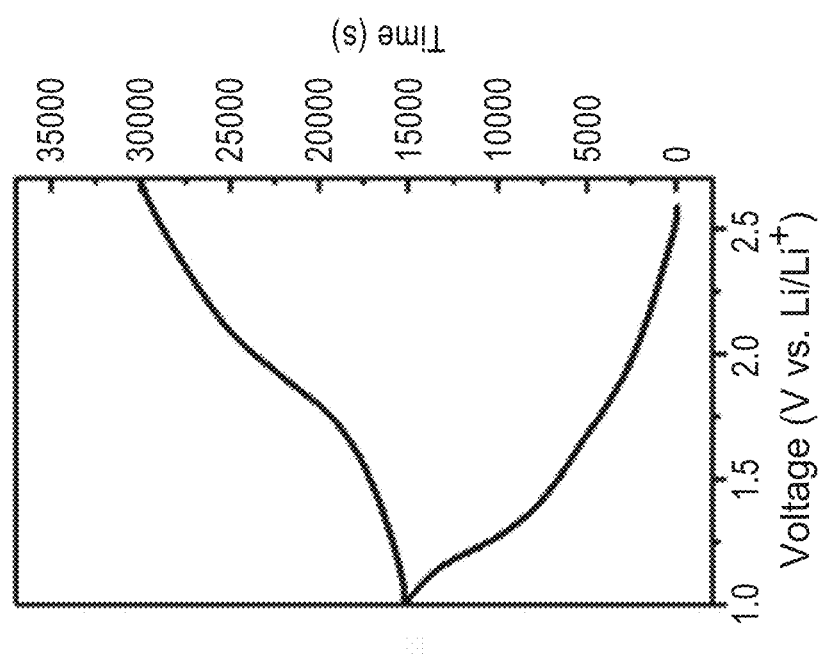
Figure 19E:
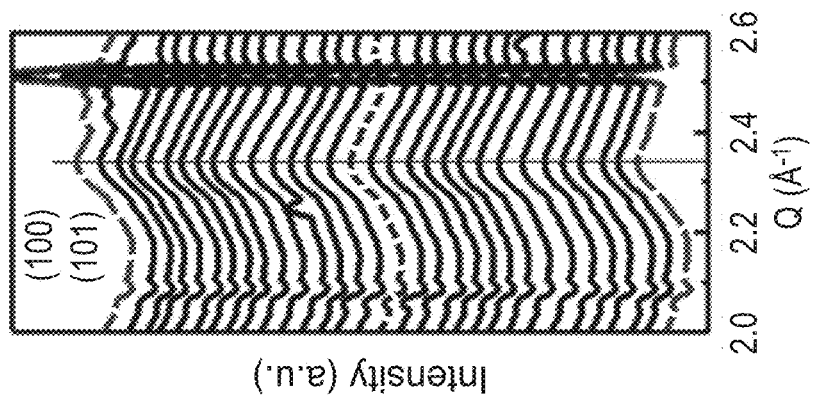
Figure 19D:
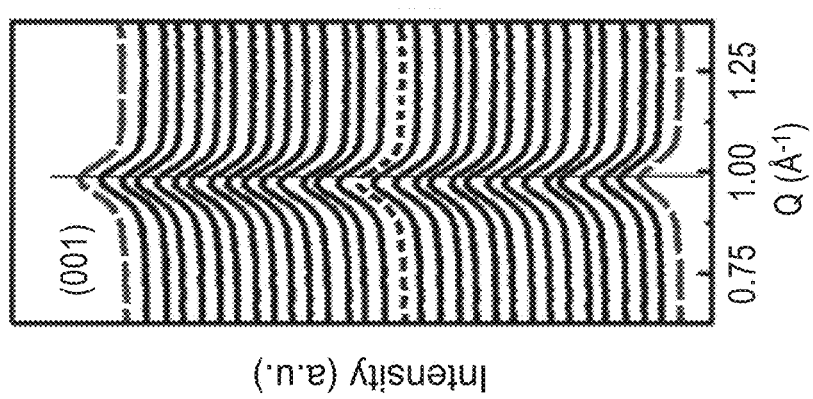

FIG. 19D through FIG. 19F: Operando phase change study of ncs-$MoS_2$ upon lithium intercalation and deintercalation.

FIG. 20A through FIG. 20C: XRD patterns collected during the Na intercalation and deintercalation processes of b-$MoS_2$.

Figure 20D:
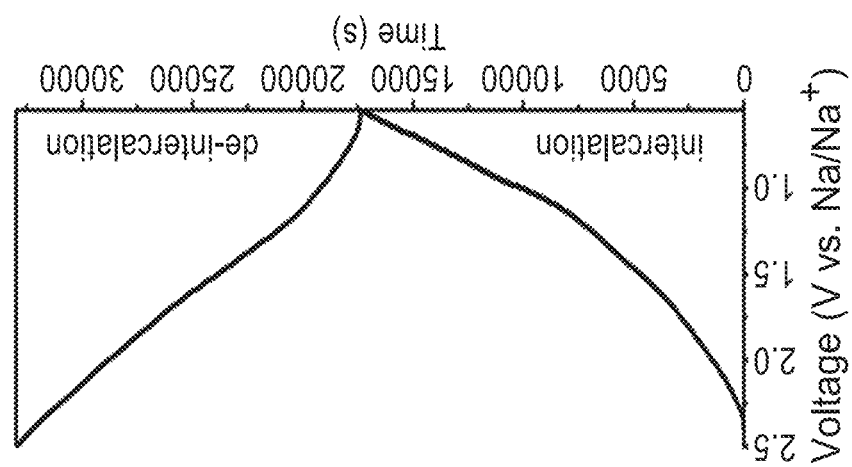
Figure 20E:
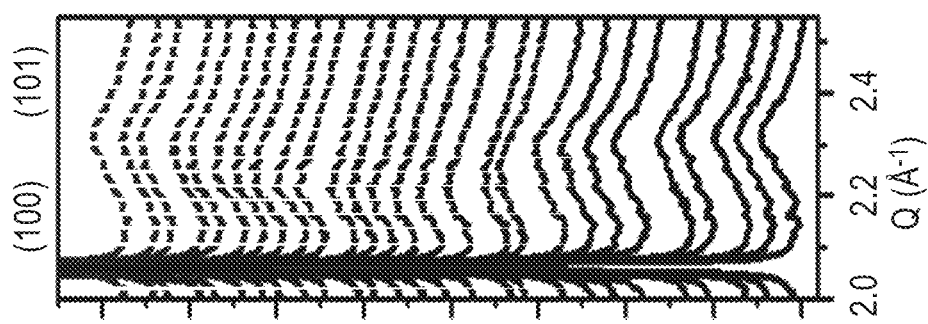
Figure 20F:
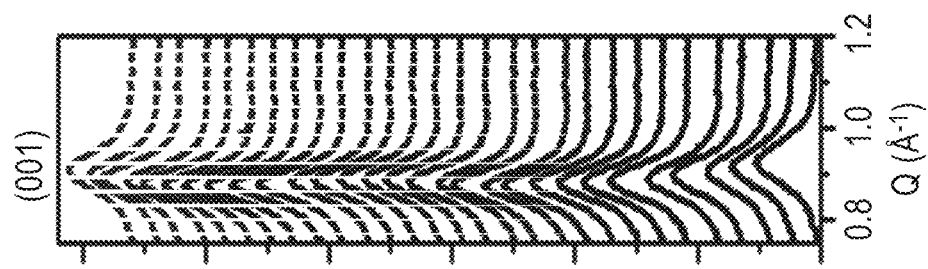

FIG. 20D through FIG. 20F: XRD patterns collected during the Na intercalation and deintercalation processes of ncs-$MoS_2$.

DETAILED DESCRIPTION

1. General.

This disclosure describes the synthesis of highly defected nanocrystals with expanded atomic spacing and their use in high rate energy applications. For purposes of this disclosure, the term "nano" means less than about 100 nm. The term "highly defected" as used in this disclosure means that the layer spacing is larger than the spacing in perfect crystals. In addition, highly defected crystals according to this disclosure preferably have "frayed ends" which provide access to the interlayer crystals of the same material (e.g., access to the edges of the layer). In other words, some layers just stop and the edges have pores which give rise to the frayed ends. Increased surface area at least in part leads to a pseudocapacitive charge storage mechanism.

In one embodiment, the technology comprises synthetic metal dichalcogenides having a highly defected nanocrystalline layered structure, wherein layer spacing is larger than in perfect crystals of the same material, wherein the defected structure provides access to interlayer crystals of the same material, and wherein the defected structure facilitates a pseudocapacitive charge storage mechanism.

In various embodiments, the metal dichalcogenide can be a transition metal disulphide, diselelnide, and ditelluride, or mixed transition metal combinations thereof.

In various embodiments, the metal dichalcogenide can be $MoS_2$, $NbS_2$, $TaS_2$, $TiS_2$, or $VS_2$.

In various embodiments, the defected structure is receptive to intercalation of ions selected from the group consisting of Li ions, Na ions, Mg ions, and Ca ions.

In various embodiment, the metal dichalcogenide does not undergo a phase transition upon intercalation of Li ions, Na ions, Mg ions, or Ca ions.

In various additional embodiments, the technology can be employed in Li-ion batteries, Na-ion batteries, Mg-ion, and Ca-ion batteries.

In one embodiment, the highly defected nanocrystals are synthesized through a two-step method that is both economical and scalable.

This disclosure also describes electrodes that comprise these aforementioned defected nanocrystals, carbon derivatives, and a binder. This composite electrode architecture can be tuned to favor high energy density, high power density, or a combination of both.

This disclosure further describes an electrode comprising a porous mixture of $MoS_2$/carbon fibers/carbon black and polyacrylic acid. The mixture can be paired with lithium metal to make an electrochemical cell. In this configuration, the electrode may be able to reversibly store greater than about 90 $mAh \cdot g^{-1}$ in 30 seconds. Additionally, the $MoS_2$ nanocrystal based electrodes may be capable of being cycled reversibly 3000 times with less than 20% loss in original capacity. The electrodes further may be capable of being cycled electrochemically to a voltage (about 0.8V vs. $Li/Li^+$) which does not destroy the original structure.

These composite electrodes are highly porous and electronically conductive which reduces the internal resistance of these electrodes. The electrochemistry of these nanocrystals is fundamentally different than other forms of $MoS_2$. Mathematical analysis of the charge storage mechanism reveals that most of the capacity is achieved through capacitive mechanisms which leads to new and technological relevant performance characteristics.

This technology addresses the need for both high energy and high power density negative electrode materials for Li-ion, Na-ion and Mg-ion batteries. Fast charging energy storage devices can find applications in the automotive industry (regenerative braking), energy production (intermittent solar/wind energy storage), and energy capture from kinetic energy sources. In traditional batteries, energy density is often sacrificed for power density. However, in pseudocapacitive charge storage materials such as described herein, high power does not necessarily come at the expense to energy density.

The active charge storage material described in this disclosure may reduce the charging time of electrodes based on this material to about 1 minute compared to batteries that charge on the order of hours. Using standard electrode fabrication techniques, nanocrystals tend to agglomerate leading to electrodes with high internal resistance leading to slow charging and high parasitic heat generation. To overcome this problem, we have developed an electrode architecture and design methodology to produce electrodes that are both high energy density and high power density. The method is general and can be applied to many small nanocrystal based active materials including the ones described herein.

Our technology is expected to provide advantages over existing technologies which potentially include but are not limited to:

(a) Li-ion batteries (any commercial company): Our material may offer charging rates that are ten-times faster without significant loss to the energy density;

(b) Graphene super capacitor: our technology may exhibit higher energy density;

(c) Lithium titanate: our material may have a higher power density and a linear capacitive voltage profile;

(d) Carbon super capacitors: our material may offer a competitive advantage by offering higher energy density;

(e) Graphite: our material may have a higher power density compared to graphite;

(f) Higher safety (because the electrochemical potential is higher);

(g) Faster charging and discharging;

(h) High energy density (because the electrochemistry is based on redox reactions similar to a Li-ion battery).

Additionally, these electrodes can be fabricated into several useful devices, including but not limited to:

(a) Symmetric capacitors (both electrodes are the $MoS_2$ based described above);

(b) Asymmetric capacitors (one electrode is the $MoS_2$ based electrode described above and the other can be activated carbon);

(c) Rocking chair batteries ($MoS_2$ based electrode and typical Li-ion/Na-ion cathode).

2. Pseudocapacitive Charge Storage In Thick $MoS_2$ Nanocrystal Electrodes.

In this section, we describe the synthesis of $MoS_2$ nanocrystals with an expanded layer spacing from nano-sized $MoO_2$. These nanocrystals are fabricated into carbon fiber based electrode architectures and then examined as Li-ion pseudocapacitors. These electrodes show extremely fast charging and discharging kinetics along with long cycling lifetimes. We found that certain pre-cycling conditioning steps are required to convert the 2H phase into the highly conductive 1T phase, which synergistically couples to the highly electronic carbon fiber mesh electrode architecture. Detailed electrochemical kinetic analyses are performed on the nanocrystals to quantify the amount of capacitive controlled charge storage. These values are compared to micrometer size $MoS_2$ to establish a figure of merit for the $MoS_2$ nanocrystal containing composite electrodes.

2.1 Materials and Characterization.

$MoS_2$ nanocrystals (ncs-$MoS_2$) were synthesized by sulfurization of hydrothermally prepared $MoO_2$ and compared to bulk $MoS_2$ (b-$MoS_2$). The X-ray diffraction (XRD) patterns for ncs-$MoS_2$ and b-$MoS_2$ in FIG. 1A show that both materials crystalize in the 2H hexagonal crystal structure and match JCPDS 037-1492. However, the synthesized ncs-$MoS_2$ shows significant peak broadening due to both finite size effects and crystal lattice defects. Note the left-shift and broadening of the first peak 10 for the ncs-$MoS_2$ as compared to the peak 20 for b-$MoS_2$.

FIG. 1B shows an scanning electron microscope (SEM) image of the ncs-$MoS_2$. FIG. 1C through FIG. 1D show transmission electron microscope (SEM) images of ncs-$MoS_2$ in which sub-50 nanometer primary particles 30 can be seen. Significant defects in the $MoS_2$ layers can be seen in FIG. 1C through FIG. 1D. Note also the "frayed end" 30 that is clearly shown in FIG. 1E. These defects and curvature of the $MoS_2$ layers that can be clearly seen in the high resolution TEM images of FIG. 1D and FIG. 1E are believed to be responsible for the facile ion insertion into the bulk of the nanocrystal.

Note that the c-axis lattice parameter is expanded in the nanoparticles to 6.30 Å compared to 6.15 Å for the bulk sample as has been reported for nano size $MoS_2$. Also, the domain size calculated from the Scherrer equation is 7 nm, which is smaller than the primary particle size observed from the SEM image of FIG. 1B and TEM images of FIG. 1C through FIG. 1E. This difference in the calculated Scherrer size versus observed size clearly indicates that the XRD peak broadening is also due to defects in the lattice.

FIG. 2A shows the nitrogen isotherm of both b-$MoS_2$ and ncs-$MoS_2$. The surface area for both b-$MoS_2$ (2 $m^2g-1$) and ncs-$MoS_2$ (35 $m^2g-1$) was calculated from the nitrogen adsorption isotherms shown in FIG. 2A. The surface area is almost twenty-times (about 17.5 in the figure) larger than the b-$MoS_2$, and leads to a high density of redox active surface sites for fast pseudocapacitive charge storage. The apparent porosity of the BJH pore size distribution shown in FIG. 2B comes from the electrostatic adhesion of the nanocrystals to each other which create pores.

FIG. 3 shows the results of examination of the chemical surface properties of b-$MoS_2$ and ncs-$MoS_2$ using X-ray photoelectron spectroscopy (XPS). Specifically, FIG. 3A and FIG. 3B show the X-ray photoelectron spectroscopy of b-$MoS_2$ while FIG. 3C and FIG. 3D show the X-ray photoelectron spectroscopy of ncs-$MoS_2$. The data shows that the surface of the ncs-$MoS_2$ is the same as the commercial bulk powder. These high resolution spectra distinguish the Mo4+ and $S_2$− valence states while the ratios between these two elements yield the $MoS_2$ stoichiometry for both samples. This analysis rules out potential chemical surface effects as a dominant factor driving the electrochemical performance differences that will be discussed in this disclosure. In fact, since the surface chemistry is similar, strong conclusions between size, surface area, and atomic disorder can be directly correlated to the enhanced electrochemical performance.

2.2 Electrochemistry.

The reversible lithium insertion process of $MoS_2$ is represented by the following equation:

$$MoS_2 + xLi^+ + xe^- \leftrightarrows Li_xMoS_2 \text{ where: } 0 \leq x \leq 1 \quad (1)$$

Intercalation of Li-ions proceeds through the weakly bonded van der Walls gaps of $MoS_2$. The lithium ion binding energy is higher for adsorption into the octahedral interstitials compared to the tetrahedral interstitials, and hence is preferentially stored in the octahedral sites. Below x=0.1 in $Li_xMoS_2$ intercalation proceeds without much change to the initial $2H$—$MoS_2$ structure. However, increasing the concentration of Li between the range 0.1<x<1 causes an advantageous irreversible phase change from the semiconducting 2H phase to the metallic 1T phase at ca. 1.0 V vs. $Li/Li^+$. This phase change does not involve a massive structural rearrangement, but only involves gliding of the highly polarizable sulfur layers.

FIG. 4A and FIG. 4C illustrate the derivative of the galvanostatic discharge plot $$\left(\frac{dQ}{dV}\right)$$

of the first 10 cycles at 1C for ncs-$MoS_2$ and b-$MoS_2$, respectively, and show the irreversible phase transition and subsequent formation of the highly electronically conducting 1T-$MoS_2$ phase. The 2H-to-1T phase transition is observed electrochemically as the large differential charge response at ca. 1.0 V vs. $Li/Li^+$. FIG. 4B and FIG. 4D illustrate the $$\left(\frac{dQ}{dV}\right)$$

of cycles 2 to 10 (first cycle not potted for clarity) of ncs-$MoS_2$ and b-$MoS_2$, respectively, and show that the 2H-to-1T phase change requires multiple cycles (e.g., at least 10 cycles in this example) for the ncs-$MoS_2$, while in b-$MoS_2$ the phase change occurs more rapidly (e.g., 2 cycles in this example). During the ten formation cycles at 1C, new cathodic and oxidative peaks developed and are assigned to the lithiation/delithiation of the electronically conductive $MoS_2$ 1T phase.

FIG. 4E shows the charge transfer resistance of both ncs-$MoS_2$ and b-$MoS_2$ during the first 10 formation cycles obtained from their respective Nyquist plots. Impedance collected at 3V vs. $Li/Li^+$ is shown in the line with the dots, and 0.8 V vs. $Li/Li^+$ is shown in the line with the square boxes. During the formation cycles the charge transfer resistance is reduced by the 2H-to-1T phase change, and increased by the formation of the solid electrolyte interface (SEI). The net result for both ncs-$MoS_2$ and b-$MoS_2$ is that the charge transfer resistance increases during the first two cycles mainly due to SEI formation, followed by a gradual decay during the next eight cycles mainly due to the formation of the electronically conductive 1T phase.

Note that this special formation cycling procedure of 10 cycles at 1C between 0.8-3 V vs Li converts the material to the metallic pseudocapcitor phase.

FIG. 4F schematically shows the atomic representation of the trigonal to octahedral (2H-to-1T) phase transformation. This transformation only involves a small shift in the easily polarized sulfur layer 50, which is non-destructive to the nanoscale structure.

Electrode architectures for high rate pseudocapacitive charge storage were optimized in order to maximize the properties of the electronically conductive $MoS_2$ 1T phase. One effective way to achieve highly conductive and porous electrodes is to utilize carbon fibers. Also, we use a polyacrylic acid binder due to its proven high rate performance, although other suitable binders could be used. The electrode components are sonicated together in ethanol to disperse the nanocrystals homogeneously with the carbon fibers and carbon black which upon drying lead to a highly conductive and porous electrode.

The carbon fiber based electrodes were compared to electrodes fabricated using the more traditional electrode formulation of polyvinylidene fluoride binder and carbon black. FIG. 5A compares the kinetic performance of ncs-$MoS_2$ in the two electrode architectures. The performance of the carbon fiber based electrodes is shown by the lines formed by inverted triangles in the upper portion of the graph and the performance of the carbon black only electrodes is shown by the lines formed by square boxes in the lower portion of the graph. As can be seen, the ncs-$MoS_2$ in the carbon fiber based electrodes show much better kinetic performance compared to the traditional electrodes. We suggest that particle dispersion and electronic conductivity are two dominating factors leading to the superior performance.

The traditional electrodes were mixed by hand with mortar and pestle, and the final composite electrode probably suffers from poor nanoparticle dispersion (since nanoparticles tend to agglomerate with each other). In comparison, the electrodes that were mixed using sonication show extremely good kinetic performance. Sonication assisted mixing homogeneously distributes the nanocrystals throughout the electrode, enabling synergistic coupling between the ncs-$MoS_2$ 1T-conductive phase and the conductive carbon scaffold.

In another experiment, 20 nm$TiO_2$ nanocrystal based electrodes dispersed with Triton X-100 (a commercial surfactant) showed markedly better rate performance compared to electrodes without this surfactant. It will also be appreciated that other mixing techniques could be used to homogenize a composite mixture by dispersing the metal active material throughout the conductive carbon matrix uniformly.

FIG. 5B compares the charge transfer resistance of the ncs-$MoS_2$/carbon fiber based electrodes (lines with stars), and ncs-$MoS_2$/carbon black based electrodes (lines with square boxes) during the first 10 formation cycles calculated from the Nyquist plots collected at 0.8 V vs. $Li/Li^+$. Using A.C. impedance spectroscopy we found that the pristine charge transfer resistance is significantly higher in the carbon black based electrode architecture, and increases over the first ten formation cycles. The increase in charge transfer resistance is most likely an effect of the further electronic isolation of the agglomerated nanocrystals due to SEI formation. More particularly, the charge transfer in the carbon fiber based electrode is both lower in absolute value and decreases with cycle number. From this data we can conclude that the improved rate kinetics in the carbon fiber based electrodes are a combination of the dispersed nanocrystals in the composite electrode, and the good electronic coupling of the nanocrystals to the carbon scaffolding. The newly formed 1T $MoS_2$ is electronically well connected to the electrode architecture.

FIG. 5C and FIG. 5D are schematic diagrams representing the possible origins of the limited kinetics in electrodes 60 based on ncs-$MoS_2$ 70 in combination with carbon black 80, and electrodes 90 based on ncs-$MoS_2$ 70 in combination with carbon black 80 and carbon fiber 100, respectively. For clarity, the binder is not shown in either figure. Additionally, the carbon black is optional in the carbon fiber based electrodes.

Using the optimized carbon fiber based electrode architecture enables the quantification of important metrics related to pseudocapacitors. We compare these metrics between b-MoS$_2$ and ncs-MoS$_2$ fabricated in the same electrode architecture to understand how nanostructuring affects the electrochemical properties.

FIG. 6A shows kinetic analysis comparing b-MoS$_2$ to the ncs-MoS$_2$ in the optimized carbon fiber based electrodes. The kinetic analysis of the ncs-MoS$_2$ shown in FIG. 6A shows markedly better rate performance compared to b-MoS$_2$. The ncs-MoS$_2$ retained 50% of the original 1C capacity at 100C while the b-MoS$_2$ retaind only 17%. In other words, the nanostructured material stores nearly four-times the charge compared to b-MoS2. The difference in charge transfer kinetics can be understood by the different charge storage mechanisms in the two materials.

Figure 6B:
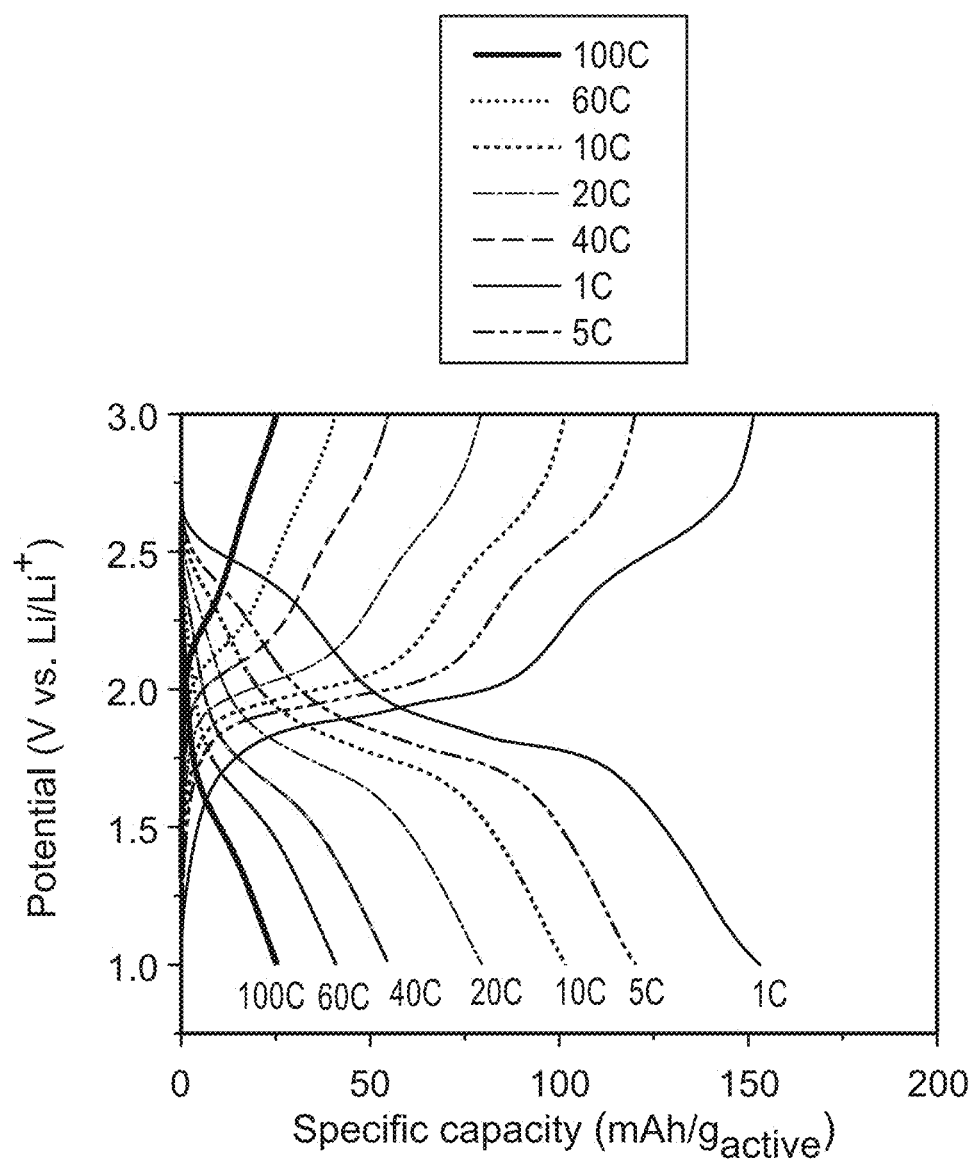

FIG. 6B shows the galvanostatic charge and discharge traces (lithium insertion and deinsertion profiles) for b-MoS$_2$ between 1C and 100C at different current densities. These traces display the traditional stepped plateau features that are indicative of charge storage accompanied by a phase transition in a battery material. Structural studies have shown that indeed bulk 1T Li$_x$MoS$_2$ undergoes multiple first order phase changes during Li-ion storage. Phase transformations are in part responsible for the sluggish kinetics in battery-type materials because the nucleation and propagation of new phases are typically slow.

Figure 6C:
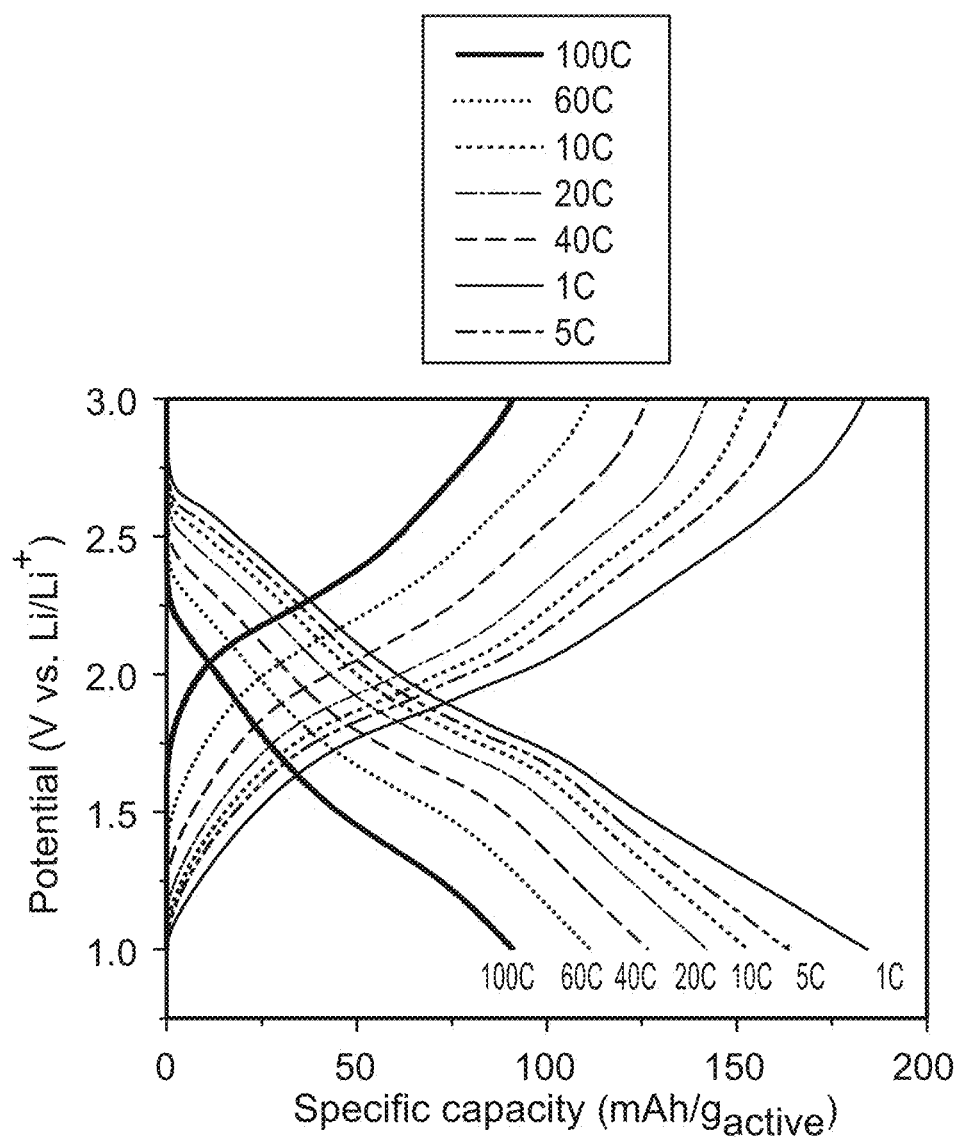

In stark contrast to b-MoS$_2$, FIG. 6C shows galvanostatic traces for ncs-MoS$_2$ that display a pseudo-linear voltage response with respect to Li-ion concentration compared to the plateau signatures observed for b-MoS$_2$. In addition, the voltage hysteresis and over potential is significantly smaller in the ncs-MoS$_2$ based electrodes due to the capacitive nature of the charge storage. This type of charge storage is indicative of a solid-solution in which no phase change occurs to accommodate the new stoichiometry.

Charge storage generally occurs by three main mechanisms: Li-ion insertion (bulk diffusion), surface and intercalation pseudocapacitance, and non-Faradaic double layer contribution. Capacitive effects can dominate the charge storage mechanism in high surface area materials such as ncs-MoS$_2$. These aforementioned charge storage mechanisms were analyzed using cyclic voltammetry at different scan rates according to Equation 2:

$$i=av^b \qquad (2)$$

When the measured current i follows the power law with scan rate v, the exponential term b can be determined from the slope of the log(i) vs. log(v) plot. Values of b=0.5 indicate the current is proportional to the square root of the scan rate which is indicative of diffusion dominated charge storage. On the other hand, when b=1 the current is linearly proportional to the scan rate which is characteristic of a capacitive charge storage mechanism.

FIG. 7A and FIG. 7B show analysis of the nature of the charge storage in the current maxima "b-value analysis" for b-MoS$_2$ and for ncs-MoS$_2$, respectively. This analysis shows that the faradaic charge storage that is associated with the peak maxima's in a CV is diffusion controlled in b-MoS$_2$ (as expected), while this analysis shows that the same Faradaic processes are capacitive in ncs-MoS$_2$. FIG. 7C and FIG. 7D show quantification of the capacitive and diffusion charge storage in b-MoS$_2$ and ncs-MoS$_2$, respectively, as a function of voltage. This analysis indicates that the ncs-MoS$_2$ based electrodes store charge largely through a capacitive mechanism.

FIG. 7A through FIG. 7D show several of the cyclic voltammagrams used to calculate the b-values at the current maxima in the anodic and cathodic regimes. The b-values that are calculated for b-MoS$_2$ are labeled on the CV plots next to the corresponding peaks, and display values between 0.65 to 0.83. The b-values for ncs-MoS$_2$ are higher, and are calculated to be between 0.93 to 1.00 indicating that the dominant charge storage mechanism is capacitive. The fast rate performance in ncs-MoS$_2$ is enabled by this capacitive charge storage mechanism quantified using Equation 2.

Another related analysis, shown in Equation 3, enables the measured current at a fixed potential to be decoupled into a diffusion contribution and a capacitive contribution.

$$i(V)=k_1v+k_2v^{0.5} \qquad (3)$$

In Equation 3, $k_1v$, and $k_2v^{0.5}$ correspond to the capacitive and diffusion contributions to the measured current. Using Equation 3 enables the quantification of capacitive charge storage at specific potentials along with total capacitive contribution over the entire voltage range. FIG. 7A indicates that, for b-MoS$_2$, the charge storage is largely diffusion limited at current maxima in the cyclic voltammagrams. The largest contributions to the diffusion dominated current processes are at the beginning of the insertion process in the cathodic scan at 2.64 and 2.00 V vs. Li/Li$^+$. Additionally, the deinsertion process in the anodic scan the peak at 1.90 V vs. Li/Li$^+$ is dominated by diffusion limited current to a much larger extent than its symmetric peak at 1.77V vs. Li/Li$^+$. The total integrated capacitive charge storage is 62% which is quite large for micrometer size particles. This does, however, give insight into the parent atomic structure of MoS$_2$ being an extremely good candidate for pseudocapacitive charge storage.

When we turn our attention to ncs-MoS$_2$ we find that some 83% of the charge storage is capacitive in nature. The capacitive current is significantly enhanced at the peak maxima voltages corresponding to the calculated b-values from Equation 2 that are close to 1. The broad cathodic peak ca. 1.6-1.1 V vs. Li/Li$^+$ is attributed to the 2H-to-1T phase transformation even though the phase transition was largely completed before running these CV scans. Slow CV scan rates were used for this analysis to match the slower diffusion processes in b-MoS$_2$to the fast storage processes in ncs-MoS$_2$. However, it has been reported that the 1T MoS$_2$ phase can convert back to the 2H phase at higher voltages, and this is apparently quite prevalent in the ncs-MoS$_2$ cycled at 0.1 mV·s$^{-1}$. As expected, this phase transition in the ncs-MoS$_2$ is largely diffusion limited. We expect that even higher capacitive contributions are possible through the elimination of this phase transition by cycling at faster rates, but the slower rates were preferred here to maximize the amount of diffusion for a more accurate measurement.

We also measured the long term cycling performance for b-MoS$_2$ and ncs-MoS$_2$. FIG. 8 shows the cycle lifetime of ncs-MoS$_2$ and b-MoS$_2$ at 20C after the kinetic analysis study (1C-100C). The capacity retention for both samples is above 80% after 3000 cycles at 20C. The excellent cycling performance of the b-MoS$_2$ and ncs-MoS$_2$ is mainly attributed to small structural changes structure (after the initial formation of the 1T phase) with a reported expansion in the c-axis direction of only about 4-6%. The charge storage in ncs-MoS$_2$ at 20C is nearly 70% greater after 3000 cycles compared to b-MoS$_2$ as a result of the faster kinetics. The long cycle lifetime is an indicative feature of pseudocapacitive charge storage.

These results highlight the importance of sulfide based pseudocapacitive active charge storage materials. The large 2-D galleries of $MoS_2$ and other metal chalcogenides make them of particular interest to the pseudocapacitive charge storage field. The next frontier will be developing new sulfide materials that enable intercalation pseudocapacitance over large length scales. These results are highlight the dire need for composite electrode architectures that are optimized for nanostructured pseudocapacitive active materials. The electrodes described in this disclosure represent a significant accomplishment, but if real devices will be made from pseudocapacitive materials like these, attention needs to be spent on the synergistic coupling of the active material and the composite electrode.

2.3. Example.

2.3.1 Synthesis.

All starting materials were obtained from commercial suppliers and used without further purification. Nanosized-$MoO_2$ has been reported elsewhere, and is briefly described here. $MoO_2$ nanocrystals were prepared by solvothermal by dissolving anhydrous Mock (Strem Chemicals) in a mixture of ethanol and deionized water at a reaction temperature of 180° C. for 6 hrs. The $MoO_2$ nanocrystals were converted to $MoS_2$ with $H_2S$ gas. The reaction was carried out in a tube furnace at 600° C. under flowing $H_2S/H_2$ ($H_2S$ 5 mol %:$H_2$ 95 mol %, Air Gas) for 10 hours.

2.3.2 Characterization.

Powder X-ray diffraction (XRD) was performed in a PANalytical X'Pert Pro operating with Cu Kα (λ=1.5418 Å) using a 0.03° step size, a voltage of 45 kV, and a current of 40 mA. XRD patterns were recorded in the range of 10°≤2θ≤80°. Transmission electron microscopy (TEM) was performed using a FEI Technai T12 operating at 120 kV. Nitrogen porosimetry was carried out using a Micromeritics TriStar II 3020. The surface area was calculated from the adsorption branch of the isotherm between (0.04 to 0.30 P/Po) using the Brunauer-Emmett-Teller (BET) model. The pore diameter and pore volume was also calculated from the adsorption branch of the isotherm using the Barret-Joyner-Halenda (BJH) model. X-ray photoelectron spectroscopy (XPS) analysis was performed using a Kratos Axis Ultra DLD with a monochromatic Al (Ka) radiation source. The charge neutralizer filament was used to control charging of the sample, 20 eV pass energy was used with a 0.1 eV step size, and scans were calibrated using the C 1 s peak shifted to 284.8 eV. The integrated area of the peaks was found using the CasaXPS software, and atomic ratios were also found using this software. The atomic sensitivity factors used were from the Kratos library within the Casa software.

2.3.3 Electrochemistry.

In one embodiment, the carbon fiber based electrodes were made from a slurry consisting of 70 wt. % ncs-$MoS_2$ or b-$MoS_2$ (Alfa Asear) powder used as active component for Li storage, 10 wt. % vapor grown carbon fibers (Sigma Aldrich), and 10 wt. % carbon black (Alfa Asear) used as conductive additive, and 10 wt. % polyacrylic acid solution in ethanol ($M_w$=250K, Sigma Aldrich) used as binder. The four components were sonicated for 30 minutes to obtain a homogeneous dispersion. Ethanol evaporation over one hour resulted in a homogeneous thick paste that was cast onto 25 μm carbon coated Al foil (gift from Coveris). The slurry was dried at ambient temperature for 1 h, and further dried at 25° C. under vacuum overnight to evaporate the excess solvent. The mass loading of the electrode was about 1 mg·cm$^{-2}$ of active material. It will be appreciated that other mixtures may be more advantageous in specific applications, e.g., for high energy applications the active material percentage could be increased. A suitable range for the active material ($MoS_2$) is about 10 wt. % to about 95 wt. %, with a balance of carbon, while keeping the binder content to no more than about 20%.

A traditional electrode was made from a slurry consisting of 70 wt. % ncs-$MoS_2$, 20 wt. % carbon black (Alfa Asear), and 10 wt. % polyvinyl difluoride (gift from Kynar) dissolved in n-methyl-2-pyrrolidone (Alfa Asear). The electrodes were dried in a vacuum oven at 120° C. overnight. The mass loading of all the electrode in this study were about 1 mg·cm$^{-2}$ of active material. These electrodes were assembled into an in-house built swageloc cell using lithium metal as counter electrode, glass fiber (Watman) as separator, and 1 M $LiPF_6$ in a 1:1 ethylene carbonate/dimethyl-carbonate solvent (Sigma Aldrich) with 5% (v/v) fluorinated ethylene carbonate (TCI America) as electrolyte. Half-cell cycling was carried out on a VSP potentiostat/galvanostat (Bio-Logic) using a 1C rate that corresponds to 167 mAh·g$^{-1}$.

Electrochemical impedance spectroscopy was carried out on a VSP potentiostat/galvanostat (Bio-Logic). The impedance measurements were performed on two-electrode coin cells between 900 kHz and 100 mHz under ac potentiostatic stimulus with a 10 mV amplitude under no bias. Impedance data was collected at the voltage limits of 0.8V and 3.0V vs. Li/Li$^+$ after each insertion and deinsertion cycle. A 5 minute potentiostatic hold was applied before each impedance measurement during which time the current dropped from 167 mA·g$^{-1}$ to 16.7 mA·g$^{-1}$.

2.4 Conclusion.

We have successfully synthesized high surface area $MoS_2$ nanocrystals with expanded van der Walls gaps, which show high levels of pseudocapacitive charge storage in a thick composite electrode. We have also demonstrated that the electrode architecture can be a dominating factor in the development of composite electrodes in pseudocapacitors. The high capacitive contribution measured for the ncs-$MoS_2$ based electrodes is due to the interplay between the nanoscale architecture of the active material and the composite electrode. The high surface area and expanded layer structure of ncs-$MoS_2$ enable fast faradaic reactions which leads to charge storage that appears capacitive even though ion migration occurs over distances that normally would be limited by semi-infinite diffusion. We have quantified that 83% of the charge storage is capacitive which enables very fast charge storage. Even at 100C charge/discharge rates, over 90 mAh·g$^{-1}$ is accessed in only 30 seconds. The cycling stability of ncs-$MoS_2$ shows over 80% retention after 3000 cycles.

3. Mesoporous $MoS_2$ as a Transition Metal Dichalcogenide Exhibiting Pseudocapacitive Li-Ion and Na-Ion Charge Storage.

While much of the current work on $MoS_2$ has been focused on the high capacity four-electron reduction, this reaction is prone to poor reversibility. In this section we focus on traditional ion intercalation reactions and demonstrate that ordered mesoporous thin films of $MoS_2$ can be utilized as pseudocapacitive energy storage material with a specific capacity of 173 mAh g$^{-1}$ for Li-ions and 118 mAh g$^{-1}$ for Na-ions. Utilizing synchrotron grazing incidence X-ray diffraction techniques we have correlated fast electrochemical kinetics with the ordered porous structure and with an iso-oriented crystal structure. When Li-ions are utilized, the material can be charged and discharged in 20 seconds while still achieving a specific capacity of 140 mAh g$^{-1}$. Moreover, the nanoscale architecture of mesoporous $MoS_2$ retains this level of lithium capacity for 10,000 cycles.

A detailed electrochemical kinetic analysis indicates that energy storage for both ions in $MoS_2$ is due to a pseudocapacitive mechanism.

3.1 Results and Discussion.

We fabricated ordered mesoporous $MoS_2$ (mp-$MoS_2$) thin film electrodes and studied their pseudocapacitive properties. These mesoporous thin films form an ideal electrode architecture in which the pores provide electrolyte access to the bulk of the film, and the thin nanocrystalline walls are ideal for pseudocapacitive charge storage. The thin film format was also chosen to eliminate the need for conductive carbon additives or binders in order to isolate the effects of nanostructuring the $MoS_2$.

The mesoporous $MoS_2$ thin films were synthesized by a two-step method. In the synthesis of these materials, we utilized evaporation induced self-assembly (EISA) of a block copolymer and a sol-gel type precursor to form mesoporous $MoO_2$ thin films that are ultimately converted into $MoS_2$ using thermal sulfurization. Using EISA is a well-established method to synthesize a variety of ordered mesoporous oxides with uniform, well-defined pore sizes. This preliminary step of creating $MoO_2$ enables precise control of the nanoscale architecture, however, EISA cannot be used to directly form sulfides. Therefore, we use thermal sulfurization in $H_2S$ to convert the $MoO_2$ to $MoS_2$, which preserves the carefully constructed nanoscale architecture formed from EISA. This two-step synthesis method leads to nanocrystalline $MoS_2$ domains which are directly connected to each other, minimizing the interfacial resistance that is so problematic in nanoparticle agglomerates. The ability to control the pore size, pore-size distribution, and pore periodicity, further enables optimized electrolyte diffusion, minimizes the pore volume, and can lead to increased power density. In this disclosure, the mesoporous architecture is correlated with the pseudocapacitive properties using a detailed cyclic voltammetric analysis that quantitatively decouples capacitive-driven pseudocapacitance and diffusion-controlled contributions to overall charge storage. This analysis results in a figure of merit for pseudocapacitive energy storage that is used to understand how nanoscale architecture is related to pseudocapacitive energy storage.

3.2 Materials Characterization.

Ordered mesoporous $MoS_2$ thin films (mp-$MoS_2$) were synthesized through the conversion of mesoporous $MoO_2$ thin films (mp-$MoO_2$) utilizing a solid-gas reaction with $H_2S$ gas. Mp-$MoO_2$ was synthesized by EISA of molybdenum precursors and an amphiphilic block copolymer (poly(ethylene oxide-block-butylene oxide), PEO-b-PBO). The diblock copolymer utilized in this study does not tend to form very ordered structures because of polydispersity in block length, but due to its high oxygen content, it can be removed in the reducing atmospheres needed to crystalize mp-$MoO_2$ without forming $MoO_3$. During the solution phase component of the sol-gel reaction, the metal chloride precursors undergo a condensation reaction catalyzed by in-situ generated HCl. The multi-valent metal clusters of the molybdenum-oxygen condensates can associate with the electron rich oxygen moieties in the PEO block of the copolymer in solution. During the dip-coating process, solvent evaporation leads to micelle assembly and the formation of inorganic/organic mesostructured composites.

FIG. 9A through FIG. 9D illustrate nanoscale structural characterization. The scanning electron microscope (SEM) image of the surface of a calcined mesoporous $MoO_2$ (mp-$MoO_2$) film in FIG. 9A shows the surface of an ordered porous structure with about 10 nm pores and about 10 nm walls. The SEM image in FIG. 9B displays shows the mesoporous $MoS_2$ (mp-$MoS_2$) thin film that was produced from the mesoporous $MoO_2$ (mp-$MoO_2$) by thermal sulfurization in $H_2S$ gas. The $MoS_2$ grains do coarsen somewhat under these conditions, but conversion below 500 C.° led to amorphous $MoS_2$ that did not show pseudocapacitive charge storage behavior (not shown). Despite some increase in wall thickness, the overall mesoporous structure observed for mp-$MoO_2$ is retained throughout the sulfurization process, suggesting that this synthesis method could be utilized to produce a broad range of nanostructured metal sulfides based from metal oxides that possess desired nano-architectures.

Several reports have shown that for carbonaceous supercapacitors, the pore size and size distribution directly affect electrochemical properties. Therefore, we have utilized both X-ray diffraction and porosimetry methods to quantify the nature of the porosity. Synchrotron-based 2-D grazing incidence small angle X-ray scattering (GISAX) patterns for $MoO_2$ (FIG. 9C) and $MoS_2$ (FIG. 9D) thin films show X-ray diffraction arcs along the $q_{xy}$ direction indicating that these thin films have ordered porosity in the plane of the substrate. The in-plane repeat distance calculated from $q_{xy}$ (when $q_z \rightarrow 0$) in FIG. 9C is 0.28 $nm^{-1}$ or 22 nm in real space. After conversion to mp-$MoS_2$, this value remains the same, with only a slight diminution of scattering intensity (FIG. 9D), as expected for a film that is covalently bound to the substrate.

Ellipsometric porosimetry was used to calculate the film thickness and to demonstrate that the porosity observed by SEM on the film surface is homogeneous throughout the bulk of the film. The measured thicknesses of the mp-$MoO_2$ and the mp-$MoS_2$ films were determined to be 57 nm and 85 nm, respectively.

FIG. 10A through FIG. 10D present materials characterization using ellipsometric porosimetry. Toluene adsorption-desorption isotherms and pore size distributions calculated from the isotherms are shown for $MoO_2$ thin films in FIG. 10A and FIG. 10C, and are shown for mesoporous $MoS_2$ thin films in FIG. 10B and FIG. 10D. The mp-$MoO_2$ and mp-$MoS_2$ isotherms show a large hysteresis between adsorption and desorption of toluene, which is indicative of a mesoporous structure with a cage and neck type architecture. FIG. 10C and FIG. 10D present the pore size distributions calculated from both the adsorption and desorption branch of the isotherms. Using the adsorption isotherm, the average pore radius of the mp-$MoO_2$ thin film is calculated to be 8 nm (FIG. 10C) which decreases to 5 nm after conversion to mp-$MoS_2$ (FIG. 10D). The decrease in pore size and increase in film thickness after conversion to the sulfide can be attributed to a change in density of $MoO_2$ (density=6.5 g $cm^{-1}$) compared to $MoS_2$ (density=5.1 g $cm^{-1}$).

The crystal structure and texture of mp-$MoO_2$ and the converted mp-$MoS_2$ were determined using synchrotron-based grazing incidence wide angle X-ray scattering (GI-WAX).

FIG. 11A shows integrated synchrotron based grazing incidence wide angle X-ray scattering (GIWAX) pattern obtained on $MoO_2$ and $MoS_2$. From FIG. 11A it can be seen that the 1-D GIWAX patterns, integrated from the 2-D images (see FIG. 17), of $MoO_2$ and $MoS_2$ match JCPDS No. 32-0671 and JCPDS No. 37-1492, respectively. (see FIG. 17 which shows two-dimensional grazing incidence wide angle x-ray diffraction patterns of $MoO_2$ (see FIG. 17A) and $MoS_2$ (see FIG. 17B), where the * represents diffraction planes from the sample stage). Scherrer analysis of the (002) planes indicate that the mp-$MoS_2$ grains have a 4 nm coherence length. The small size likely results from a combination of finite size effects and disorder of the van der Waals gaps. Considering the relatively low synthesis temperature, not all the layers can crystallize uniformly along the c-axis direction due to weak bonding. We believe that some aspects of the pseudo-capacitive charge storage process discussed later in this paper stem from the very small disordered nanoparticles that comprise the pore walls.

An example of the raw 2D data for the mp-MoS$_2$ sample is shown in FIG. 11B. Diffraction rings are indexed on the pattern and the spots marked with a * arise from the silicon substrate. Beyond crystallite size effects, the 2-D GIWAX (FIG. 11B) indicates that mp-MoS$_2$ exhibits significant texture, with the (002) diffraction planes oriented parallel to the plane of the substrate. To quantify the percent orientation, sections of the 2-D GIWAX pattern corresponding to the in-plane direction and out-of-plane scattering direction were integrated separately.

FIG. 11C shows integrated slices of the mp-MoS$_2$ (002) peaks obtained by integrating over a 10° wedge centered at either 90° or 180° to show the in-plane and out-of-plane diffraction contributions. The data show preferential ordering of the (002) planes parallel of the substrate. FIG. 11C illustrates that the out-of-plane (002) scattering intensity (i.e. scattering from (002) planes oriented parallel to the substrate) is four-times larger than scattering from the in-plane direction (i.e. for (002) planes oriented perpendicular to the substrate). The preferential orientation is highly beneficial for fast intercalation reactions in mp-MoS$_2$ because bulk ion insertion occurs in the (002) planes rather than through the basal planes. Therefore, the orientation of the mp-MoS$_2$ crystallites leads to a high density of active edge sites being exposed to the pore volume and thus to the electrolyte. A previous study proposed that iso-oriented mesoporous MoO$_3$ thin films exhibited fast charge storage kinetics partly because ions easily enter the van der Waals gaps from the pore edges and because this texture helped accommodate electrochemically induced volume expansion normal to the substrate.

FIG. 12 displays high resolution X-ray photoemission spectroscopy (XPS) traces for (FIG. 12A) Mo 3d, (FIG. 12B) S 2p, and (FIG. 12C) the XPS survey scan. More specifically, FIG. 12 shows high resolution XPS data obtained on mp-MoS$_2$ in the molybdenum (FIG. 12A) and sulfur (FIG. 12B) regions. The data is in good agreement with Mo$^{4+}$ and S$^{2-}$. A survey scan of the mp-MoS$_2$ is shown in FIG. 12C. A small amount of surface oxidation is observed in this data, but the peaks are dominated by Mo and S.

The high resolution Mo 3d spectrum confirms that the molybdenum in mp-MoS$_2$ is in the 4$^+$ valence state while the sulfur is in the 2$^-$ valence state, both of which are consistent with the electronic structure of MoS$_2$. The survey scan shows a small peak for the presence of oxygen due to slight oxidation of the surface. However, even if the surface is slightly oxidized, the mesoporous framework consists of interconnected grains and so the overall resistance through the network should be low. Indeed, the 3-D interconnectivity of these mesoporous films demonstrates how an optimized nanoscale architecture can help overcome the issue of poor electronic conductivity in low valence metal chalcogenides such as MoS$_2$. Overall, the XPS data indicates that the sulfurization reaction does indeed convert the oxide completely to MoS$_2$.

3.3. Electrochemistry.

Previous in-situ XRD studies confirmed that upon Li-intercalation, MoS$_2$ undergoes an irreversible first-order phase change from the 2H—MoS$_2$ phase to the 1T-MoS$_2$ phase, and that this phase change is associated with a voltage plateau at 1.1 V vs. Li/Li$^+$.

FIG. 13A through FIG. 13F present electrochemical characterization of mp-MoS$_2$ collected using Li electrolytes. FIG. 13A shows cyclic voltammograms collected at 5 mVs$^{-1}$ over the first 100 cycles for a mp-MoS$_2$ film. FIG. 13B shows cyclic voltammograms collected at scan rates ranging from 1 to 10 mVs$^{-1}$. FIG. 13C shows cyclic voltammograms collected at scan rates ranging from 10 to 100 mVs$^{-1}$. FIG. 13D shows specific capacity versus charge and discharge time. FIG. 13E shows discharge capacity versus v$^{-1/2}$, which allows for the determination of diffusion-controlled capacity and capacitive-controlled capacity. The solid line is an extrapolation of the infinite sweep rate capacity using the capacity between 1 to 10 mVs$^{-1}$. FIG. 13F show capacitive and diffusion controlled charge storage contributions in mp-MoS$_2$ cycled in a Li-electrolyte at 1 mVs$^{-1}$. The capacitive contributions are denoted by the shaded region.

In the cyclic voltammograms (CV) shown in FIG. 13A, the prominent redox peak at 1.1 V vs. Li/Li$^+$ is consistent with the 2H to 1T-MoS$_2$ phase change. This redox peak decays rapidly over the first three cycles, and is no longer present over the course of about 100 cycles. This electrochemical process is replaced by a new current response between 1.5 to 2.5 V vs. Li/Li$^+$, which appears during both oxidation and reduction. FIG. 13B shows CVs collected from 1 to 10 mV s$^{-1}$ after the 2H-to-1T phase change is complete. The broad current response (FIG. 13A) that was observed between 1.5-2.5 V vs. Li/Li$^+$ during the first one-hundred cycles is more defined in FIG. 13B and the peaks are indicative of lithiation and delithiation of 1T-MoS$_2$.

The 1T phase of MoS$_2$ has a negative temperature coefficient for the electronic conductivity, and therefore is a metal, in contrast to the semiconducting properties of the 2H—MoS$_2$. This metallic property of 1T-MoS$_2$, in combination with the interconnected grains, is highly beneficial for fast charge transfer reactions. In addition to the peaks observed in the CVs, a broad distribution of redox current is measured between 1.0 to 1.7 V vs. Li/Li$^+$ (FIG. 13B). By comparison, micron-sized MoS$_2$ slurry electrodes show low current response below 1.75 V vs. Li/Li$^+$ (see FIG. 18). More specifically, FIG. 18 shows cyclic voltammograms of micrometer MoS$_2$ slurry electrodes at 0.1 mVs$^{-1}$ (see FIG. 18A), and 1.0 mVs$^{-1}$ (see FIG. 18B) compared to the mesoporous thin films described in this disclosure at 1 mVs$^{-1}$ (see FIG. 18C). The cyclic voltammograms clearly show that current response below 1.75V is only observed in mp-MoS$_2$, and not observed in bulk powders. Therefore, we attribute this new electrochemical process in our mp-MoS$_2$ to the porous architecture that leads to a high density of easily accessible surface-redox active sites. These surface sites will be highly defected in nature and most likely will have a broad distribution of energies associated with oxidation and reduction. A similar broad distribution of electrochemical signatures are observed in RuO$_2$.xH$_2$O which are ascribed to pseudocapacitive charge storage.

The peaks in the cyclic voltammograms (FIG. 13B, FIG. 13C) ca. 1.5 to 2.0 V show relatively little change in potential as a function of sweep rate. This behavior suggests that rapid kinetics occur in our mp-MoS$_2$. The total charge storage in the mp-MoS$_2$ is plotted as a function of charge time in FIG. 13D and indicates that the maximum value for the gravimetric capacity, 173 mAh g$^{-1}$, is reached after 2000 seconds. This capacity is in reasonable agreement with the theoretical value of 167 mAh g$^{-1}$ for the insertion of one Li$^+$ per MoS$_2$. More significant, however, is that 140 mAh g$^{-1}$ or over 80% of the theoretical capacity can be attained in just 20 seconds. We suggest that the fast kinetics are due to the metallic conductivity of mp-MoS$_2$ combined with an ideal nanoscale architecture consisting of interconnected nanocrystals with short ion diffusion path lengths and good electrolyte accessibility.

To further explore the nature of these charge storage processes, the electrochemical insertion/deinsertion kinetics of mp-MoS$_2$ were investigated using analytical techniques to quantify the diffusion-controlled and capacitive charge storage processes. In FIG. 13E, the capacity of mp-MoS$_2$ is plotted vs. the square root of the inverse sweep rate (i.e., v$^{-1/2}$) from 1 to 100 mV s$^{-1}$. The linear regions in this plot are characterized by semi-infinite diffusion, as described in Equation 4:

$$Q_{tot} = Q_\infty + \alpha(v^{-1/2}) \tag{4}$$

where $Q_{tot}$ is the total amount of charge storage, $Q_\infty$ refers to capacitive charge storage (both from double layer and pseudocapacitive processes) and $\alpha v^{-1/2}$ indicates charge storage associated with semi-infinite diffusion, where $\alpha$ is a constant and v is the sweep rate. The extrapolated infinite sweep-rate capacity, estimated from the y-intercept (when v$^{-1/2}$=0) is determined to be 156 mAhg$^{-1}$, and represents the total value of capacitive charge storage. Below 10 mVs$^{-1}$ the capacity is nearly independent of v$^{-1/2}$, indicating that charge storage is not limited by semi-infinite diffusion control.

A second analysis was also performed to determine the potential regions where capacitive contributions occur in the CV plots. The measured current response as a function of potential is considered to be comprised of both capacitive currents (which vary as k$_1$v) and diffusion-controlled currents (which vary as k$_2$v$^{0.5}$), as given in Equation 3.

FIG. 13F shows this kinetic analysis at a sweep rate of 1 mVs$^{-1}$. Such a slow sweep rate is preferred for this analysis in order to provide the conditions which maximize the diffusion contribution. The analysis indicates that some 91% of the current, and therefore the capacity, is capacitive. The kinetic analysis reveals that the insertion processes, especially in the voltage region ca. 2.55 V, is more diffusion controlled than the de-insertion process. Reports have suggested that the electrochemically produced 1T phase can convert back to a disordered 2H-phase at 3 V by a glide-plane sliding mechanism of the sulfur layers. If there is a sliding of sulfur layers concomitant with de-intercalation (oxidation) at 2.55V, then diffusion controlled charge storage processes may occur upon re-intercalation (reduction) because of the need to reverse this partial phase transition. Overall, however, this kinetic analysis indicates that almost all of the charge storage in mp-MoS$_2$ is capacitive throughout the entire voltage range measured. The capacity must come from surface-redox processes combined with intercalation over short diffusion path lengths (intercalation pseudocapacitance). Because the different processes are all kinetically facile, the contributions from surface, near surface, and 'interior' redox processes cannot be distinguished from one another. We postulate that the ideal 3-D porous geometry, combined with preferentially oriented nanocrystals produce an environment suitable for this high degree of capacitive charge storage.

Ex-situ GISAX of mp-MoS$_2$ after several Li-ion insertion and deinsertion cycles was used to assess the retention of the ordered mesoporosity of mp-MoS$_2$. FIG. 14 is a GISAX image of a mp-MoS$_2$ film, after 9 galvanostatic cycles in a Li electrolyte. The data show excellent retention of the ordered mesoporous structure even after the Li-ion induced 2H-to-1T phase change has occurred. The data in FIG. 14 establishes that scattering from an ordered pore system is indeed retained after conversion to the 1T phase, indicating that the mesoporous structure of the electrochemically obtained 1T mp-MoS$_2$ is similar to the parent synthesized material. The fact that the ordered pore system is still present after the phase transition has occurred is particularly important in view of the electrochemical cycling experiment.

Our final set of lithium intercalation experiments address the question of cycling stability. Fast redox reactions and high levels of pseudocapacitive charge storage generally indicate minimal structural change upon lithium intercalation. This, in turn, provides the potential for increased cycling stability.

FIG. 15A and FIG. 15B illustrate long term cycling stability. FIG. 15A shows specific capacity versus cycle number for a mp-MoS$_2$ film cycled galvanostatically at 23C in a Li-ion electrolyte, and FIG. 15B shows specific capacity versus cycle number for a mp-MoS$_2$ film cycled potentiostatically at 10 mVs$^{-1}$ in a Na-ion electrolyte. Indeed, FIG. 15A shows that mp-MoS$_2$ can be cycled 10,000 times at a rate of 23° C. (2.5 minutes charge) with a loss in capacity of only 13%. We ascribe this excellent cycling behavior to the robust nanostructure and oriented crystal structure of mp-MoS$_2$. The orientation of the (002) planes (FIG. 11C) should lead to iso-oriented volume expansion normal to the substrate during cycling, which in turn, decreases cycling induced strain. In addition, the flexible porous network should be able to accommodate any cycling induced volume changes by allowing the material to expand and contract without loss of connection to the current collector or neighboring MoS$_2$ grains.

We next turn to our discussion to the pseudocapacitive charge storage properties of Na-ion insertion in mp-MoS$_2$. We emphasize again that we are focusing only on the intercalation of Na$^+$ into mesoporous MoS$_2$ because the four-electron reduction reaction extensively damages the nanoscale architecture of the MoS$_2$. A recent in-situ XRD study demonstrated that electrochemical intercalation of up to 1.1 Na-ions per Mo occur in commercial MoS$_2$ powders. The electrochemical intercalation of Na-ions should be slower in MoS$_2$, compared to Li-ion intercalation, because of the larger ionic radius of Na$^+$ (r$_{ionic}$=1.06 Å) vs Li$^+$ (r$_{ionic}$=0.76 Å). Nonetheless, MoS$_2$ is an ideal candidate to accommodate a larger guest ion like Na$^+$, however, because the large van der Waals gaps have been shown to intercalate guest ions and molecules even larger than Na$^+$. Similar to Li-ion insertion into MoS$_2$, Na-insertion into MoS$_2$ also induces a phase change from the 2H phase to the metallic 1T phase.

FIG. 16A through FIG. 16F show electrochemical characterization of mp-MoS$_2$ collected using Na electrolytes. Cyclic voltammograms collected at 5 mVs$^{-1}$ for the first three cycles are shown in FIG. 16A. Cyclic voltammograms collected at scan rates ranging from 1 to 10 mVs$^{-1}$ are shown in FIG. 16B. Cyclic voltammograms collected at scan rates ranging from 10 to 100 mVs$^{-1}$ are shown in FIG. 16C. Specific capacity versus charge and discharge time is shown in FIG. 16D. Capacitive and diffusion-controlled charge storage contributions in mp-MoS$_2$ cycled in Na-electrolyte at 1 and 10 mVs$^{-1}$, are shown in FIG. 16E and FIG. 16F, respectively. The capacitive contributions are denoted by shaded region.

The large current response at 0.90 V vs Na/Na$^+$ in FIG. 16A corresponds to conversion into the 1T-MoS$_2$ phase.

With further cycling this peak at 0.90 V decays while new broad peaks appear between 1.25 to 2.25 V vs Na/Na$^+$. After the phase transition was completed, CVs were collected between 1-100 mVs$^{-1}$ as shown in FIG. 16B and FIG. 16C. FIG. 16D shows that the magnitude of Na-ion charge storage is not as large as that of Li-ion as now the total charge storage after an extended period of time (2250 seconds) is only 118 mAhg$^{-1}$, about 80% of the theoretical value of 146 mAhg$^{-1}$. Not surprisingly, the kinetics are also slower than for Li ions as less than 50% of the theoretical capacity (69 mAh·g$^{-1}$) can be accessed in the 20 second time frame. Even though the Na-ion capacity is less than that of Li-ion, utilizing Equation 3 (FIG. 16E) we find that nearly all the stored charge arises from non-diffusion controlled or capacitive processes. This result emphasizes that the large MoS$_2$ van der Waals gaps form ideal diffusion pathways that promote a capacitor-like charge storage mechanism, even with the larger Na-ions. The cycling stability of mp-MoS$_2$ in a sodium-ion electrolyte (FIG. 15B) is not as good as that for Li-ions. After 100 cycles the capacity has dropped to only 80% of the original value and the capacity eventually stabilizes at around 50% of the original value. The system can achieve more than 1000 cycles at this 50% capacity, however.

3.4 Conclusions.

We have demonstrated that 3-D ordered porous MoS$_2$ can be synthesized from polymer templated MoO$_2$ materials. These MoS$_2$ thin films possess ideal nano-architectures for pseudocapacitive energy storage. The 10 nm pore walls provide short ion diffusion pathlengths, while the pore-voids allow good electrolyte accessibility. During the preliminary conditioning cycles, the semiconducting 2H-phase of MoS$_2$ is converted into the metallic 1T-phase of MoS$_2$ through intercalation of alkali metals. This increased electronic conduction caused by this phase transition is amplified in this 3-D porous geometry because the MoS$_2$ grains are interconnected. Ex-situ GISAX confirms that the electrochemically formed 1T phase possessed the same mesoscale structure as the as-synthesized parent 2H—MoS$_2$ material. Synchrotron based GIWAX was used to analyze the texture of the MoS$_2$ crystal structure and revealed that the (002) planes are oriented parallel to the substrate. This orientation leads to a high degree of MoS$_2$ edge sites that form the interior of the pore walls and are in direct contact with the electrolyte.

The combination of these structural factors leads to the extremely fast kinetics. For Li-ions, over 80% of the theoretical capacity can be accessed in only 20 seconds which is consistent with the analysis indicating that a high percentage of the charge storage is capacitor-like. Moreover, the cycling performance is extremely good as the capacity decrease over 10,000 cycles is only 13%. The charge storage properties for the larger Na-ions are also quite respectable. For this ion, about 50% of the theoretical capacity is stored on the 20 second time frame, and here, too, most of the charge storage is capacitor-like. Overall, we have demonstrated that mp-MoS$_2$ is a versatile ion storage host that is capable of achieving fast kinetics and good cycling performance. We foresee that these unique structural properties may eventually give rise to possible pseudocapacitive storage with an even larger library of guests, including higher valent ions such as Ca$^{2+}$ and Mg$^{2+}$.

3.5 Example.

3.5.1 Materials.

The following materials were obtained from commercial suppliers and used without further purification: molybdenum (V) chloride (99.6% metal basis, Alfa Aesar), poly (butylene oxide)-block-poly(ethylene oxide) (PBO(5000)-b-PEO(6500), Mn=11500, PDI=1.06-1.15, Advanced Polymer Materials Inc).

3.5.2 Synthesis of MoO$_2$.

In a typical synthesis, 0.015 g PEO-b-PBO was first dissolved in 2 mL ethanol. Then 0.2 g MoCl$_5$ was added. The resulting solution was stirred for 2 h prior to film deposition. Thin films were deposited via dip-coating on polar substrates such as silicon and platinum coated Si (3 nm Ti– 150 nm Pt– 360 nm SiO$_2$– Si). Optimal conditions included 4% relative humidity and a constant withdrawal rate of 3 mm/s. The films were aged at 180° C. for 12 h prior to template removal to prevent loss of mesoscale order during the course of the thermal template degradation and crystallization. Films were calcined using a 1° C./min ramp to 350° C. in a 5%/95% H$_2$/N$_2$ reducing atmosphere to yield the crystalline, porous MoO$_2$.

3.5.3 Synthesis of MoS$_2$.

The above-synthesized MoO$_2$ thin-films were converted to MoS$_2$ through a solid-gas reaction with H$_2$S gas. The reaction was carried out in a tube furnace at 500° C. under flowing H$_2$S/H$_2$ (H$_2$S 5 mol %:H$_2$ 95 mol %, Air Gas) for 3 hours. A low gas flow rate of 30 ml·min$^{-1}$ was used to minimize thermal gradients across the films. The system was cooled, under H$_2$S/H$_2$ flow, at 2-4° C. min$^{-1}$ until 120° C. at which point the flow gas was changed to argon, which was used until the system reached room temperature. The samples were exposed to air for about 30-60 min before being transferred and stored in a glove box.

3.5.4 GISAX and GIWAX Synchrotron Measurement.

Two-dimensional GISAX and GIWAX data were collected at the Stanford Synchrotron Lightsource (SSRL) using beamlines 1-4 and 11-3, respectively. Beamline 1-4 was operated at 8.344 KeV using the Rayonix-165 CCD detector. Beamline 11-3 was operated at 12.735 KeV using a MAR345 imaging plate (345 mm diameter).

3.5.5 Porosimetry.

Ellipsometric porosimetry was performed on a PS-1100 instrument from Semilab using toluene as the adsorbate. A UV-visible CCD detector adapted to a grating spectrograph analyzes the signal reflected by the sample. The light source is a 75 W Hamamatsu Xenon lamp and measurements were performed in the spectral range from 1.25 eV to 4.5 eV. Data analysis was performed using the associated Spectroscopic Ellipsometry Analyzer software with the assumption of cylindrical pores.

3.5.6 XPS.

XPS analysis was performed using a Kratos Axis Ultra DLD with a monochromatic Al (Kα) radiation source. The charge neutralizer filament was used to control charging of the sample, a 20 eV pass energy was used with a 0.05 eV step size, and scans were calibrated using the C 1 s peak shifted to 284.8 eV. The integrated area of the peaks was found using the CasaXPS software, and atomic ratios were also found using this software. The atomic sensitivity factors used were from the Kratos library within the Casa software.

3.5.7 Electrochemistry.

The as prepared mp-MoS$_2$ thin films on Pt-coated silicon substrates were used as working electrodes. Electrochemical measurements of these thin film electrodes in lithium and sodium electrolytes were carried out in a three-electrode cell. The lithium ion electrochemistry was carried out in 1M LiClO$_4$ in propylene carbonate with lithium foils used as a counter and reference electrode. The mp-MoS$_2$ thin film were cycled 100 times between 0.8 to 3.0 V (vs. Li/Li$^+$) to complete the phase transition to the 1T phase, and then a voltage window between 1.0 to 3.0 V (vs. Li/Li$^+$) was used to investigate the capacity and kinetics of mp-MoS$_2$ using an Arbin BT-2000. The films were cycled in galvanostatic mode for the cyclability test with Li. The sodium ion electrochemistry was carried out in 1M NaClO$_4$ in propylene carbonate, and sodium foils were used as a counter and reference electrode. Cyclic voltammetry was performed between 0.55 to 2.7 V (vs. Na/Na$^+$) using a PAR EG&G 273A potentiostat. The mp-MoS$_2$ was cycled 20 times at 1 mV/s in order to complete the phase change to the 1T phase followed by the kinetic analysis and capacity measurement.

3.5.8 Inductively Coupled Plasma Atomic Emission Spectroscopy (ICP-OES) For Thin Film Mass Determination.

After electrochemical cycling in either Li or Na electrolytes, the mp-MoS$_2$ thin films were dissolved in aqua regia (nitric acid:hydrochloric acid=1:3) for 30 minutes. The samples were analyzed with a PerkinElmer Optima 7000DV using a GemTip Cross-Flow nebulizer. The calculated areal loading from several films is 36 μg·cm$^{-2}$±1 μg·cm$^{-2}$, which is used for the determination of the mass normalized capacities in this disclosure.

4. Significance of Suppressing First-Order Phase Transition.

Pseudocapacitors rely on near-surface faradaic charge transfer when ions are adsorbed electrochemically onto the host lattice (redox pseudocapacitor) or when ions intercalate into the channels or layers of a redox-active material without inducing a phase transition (intercalation pseudocapacitor). First-order phase transitions arise when there is a large variation in Li or Na concentration during intercalation. The coexistence of Li or Na-rich and Li or Na-poor phase results in a migration barrier that leads to slow and undesirable kinetics in most intercalation materials. The difference in structure of the two phases can change the thermodynamics and kinetics of ion diffusion and can induce strain in the electrode, potentially reducing battery life.

Recently, we found that nanostructuring can suppress first-order phase transitions in certain materials during ion intercalation and deintercalation and can therefore induce pseudocapacitive behavior. These materials are size dependent and do not show pseudocapacitive behavior above a critical size. This phenomenon has been previously observed and shown in MoO$_2$, TiO$_2$, TiS$_2$, and LiFePO$_4$. When the diffusion path length shortens, rapid rates can be achieved because diffusion time is proportional to the square of diffusion length and inversely proportional to diffusivity. In addition, as crystallite size decreases, two-phase coexistence (Li or Na-rich and Li or Na-poor) becomes undesirable due to the increased activation energy of nucleation for the new phase and the high interfacial energy if two phases were to coexistence. This gives rise to solid solution behavior described by Vegard's law, in which there is no miscibility gap and ions are interstitially dissolved into the lattice, causing slight changes in the lattice parameter without major reconstruction of the crystal structure.

In this section, we use operando X-ray diffraction during electrochemical cycling at Stanford Synchrotron Radiation Lightsource (SSRL) to further understand the structural origin of the fast pseudocapacitive mechanism in MoS$_2$ nanocrystals. Operando X-ray diffraction has been shown to be an effective method for monitoring phase change and lattice expansion in energy storage materials in real time. Any resulting changes in the atomic structure of the host lattice will be reflected in changes to the peak positions in the X-ray diffractograms since Li and Na-ions are preferentially inserted and stored in the van der Walls gap of the material. This section provides a direct comparison between the change in crystal lattice of bulk MoS$_2$ (b-MoS$_2$) and MoS$_2$ nanocrystals (ncs-MoS$_2$) upon cycling and enables us to understand how the nanoscale structure influences the electrochemical kinetics.

4.1 Example 1: Suppression of First-Order Phase Transition in MoS$_2$ Nanocrystals During Li Intercalation/Deintercalation.

FIG. 19A through FIG. 19C show the diffraction pattern of b-MoS$_2$ upon cycling. The changes in peak position and emergence of new peak indicate that first-order phase transition (1T trigonal prismatic to triclinic Li$_1$MoS$_2$) is not suppressed in b-MoS$_2$. During lithiation, the (001) peak first shifts toward lower Q values. This is then followed by a shift to higher Q at a voltage of about 1.76 V and is accompanied by a new peak at 1.09 Å$^{-1}$ that corresponds to triclinic L$_1$MoS$_2$ and grows continuously in intensity as the Li-ion concentration increases. During delithiation, the structural processes that occurred during lithiation are reversible. The peak at 1.09 Å$^{-1}$ disappears while the (001) peak gradually returns to its original position. In addition to this change, significant structural changes corresponding to the covalent bonding network can also be found in the region between 2.1 Å$^{-1}$ and 2.5 Å$^{-1}$. Similar to the (001) peak, (100) and (101) peaks shift significantly towards lower Q then back to higher Q as the (101) peak merges with its shoulder peak. These diffraction signatures are consistent with a reversible first-order phase change, which typically occurs when Li-ions have a low solubility in the parent phase (the 1T-metallic phase in this case).

Different structural changes are found in ncs-MoS$_2$ compared to b-MoS$_2$ during Li-ion charge storage. FIG. 19D through FIG. 19F show the XRD patterns of ncs-MoS$_2$ collected during the operando phase change study. As can be seen, all (001), (100) and (101) peaks shift to lower Q without the emergence of any new peaks during lithium intercalation and deintercalation of ncs-MoS$_2$, indicating the suppression of phase transition. In addition, a distinct shoulder at 1.09 Å$^{-1}$ corresponding to the Li$_1$MoS$_2$ is not present upon lithiation. It is also worth noting that unlike b-MoS$_2$, the expansion of ncs-MoS$_2$ lattice tracks the Li-ion concentration linearly like a solid solution. This lattice expansion indicates that the fast charge storage in this system is not limited to the surface of the nanocrystal, and is indeed related to the large portion (80%) of the theoretical capacity being stored through capacitive mechanisms.

4.2. Example 2: Suppression of First-Order Phase Transition in MoS$_2$ Nanocrystals During Na Intercalation/Deintercalation.

Similar to Li intercalation, intercalation of Na-ions in b-MoS$_2$ and ncs-MoS$_2$ will either drive a first-order phase transition or will be stored in the lattice as a solid-solution (i.e., suppression of the phase transition). Referring to FIG. 20A through FIG. 20C, as sodium intercalates into b-MoS$_2$, a first-order phase change from the 1T phase to the triclinic phase of NaMoS$_2$ is observed. A clear indication of this conversion is the increasing intensity of the characteristic triclinic peak at 1.1 Å$^{-1}$ that is not present in the 2H or 1T phase. Another clear signature of this first-order phase transition is the co-existence of multiple phases at a specific state of charge, which is observed as a parent peak splitting into a new secondary peak as seen in the second XRD stack plot. This type of behavior is consistent with closely related lithium-ion system, showing that the insertion of lithium-ions (x) between 0≤x≤1.0 induces several first order phase transformations.

In stark contrast to the phase transitions observed during charge and discharge of b-MoS$_2$, ncs-MoS$_2$ does not undergo a phase change as shown in FIG. 20D through FIG.

20F. The first XRD pattern is consistent with the 1T phase of MoS$_2$ and subsequent patterns corresponding to different sodium concentrations are solid solutions of this phase. The absence of the characteristic triclinic peak at 1.1 Å$^{-1}$ indicates the 1T to triclinic phase transition is suppressed.

4.3 Conclusion From Operando Study.

Our operando study demonstrates that first order phase transition is suppressed in nanostructured MoS$_2$, and Li and Na-ions are stored as solid solutions in MoS$_2$. We suggest that the suppression results from the instability of a phase boundary between the triclinic phase and the 1T-phase in the confined space of the nanocrystal. The interfacial energy penalty is too high for two phase coexistence. We believe that the fast kinetics of MoS$_2$ nanocrystals result from phase transition suppression, and not simply the reduced ion migration path lengths. The apparent lattice expansion of MoS$_2$ upon charging further demonstrates that the majority of charge storage originates from ions intercalation into the nanocrystals and not simply surface. By combining the detailed electrochemical kinetic analysis and this structural understanding of the charge storage process, we can provide compelling data that lithium and sodium intercalates into the nanocrystal without being governed by solid-state diffusion kinetics; i.e., intercalation pseudocapacitance.

From the description herein, it will be appreciated that that the present disclosure encompasses multiple embodiments which include, but are not limited to, the following:

1. A material comprising, a synthetic metal dichalcogenide having a highly defected nanocrystalline layered structure, wherein layer spacing is larger than in perfect crystals of the same material, wherein the defected structure provides access to interlayer crystals of the same material, and wherein the defected structure facilitates a pseudocapacitive charge storage mechanism.

2. The material of any preceding embodiment, wherein the metal dichalcogenide is selected from the group consisting of transition metal disulphides, diselelnides, and ditellurides, and mixed transition metal combinations thereof.

3. The material of any preceding embodiment, wherein the metal dichalcogenide is selected from the group consisting of MoS$_2$, NbS$_2$, TaS$_2$, TiS$_2$, and VS$_2$.

4. The material of any preceding embodiment, wherein the defected structure is receptive to intercalation of ions selected from the group consisting of Li ions, Na ions, Mg ions, and Ca ions.

5. A material comprising: a synthetic metal dichalcogenide having a highly defected nanocrystalline layered structure, wherein layer spacing is larger than in perfect crystals of the same material, wherein the defected structure provides access to interlayer crystals of the same material, and wherein the defected structure facilitates a pseudocapacitive charge storage mechanism; wherein the metal dichalcogenide is selected from the group consisting of transition metal disulphides, diselelnides, and ditellurides, and mixed transition metal combinations thereof; and wherein the defected structure is receptive to intercalation of ions selected from the group consisting of Li ions, Na ions, Mg ions, and Ca ions.

6. A material comprising: a synthetic metal dichalcogenide having a highly defected nanocrystalline layered structure, wherein layer spacing is larger than in perfect crystals of the same material, wherein the defected structure provides access to interlayer crystals of the same material, and wherein the defected structure facilitates a pseudocapacitive charge storage mechanism; wherein the metal dichalcogenide is selected from the group consisting of MoS$_2$, NbS$_2$, TaS$_2$, TiS$_2$, and VS$_2$; and wherein the defected structure is receptive to intercalation of ions selected from the group consisting of Li ions, Na ions, Mg ions, and Ca ions.

7. The material of any preceding embodiment, wherein the metal dichalcogenide does not undergo a phase transition upon intercalation of Li ions, Na ions, Mg ions, or Ca ions.

8. A composite electrode, comprising: (a) a synthetic metal dichalcogenide having a highly defected nanocrystalline layered structure, wherein layer spacing is larger than in perfect crystals of the same material, wherein the defected structure provides access to interlayer crystals of the same material, and wherein the defected structure facilitates a pseudocapacitive charge storage mechanism; (b) a carbon derivative; and (c) a binder; (d) wherein said synthetic metal dichalcogenide, said carbon derivative, and said binder are intermixed to form a composite electrode.

9. The composite electrode of any preceding embodiment, wherein the binder is polyacrylic acid.

10. The composite electrode of any preceding embodiment, wherein the carbon derivative comprises a plurality of carbon fibers, or carbon black, or carbon black and a plurality of carbon fibers.

11. The composite electrode of any preceding embodiment, wherein the metal dichalcogenide is selected from the group consisting of transition metal disulphides, diselelnides, and ditellurides, and mixed transition metal combinations thereof.

12. The composite electrode of any preceding embodiment, wherein the metal dichalcogenide is selected from the group consisting of MoS$_2$, NbS$_2$, TaS$_2$, TiS$_2$, and VS$_2$.

13. The composite electrode of any preceding embodiment, wherein the defected structure is receptive to intercalation of ions selected from the group consisting of Li ions, Na ions, Mg ions, and Ca ions.

14. The composite electrode of any preceding embodiment: wherein the metal dichalcogenide is selected from the group consisting of transition metal disulphides, diselelnides, and ditellurides, and mixed transition metal combinations thereof; and wherein the defected structure is receptive to intercalation of ions selected from the group consisting of Li ions, Na ions, Mg ions, and Ca.

15. The composite electrode of any preceding embodiment: wherein the metal dichalcogenide is selected from the group consisting of MoS$_2$, NbS$_2$, TaS$_2$, TiS$_2$, and VS$_2$; and wherein the defected structure is receptive to intercalation of ions selected from the group consisting of Li ions, Na ions, Mg ions, and Ca.

16. The composite electrode of any preceding embodiment, wherein said composite electrode is a component of a charge storage device.

17. The composite electrode of any preceding embodiment, wherein the charge storage device comprises an electrochemical cell, a symmetric capacitor, or an asymmetric capacitor.

18. The composite electrode of any preceding embodiment, wherein aid electrochemical cell comprises a said composite electrode and a Li-ion, Na-ion, Mg-ion, or Ca-ion cathode.

19. The composite electrode of any preceding embodiment, wherein the metal dichalcogenide does not undergo a phase transition upon intercalation of Li ions, Na ions, Mg ions, or Ca ions.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A material comprising, a synthetic metal dichalcogenide having a highly defected nanocrystalline layered structure, wherein layer spacing is larger than in perfect crystals of the same material, wherein the defected structure provides access to interlayer crystals of the same material, wherein the metal dichalcogenide does not undergo a first order phase transition between 1T and triclinic phases upon intercalation of Li ions, Na ions, Mg ions, or Ca ions and wherein the defected-structure facilitates a pseudocapacitive charge storage mechanism.

2. The material of claim 1, wherein the metal dichalcogenide is selected from the group consisting of transition metal disulphides, diselenides, and ditellurides, and mixed transition metal combinations thereof.

3. The material of claim 1, wherein the metal dichalcogenide is selected from the group consisting of $MoS_2$, $NbS_2$, $TaS_2$, $TiS_2$, and $VS_2$.

4. A material comprising:
a synthetic metal dichalcogenide having a highly defected nanocrystalline layered structure, wherein layer spacing is larger than in perfect crystals of the same material, wherein the defected structure provides access to interlayer crystals of the same material, and wherein the defected structure facilitates a pseudocapacitive charge storage mechanism;
wherein the metal dichalcogenide is selected from the group consisting of transition metal disulphides, diselenides, and ditellurides, and mixed transition metal combinations thereof;
wherein the defected structure is receptive to intercalation of ions selected from the group consisting of Li ions, Na ions, Mg ions, and Ca ions; and
wherein the metal dichalcogenide does not undergo a first order phase transition between 1T and triclinic phases upon intercalation of Li ions, Na ions, Mg ions, or Ca ions.

5. A material comprising:
a synthetic metal dichalcogenide having a highly defected nanocrystalline layered structure, wherein layer spacing is larger than in perfect crystals of the same material, wherein the defected structure provides access to interlayer crystals of the same material, and wherein the defected structure facilitates a pseudocapacitive charge storage mechanism;
wherein the metal dichalcogenide is selected from the group consisting of $MoS_2$, $NbS_2$, $TaS_2$, $TiS_2$, and $VS_2$; and
wherein the defected structure is receptive to intercalation of ions selected from the group consisting of Li ions, Na ions, Mg ions, and Ca ions without undergoing a first order phase transition between 1T and triclinic phases.

6. A composite electrode, comprising:
(a) a synthetic metal dichalcogenide having a highly defected nanocrystalline layered structure, wherein layer spacing is larger than in perfect crystals of the same material, wherein the defected structure provides access to interlayer crystals of the same material, wherein the metal dichalcogenide does not undergo a first order phase transition between 1T and triclinic phases upon intercalation of Li ions, Na ions, Mg ions, or Ca ions, and wherein the defected structure facilitates a pseudocapacitive charge storage mechanism;
(b) a carbon derivative; and
(c) a binder;
(d) wherein said synthetic metal dichalcogenide-, said carbon derivative, and said binder are intermixed to form a composite electrode.

7. The composite electrode of claim 6, wherein the binder is polyacrylic acid.

8. The composite electrode of claim 6, wherein the carbon derivative comprises a plurality of carbon fibers, or carbon black, or carbon black and a plurality of carbon fibers.

9. The composite electrode of claim 6, wherein the metal dichalcogenide is selected from the group consisting of transition metal disulphides, diselenides, and ditellurides, and mixed transition metal combinations thereof.

10. The composite electrode of claim 6, wherein the metal dichalcogenide is selected from the group consisting of $MoS_2$, $NbS_2$, $TaS_2$, $TiS_2$, and $VS_2$.

11. The composite electrode of claim 6:
wherein the metal dichalcogenide is selected from the group consisting of transition metal disulphides, diselenides, and ditellurides, and mixed transition metal combinations thereof; and
wherein the defected structure is receptive to intercalation of ions selected from the group consisting of Li ions, Na ions, Mg ions, and Ca.

12. The composite electrode of claim 6:
wherein the metal dichalcogenide is selected from the group consisting of $MoS_2$, $NbS_2$, $TaS_2$, $TiS_2$, and $VS_2$; and
wherein the defected structure is receptive to intercalation of ions selected from the group consisting of Li ions, Na ions, Mg ions, and Ca.

13. The composite electrode of claim 6, wherein said composite electrode is a component of a charge storage device.

14. The composite electrode of claim 13, wherein the charge storage device comprises an electrochemical cell, a symmetric capacitor, or an asymmetric capacitor.

15. The composite electrode of claim 14, wherein said electrochemical cell comprises said composite electrode and a Li-ion, Na-ion, Mg-ion, or Ca-ion cathode.

* * * * *